(12) United States Patent
Sato et al.

(10) Patent No.: US 8,427,671 B2
(45) Date of Patent: Apr. 23, 2013

(54) IMAGE PROCESSING APPARATUS CAPABLE OF TIMELY NOTIFYING USER OF CHANGE IN STATE, CONTROL METHOD THEREOF, AND IMAGE PROCESSING SYSTEM

(75) Inventors: Tomoya Sato, Kawasaki (JP); Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1361 days.

(21) Appl. No.: 11/908,580

(22) PCT Filed: May 16, 2006

(86) PCT No.: PCT/JP2006/310085
§ 371 (c)(1),
(2), (4) Date: Sep. 13, 2007

(87) PCT Pub. No.: WO2006/123805
PCT Pub. Date: Nov. 23, 2006

(65) Prior Publication Data
US 2009/0021780 A1  Jan. 22, 2009

(30) Foreign Application Priority Data
May 18, 2005  (JP) ................................ 2005-145882

(51) Int. Cl.
*G06F 3/12* (2006.01)
(52) U.S. Cl.
USPC ............ 358/1.15; 358/1.9; 358/402; 358/403
(58) Field of Classification Search .......................... None
See application file for complete search history.

(56) References Cited

U.S. PATENT DOCUMENTS

| | | | |
|---|---|---|---|
| 5,905,866 | A | 5/1999 | Nakabayashi et al. |
| 6,078,415 | A | 6/2000 | Yamamoto |

(Continued)

FOREIGN PATENT DOCUMENTS

| | | |
|---|---|---|
| EP | 1 024 652 | 2/2000 |
| EP | 1 143 695 | 10/2001 |

(Continued)

OTHER PUBLICATIONS

Dan Brickley et al., "RDF Site Summary (RSS) 1.0" [online] May 30, 2001, RSS-DEV Working Group, [searched on Mar. 17, 2005, <URL:http://purl.org/rss/1.0/spec>.

(Continued)

*Primary Examiner* — Dung Tran
(74) *Attorney, Agent, or Firm* — Fitzpatrick, Cella, Harper & Scinto

(57) ABSTRACT

When a user (4201) requests display of a list of documents in a box, an embedded RSS reader (4210) receives the information. The RSS reader (4210) establishes communication with an HTTP server (212), and transmits an RSS feed acquisition request. The HTTP server (212) sends back an update information feed file stored in an image processing apparatus to the RSS reader (4210) as a response to the HTTP request. The RSS reader (4210) analyzes the acquired feed file, formats an entry which has not been read by the user (4202), and displays the entry on the operation unit of the image processing apparatus. If the user selects the anchor of a link contained in the entry displayed by the RSS reader (4210), the RSS reader (4210) causes an embedded Web browser (211) to format and display a resource specified by a URI.

13 Claims, 43 Drawing Sheets

U.S. PATENT DOCUMENTS

| | | | | |
|---|---|---|---|---|
| 6,396,848 | B1 * | 5/2002 | Ohta | 370/490 |
| 6,553,431 | B1 | 4/2003 | Yamamoto | |
| 6,717,688 | B1 * | 4/2004 | Ogawa | 358/1.15 |
| 6,785,023 | B1 * | 8/2004 | Iida | 358/442 |
| 6,952,279 | B1 * | 10/2005 | Iida | 358/1.15 |
| 7,069,292 | B2 | 6/2006 | Sugahara | |
| 7,113,304 | B2 * | 9/2006 | Iida | 358/1.15 |
| 7,139,093 | B2 * | 11/2006 | Iida | 358/1.15 |
| 7,167,264 | B2 * | 1/2007 | Takamiya | 358/1.15 |
| 7,327,478 | B2 | 2/2008 | Matsuda | |
| 7,516,450 | B2 | 4/2009 | Ogura | |
| 7,600,226 | B2 | 10/2009 | Aiba | |
| 8,111,414 | B2 * | 2/2012 | Sato et al. | 358/1.15 |
| 2001/0029521 | A1 * | 10/2001 | Matsuda et al. | 709/201 |
| 2002/0039148 | A1 | 4/2002 | Yamamoto | |
| 2002/0122103 | A1 | 9/2002 | Yamamoto | |
| 2002/0122203 | A1 * | 9/2002 | Matsuda | 358/1.15 |
| 2003/0137682 | A1 | 7/2003 | Sakai et al. | |
| 2003/0169449 | A1 * | 9/2003 | Iida | 358/1.15 |
| 2004/0148379 | A1 | 7/2004 | Ogura | |
| 2004/0196508 | A1 * | 10/2004 | Iida | 358/442 |
| 2005/0055451 | A1 | 3/2005 | Tsuyama | |
| 2007/0139698 | A1 | 6/2007 | Sato | |
| 2009/0080013 | A1 | 3/2009 | Sato et al. | |

FOREIGN PATENT DOCUMENTS

| | | |
|---|---|---|
| EP | 1 385 089 | 1/2004 |
| JP | 4-139557 | 5/1992 |
| JP | 10-232815 A | 9/1998 |
| JP | 11-110223 | 4/1999 |
| JP | 2000-222333 | 8/2000 |
| JP | 2001-84137 | 3/2001 |
| JP | 2001-169236 | 6/2001 |
| JP | 2001-225531 | 8/2001 |
| JP | 2001-232908 | 8/2001 |
| JP | 2001-273030 | 10/2001 |
| JP | 2001-312462 | 11/2001 |
| JP | 2002-149478 A | 5/2002 |
| JP | 2003-177989 | 6/2003 |
| JP | 2003-281147 | 10/2003 |
| JP | 2004-025455 | 1/2004 |
| JP | 2004-62531 | 2/2004 |
| JP | 2004-129047 | 4/2004 |
| JP | 2004-230828 | 8/2004 |
| JP | 2004-259222 | 9/2004 |
| JP | 2004-266470 | 9/2004 |
| JP | 2005-092330 | 4/2005 |

OTHER PUBLICATIONS

U.S. Appl. No. 11/908,578, filed Sep. 13, 2007.
Supplementary European Search Report dated May 13, 2008 issued during prosecution of European application No. 06732660.3.
Nottingham, M., et al., "The Atom Syndication Form; draft-ietf-atompub-format-08.txt", IETF Standard-Working-Draft, Internet Engineering Task Force, IETF, CH, vol. atompub, No. 8, Apr. 18, 2005.
Hammond, T., et al., "082-9873 of RSS in Science Publishing Syndication and Annotation on th", D-LIB Magazine, Corporation for National Research Initiatives, Reston, VA, US, vol. 10, No. 12, Dec. 2004. pp. 1-16.
Tatsuhiko Miyagawa, "Web application programming recipe, Cookbook", WEB+DB PRESS, Japan, Gujutsu-Hyohron Co., Ltd., Sep. 20, 2003, vol. 16, pp. 220-227. (Partial English Translation provided).
Japanese Office Action concerning the basic Japanese Patent application No. 2005-145882 dated Aug. 7, 2009.
M. Nottingham, et al., "The Atom Syndication Forma draft-ietf-atompub-froamat-03", [online] Oct. 20, 2004, RSS-DEV Working Group, [searched on Mar. 17, 2005], Internet. <URL:http://atompub.org/2004/10/20/draft-ietf-atompub-format-03.txt>.

* cited by examiner

F I G. 5
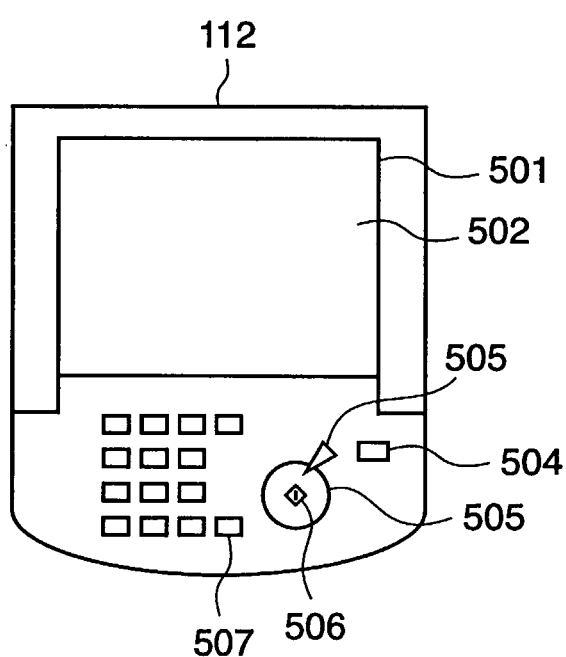

FIG. 27

```
<?xml.version="1.0" encoding="utf-8"?>
```
2201 — `<rdf : RDF`
```
xmlns : rdf="http://www.w3.org/1999/02/22-rdf-syntax-ns#"
xmlns : dc="http://purl.org/dc/elements/1.1/"
xmlns : sy="http://purl.org/rss/1.0/modules/syndication/"
xmlns : admin="http://webns.net/mvcb/"
xmlns="http://purl.org/rss/1.0/">
```

2202 — `<channel rdf : about="http://my-mfp.example.com/">`
2207 — `<title>REMOTE UI : my-mfp : MFP3200</title>`
`<link>http://my-mfp.example.com/</link>`
2208 — `<description> INSTALLATION LOCATION : NEW BUILDING 3F;`
ADMINISTRATOR : SATO;
MESSAGE : PLEASE USE DOUBLE-SIDED COPYING</description>
`<dc : language>ja</dc : language>`
4701 — `<dc : creator></dc : creator>`
4702 — `<dc : date>2004-12-19T23:46:36+09:00</dc : date>`
`<admin : generatorAgent rdf : resource="http://canon.com/product/remote-ui/mfp3200/"/>`

2211 — `<items>`
2212 — `<rdf : Seq>`
`<rdf : li rdf : resource="http://my-mfp.example.com/archives/2004/12/22/0123401.html"/>`
2213 — `<rdf : li rdf : resource="http://my-mfp.example.com/archives/2004/12/22/0123400.html"/>`
2213 — `<!- rdf.li REPEAT li ELEMENT...-->`
`</rdf : Seq>`
`</items>`

`</channel>`

2204 — `<item rdf : about="http://my-mfp.example.com/archives/2004/12/22/0123401.html">`
2217 — `<title>PROGRESS REPORT IN OCTOBER</title>`
2218 — `<link>http://my-mfp.example.com/archives/2004/12/22/0123401.html</link>`
2219 — `<description><![CDATA[<p><a href="http://my-mfp.example.com/box/preview/bbs-box/document-63.html"><img src="http://my-mfp.example.com/box/thumbnail/bbs-box/document-63.png"alt="THUMBNAIL IMAGE OF "PROGRESS REPORT IN OCTOBER"align="left"/></a>`
THIS IS BUSINESS PROGRESS REPORT IN OCTOBER</p>
4704 — `]]></description>`
4705 — `<dc : subject>ACCUMULATION OF SCANNED DOCUMENT</dc : subject>`
`<dc : creator>YAMAMOTO</creator>`
`<dc : date>2004-12-19T23:46:36+09:00</dc : date>`
4706 — `</item>`

`<item rdf : about="http://my-mfp.example.com/archives/2004/12/22/0123400.html">`
`<!-...->`
`</item>`

`<!-REPEAT OF item ELEMENT-->`

`</rdf : RDF>`

IMAGE PROCESSING APPARATUS CAPABLE OF TIMELY NOTIFYING USER OF CHANGE IN STATE, CONTROL METHOD THEREOF, AND IMAGE PROCESSING SYSTEM

This application is a National Stage application of International Application No. PCT/JP2006/310085, filed on May 16, 2006.

TECHNICAL FIELD

The present invention relates to an image processing apparatus such as a copying machine having, e.g., a network connection function, a control method thereof, an image processing system, and the like.

BACKGROUND ART

Recently, in the Internet Web technology field centered on information processing apparatuses, various versions of RSS (RDF Site Summary) used to syndicate (distribute) the latest news, and XML (extensive Mark-up Language) applications such as Atom are becoming popular (see, e.g., non-patent reference 1 or 2). For example, the specifications of RSS 1.0 (RDF Site Summary) by the RSS-DEV Working Group are disclosed in non-patent reference 1. In the present invention, syndication means distributing and announcing update information/summary information.

In recent years, not only information processing apparatuses such as a general-purpose computer but also various embedded systems are connected to a network, and can be utilized or managed from a remote place via the network. The embedded system is a computer system which is embedded in an application specific apparatus, and comprises peripheral devices and applications specialized in specific purposes. For example, image communication apparatuses using a protocol (e.g., a printer, scanner, facsimile or E-mail), and various image processing apparatuses such as a copying machine, document management system, digital camera, and projector are also connected to a network, and can be utilized or managed from a remote place via the network. For example, a printer and multi-functional peripheral available from CANON includes Web servers, and incorporates a Web application "remote UI" for connecting the apparatus via a Web browser, and utilizing and managing the apparatus from a remote place.

Situations in which the administrator and user use or manage a plurality of apparatuses via a network are increasing. Also, situations in which the administrator and user use or manage an apparatus from various nodes on a network are increasing.

These days, embedded systems such as an image processing apparatus exploit an advanced, high-performance internal CPU and nonvolatile memory (hard disk or the like) to provide a larger number of more advanced functions. These functions are installed as embedded applications which are executed by the internal CPU, and the internal nonvolatile memory holds various settings and data necessary for the operation. Information accumulated in the apparatus is updated in accordance with an operation by the user or the operation of the apparatus.

Patent reference 1 discloses a printing apparatus which can be shared between a plurality of computers via a network, and when it is determined that stored setting information has been updated, displays update information upon activating the printer driver of each computer.

Patent reference 2 discloses an electronic filing system which accumulates and manages update information of a document and has a notification mechanism of notifying a host-computer of document update data after a designated date and time in response to a request from the host computer.

[Non Patent Reference 1] Dan Brickley and 10 others, "RDF Site Summary (RSS) 1.0", [online] May 30, 2001, RSS DEV Working Group, [searched on Mar. 17, 2005]

[Non Patent Reference 2] M. Nottingham and R. Sayer ed., "The Atom Syndication Format draft-ietf-atompub-froamat-03", [online] Oct. 20, 2004, RSS DEV Working Group, [searched on Mar. 17, 2005]

[Patent Reference 1] Japanese Patent Laid-Open No. 2001-232908

[Patent Reference 2] Japanese Patent Laid-Open No. 4-139557

As described above, some image processing apparatuses can acquire update information of counter information, document information accumulated in the apparatuses, or the like. Some pieces of update information are desirably presented to the user in real time when the apparatus is operated.

However, according to patent reference 1, a change in printer settings can be recognized only when the printer driver is activated. The user cannot be notified of a change in settings at a desirable timing, for example, in real time when the apparatus is operated.

In the electronic filing system described in patent reference 2, the host computer and electronic filing system are only synchronized with each other. The user cannot be notified of a change in settings at a desirable timing.

DISCLOSURE OF INVENTION

The present invention has been made in consideration of the above situation, and has as its object to provide an image processing apparatus capable of, when the state of saved data or the like changes in an electronic apparatus (e.g., image processing apparatus) having a built-in computer, timely notifying the user of a message at a desirable timing to this effect, a control method thereof, and an image processing system.

To achieve the above object, the present invention comprises the following arrangement.

An image processing apparatus comprises operation means for performing an operation by a user, syndication data acquisition means for acquiring syndication data which describes information on update of data of saved predetermined information, and control means for causing the syndication data acquisition means to acquire syndication data, formatting the acquired syndication data, and causing display means to display the syndication data in accordance with a predetermined operation which is performed with the operation means and causes the image processing apparatus to function. The image processing apparatus corresponds to an image processing apparatus 110 in FIGS. 1 and 22 and the like. The operation means corresponds to an operation unit 112 shown in FIG. 1. The syndication data acquisition means corresponds to an embedded RSS reader 4210 shown in FIG. 22. The control means corresponds to an embedded Web browser 211 in FIG. 22.

An image processing apparatus comprises operation means for performing an operation by a user, syndication data acquisition means for acquiring syndication data which describes information on update of data of saved predetermined information, and control means for, when the image processing apparatus is idle, causing the syndication data acquisition means to acquire syndication data, formatting the acquired syndication data, and causing display means to display the syndication data.

An image processing apparatus comprises
operation means for performing an operation by a user,
syndication data acquisition means for acquiring syndication data which describes information on update of data of saved predetermined information, and
control means for, when an error occurs in the image processing apparatus, causing the syndication data acquisition means to acquire syndication data, formatting the acquired syndication data, and causing display means to display the syndication data.

According to the present invention, a user who uses the image processing apparatus can timely confirm necessary update information in the operation window of the image processing apparatus. The present invention, therefore, obtains any one of the following concrete effects.

(1) In a document transmission operation from the image processing apparatus, a transmission error due to a change in address can be prevented by displaying update information of the address book.

(2) When a document accumulated in the image processing apparatus is operated, the latest information of a catalog or the like accumulated in the apparatus is announced by displaying update information of the accumulated document. An operation which imitates a bulletin board can be performed, and repetitive accumulation of the same document can be avoided.

(3) When a "remote copy" operation of outputting a document loaded by the image processing apparatus to another image processing apparatus is performed or an operation of accumulating a document in another image processing apparatus is performed, the device status can be appropriately grasped by displaying update information of the image processing apparatus at the output destination.

(4) When an error occurs in the image processing apparatus or the administrator of the apparatus operates a device, the device status can be appropriately confirmed by displaying update information of the log or counter.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 5 is a plan view showing the configuration of the operation unit of the image processing apparatus;

FIG. 27 is a view showing an example of a feed file for syndicating box-related update information;

BEST MODE FOR CARRYING OUT THE INVENTION

<System Configuration>

Figure 1:
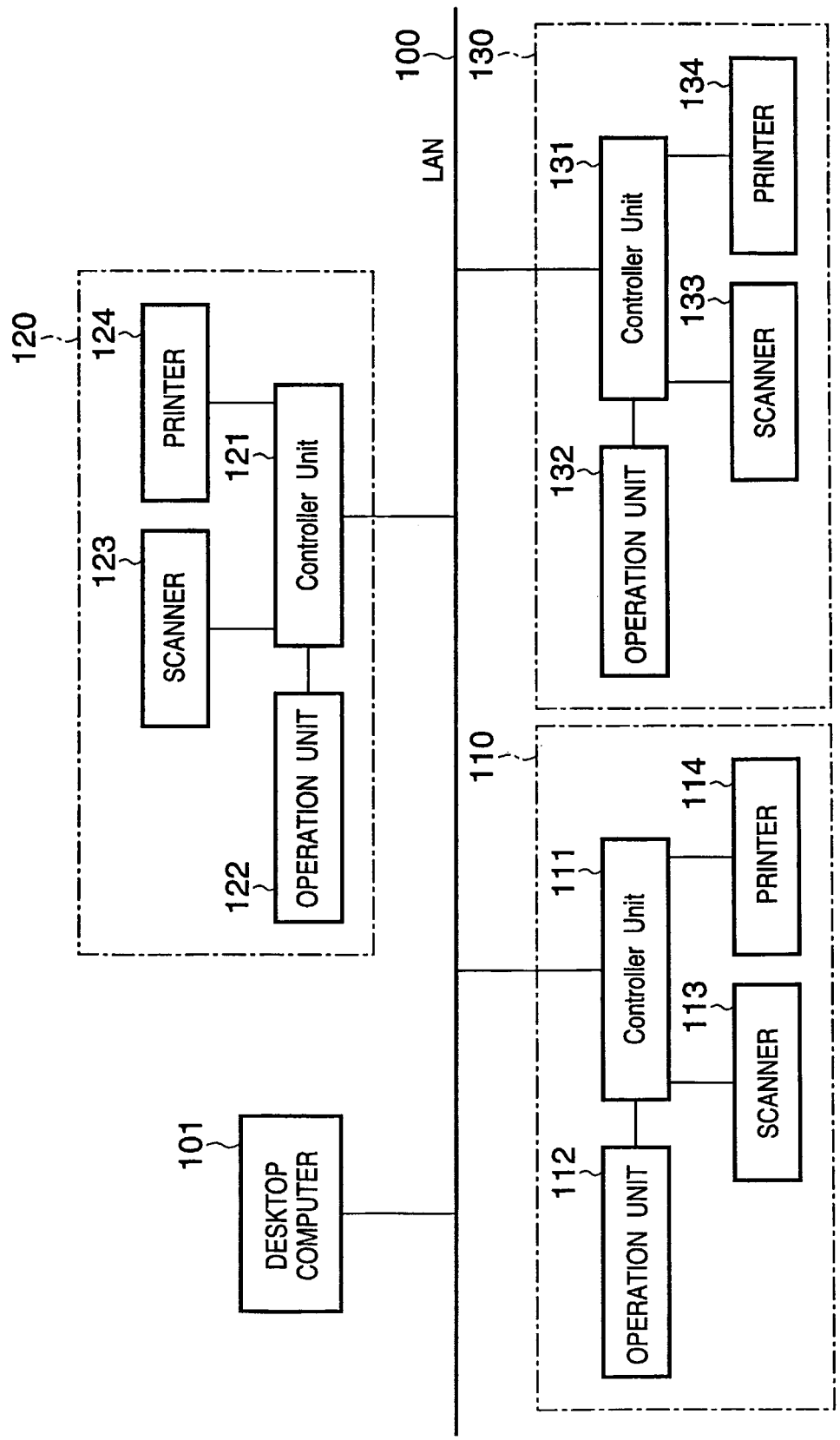
FIG. 1 is a block diagram showing the overall configuration of an image processing system according to an embodiment of the present invention.

The best mode for carrying out the invention will be described with reference to the accompanying drawings. FIG. 1 is a block diagram showing the overall configuration of an image processing system according to an embodiment of the present invention. In FIG. 1, the image processing system is configured by image processing apparatuses 110, 120, and 130 and a desktop computer 101 which are connected to each other via a network. The network is formed from, e.g., a LAN (Local Area Network) 100.

The image processing apparatus 110 comprises a scanner 113 serving as an image input device, a printer 114 serving as an image output device, a controller unit 111, and an operation unit 112 serving as a user interface. The image processing apparatus 110 is a so-called digital multi-functional peripheral, and can accomplish functions such as copying, printing, image capturing, image filing, and facsimile communication by using the above devices.

The scanner 113, printer 114, and operation unit 112 are connected to the controller unit 111, and controlled by instructions from the controller unit 111. The controller unit 111 is connected to the LAN 100.

The image processing apparatuses 120 and 130 have the same configuration as that of the image processing apparatus 110. The image processing apparatus 120 comprises a scanner 123, printer 124, and operation unit 122, which are connected to a controller unit 121. The image processing apparatus 130 comprises a scanner 133, printer 134, and operation unit 132, which are connected to a controller unit 131.

The desktop computer 101 is an information processing apparatus usually used by the user, and stores application programs, user data, and the like which are used by the user. The desktop computer 101 can also execute a distributed application in cooperation with the image processing apparatuses 110, 120, and 130 and a server computer (not shown) via the LAN 100.

<Software Configuration of Image Processing Apparatus>

Figure 2:
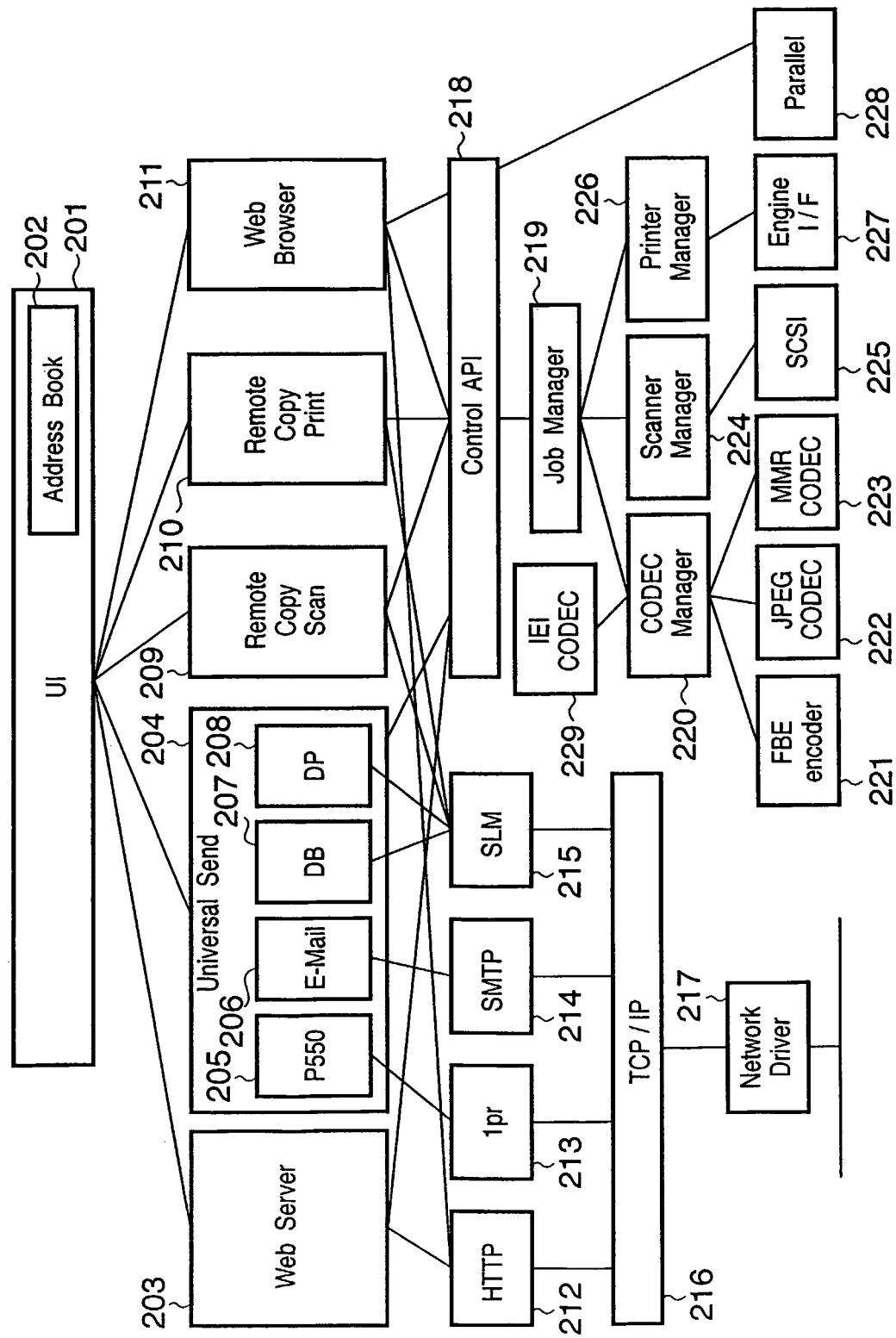
FIG. 2 is a block diagram showing the configuration of software executed in an image processing apparatus.

FIG. 2 is a block diagram showing the configuration of software executed in each of the image processing apparatuses 110, 120, and 130.

A user interface (UI) module 201 interfaces between the apparatus and a user operation when the operator performs various operations and settings to the image processing apparatus. This module transfers input information to various modules (to be described later), requests processes, and sets data in accordance with operations by the operator.

An Address-Book module 202 is a database module which manages the data destination, communication destination, and the like. As for data managed by the Address-Book module 202, the Address-Book module 202 adds, deletes, and acquires data in accordance with operation instructions from the UI module 201. The Address-Book module 202 sends data and gives communication destination information to modules (to be described later) in accordance with operations by the operator.

A Web-Server module 203 notifies a Web client of management information of the image processing apparatus in accordance with a request from the Web client (e.g., the desktop computer 101). The management information is acquired via a Universal-Send module 204, Remote-Copy-Scan module 209, Remote-Copy-Print module 210, and Control-API module 218 (to be described later). The Web client is notified of the management information via an HTTP module 212, TCP/IP communication module 216, and Network-Driver 217 (to be described later).

The Universal-Send module 204 controls data distribution. This module distributes data designated by the operator via the UI module 201 to a similarly designated communication (output) destination. When the operator designates generation of data to be distributed using the scanner function of the apparatus, the Universal-Send module 204 operates the apparatus via the Control-API module 218 (to be described later), and generates data.

A P550 module 205 is contained in the Universal-Send module 204, and executed when a printer is designated as an output destination. An E-Mail module 206 is contained in the Universal-Send module 204, and executed when an E-mail address is designated as a communication destination. A DB module 207 is contained in the Universal-Send module 204, and executed when a database is designated as an output destination. A DP module 208 is contained in the Universal-Send module 204, and executed when an image processing apparatus similar to the apparatus in FIG. 2 is designated as an output destination.

The Remote-Copy-Scan module 209 reads image information by using the scanner function of the image processing apparatus, and outputs the read image information to another image processing apparatus connected to a network or the like. The Remote-Copy-Scan module 209 implements a copying function, which is originally implemented by a single image processing apparatus, by using a plurality of image processing apparatuses.

The Remote-Copy-Print module 210 outputs, by using the printer function of the image processing apparatus, image information obtained by another image processing apparatus connected via a network or the like. The Remote-Copy-Print module 210 implements a copying function, which is originally implemented by a single image processing apparatus, by using a plurality of image processing apparatuses.

A Web Browser module 211 loads and displays information from various Web sites (homepages) on the Internet or an intranet. The detailed configuration of the Web browser will be described later.

The HTTP module 212 is used when the image processing apparatus performs communication by HTTP (HyperText Transfer Protocol). By using the TCP/IP communication module 216 (to be described later), the HTTP module 212 provides a communication function to the Web-Server module 203 and Web Browser module 211. This module copes with various protocols (e.g., HTTP) used in the Web, and also provides a communication function based on particularly a security protocol.

By using the TCP/IP communication module 216 (to be described later), an Ipr module 213 provides a communication function to the P550 module 205 in the Universal-Send module 204.

By using the TCP/IP communication module 216 (to be described later), an SMTP module 214 provides a communication function to the E-Mail module 206 in the Universal-Send module 204.

By using the TCP/IP communication module 216 (to be described later), an SLM (Salutation-Manager) module 215 provides a communication function to the DB module 207 and DP module 208 in the Universal-Send module 204, the Remote-Copy-Scan module 209, and the Remote-Copy-Print module 210.

By using the Network-Driver 217 (to be described later), the TCP/IP communication module 216 provides a network communication function to various modules described above. The Network-Driver 217 controls a portion physically connected to a network.

A Control-API 218 provides an interface with a downstream module such as a Job-Manager module 219 (to be described later) to an upstream module such as the Universal-Send module 204.

The Job-Manager module 219 interprets various processes designated by various modules described above via the Control-API 218, and gives instructions to respective modules (220, 224, and 226) to be described later. The Job-Manager module 219 unitarily manages hardware processes executed in the image processing apparatus.

A CODEC-Manager module 220 manages and controls various data compression/decompression processes among processes designated by the Job-Manager module 219.

An FBE encoder module 221 encodes, by using the FBE format, data loaded by a scan process executed by the Job-Manager module 219 and a Scan-Manager module 224 (to be described later).

A JPEG-CODEC module 222 JPEG-compresses data loaded in a scan process executed by the Job-Manager module 219 and Scan-Manager module 224. The JPEG-CODEC module 222 JPEG-expands print data in a printing process executed by a Print-Manager module 226.

An MMR-CODEC module 223 MMR-compresses data loaded in a scan process executed by the Job-Manager module 219 and Scan-Manager module 224. The MMR-CODEC module 223 MMR-decompresses print data in a printing process executed by the Print-Manager module 226.

An information-embedded image CODEC (IEI-CODEC) module 229 decodes information embedded in image data loaded in a scan process executed by the Job-Manager module 219 and Scan-Manager module 224. Also, the IEI-CODEC module 229 embeds information in print image data in a printing process executed by the Print-Manager module 226. Embedding of information in image data uses an encoding technique with a barcode, digital watermark, or the like. The IEI-CODEC module 229 supports, as a kind of decoding technique, character recognition of recognizing characters in an image of image data by segmentation and the OCR technique, and converting the characters into text data. The IEI-CODEC module 229 also supports, as a kind of encoding technique (information embedding technique), conversion from a text into image data by using a raster image processor, and overlay of converted image data and original image data.

The Scan-Manager module 224 manages and controls a scan process designated by the Job-Manager module 219.

An SCSI driver 225 interfaces communication between the Scan-Manager module 224 and the scanner unit internally connected to the image processing apparatus.

The Print-Manager module 226 manages and controls a printing process designated by the Job-Manager module 219.

An Engine-I/F module 227 provides an interface between the Print-Manager module 226 and the printing unit.

A Parallel port driver 228 provides an I/F when data is output to an output device (not shown) via a parallel port.

<Hardware Configuration of Image Processing Apparatus>

Figure 3:
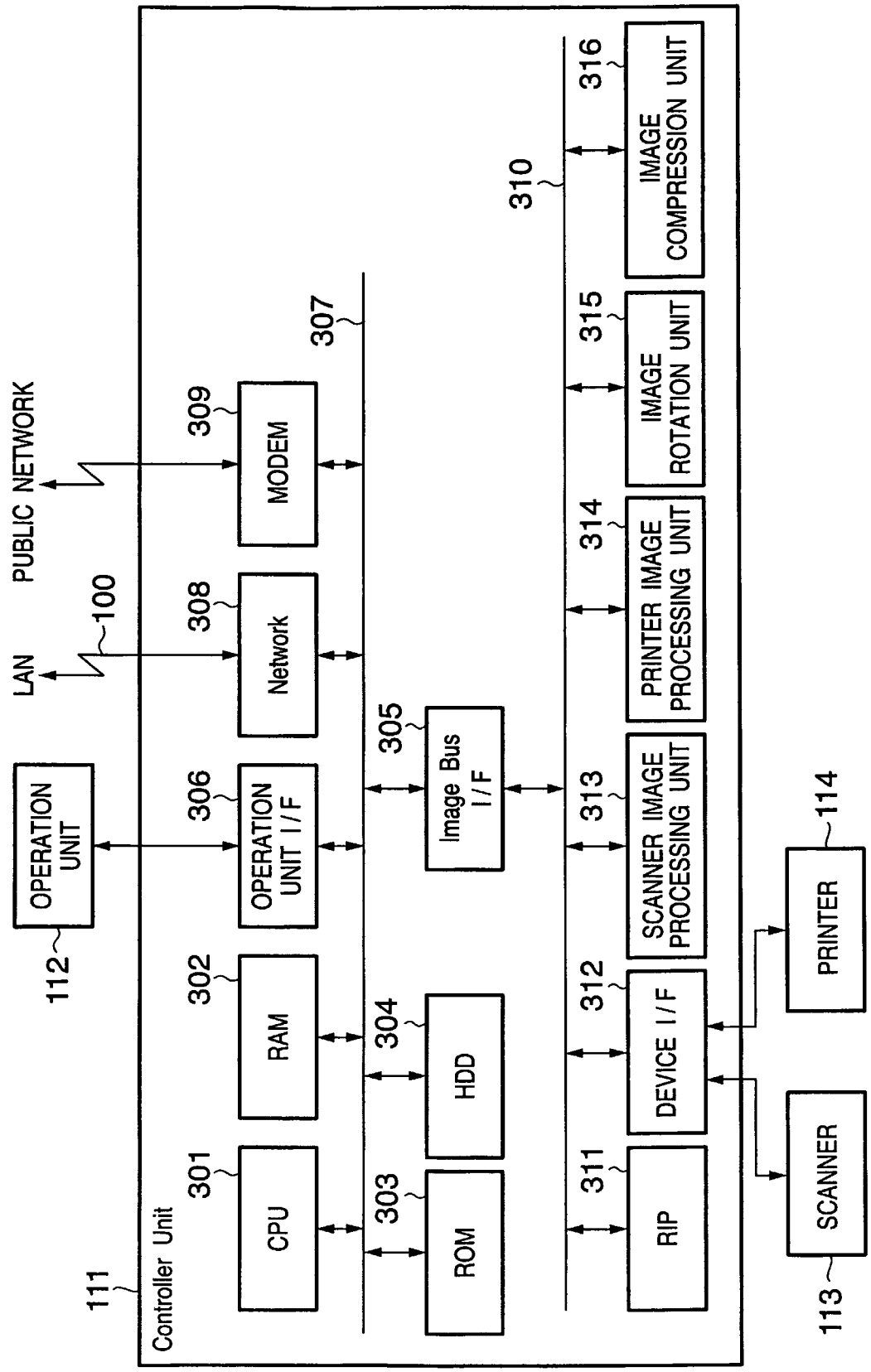
FIG. 3 is a block diagram showing the hardware configuration of the image processing apparatus.

FIG. 3 is a block diagram showing the hardware configuration of the image processing apparatus 110. The image processing apparatuses 120 and 130 also have the same configuration.

The controller unit 111 is connected to the scanner 113 serving as an image input device and the printer 114 serving as an image output device. Further, the controller unit 111 is connected to the LAN 100 and a public line (WAN). The controller unit 111 inputs/outputs image information and device information.

A CPU 301 is a controller which controls the whole controller unit 111. A RAM 302 is a system work memory used to operate the CPU 301. The RAM 302 is also an image memory for temporarily storing image data. A ROM 303 is a boot ROM, and stores the boot program of the system. An HDD 304 is a hard disk drive, and stores system software and image data.

An operation unit I/F 306 interfaces the operation unit 112, and outputs, to the operation unit 112, image data to be displayed on the operation unit 112. Also, the operation unit I/F 306 transfers, to the CPU 301, information input by the user via the operation unit 112.

A network interface (Network) 308 controls connection to the LAN 100, and inputs/outputs information to/from the LAN 100. A modem 309 controls connection to the public line, and inputs/outputs information to/from the public line. These devices are arranged on a system bus 307.

An image bus interface (Image Bus I/F) 305 is a bus bridge which connects the system bus 307 and an image bus 310 for transferring image data at high speed, and converts the data structure. The image bus 310 is formed from a PCI bus or I15E1394 bus.

The following devices are arranged on the image bus 310. A raster image processor (RIP) 311 expands a PDL code transmitted from a network into a bitmap image. A device I/F 312 connects the controller unit 111 and the scanner 113 and printer 114 serving as image input/output devices, and performs conversion between a synchronous system and an asynchronous system of image data.

A scanner image processing unit 313 performs correction, process, and editing for input image data. A printer image processing unit 314 performs correction, resolution conversion, and the like corresponding to the performance of the printer 114 for printout image data. An image rotation unit 315 rotates image data. An image compression unit 316 performs a JPEG compression/decompression process for multilevel image data, and JBIG, MMR, and MH compression/decompression processes for binary image data.

Figure 4:
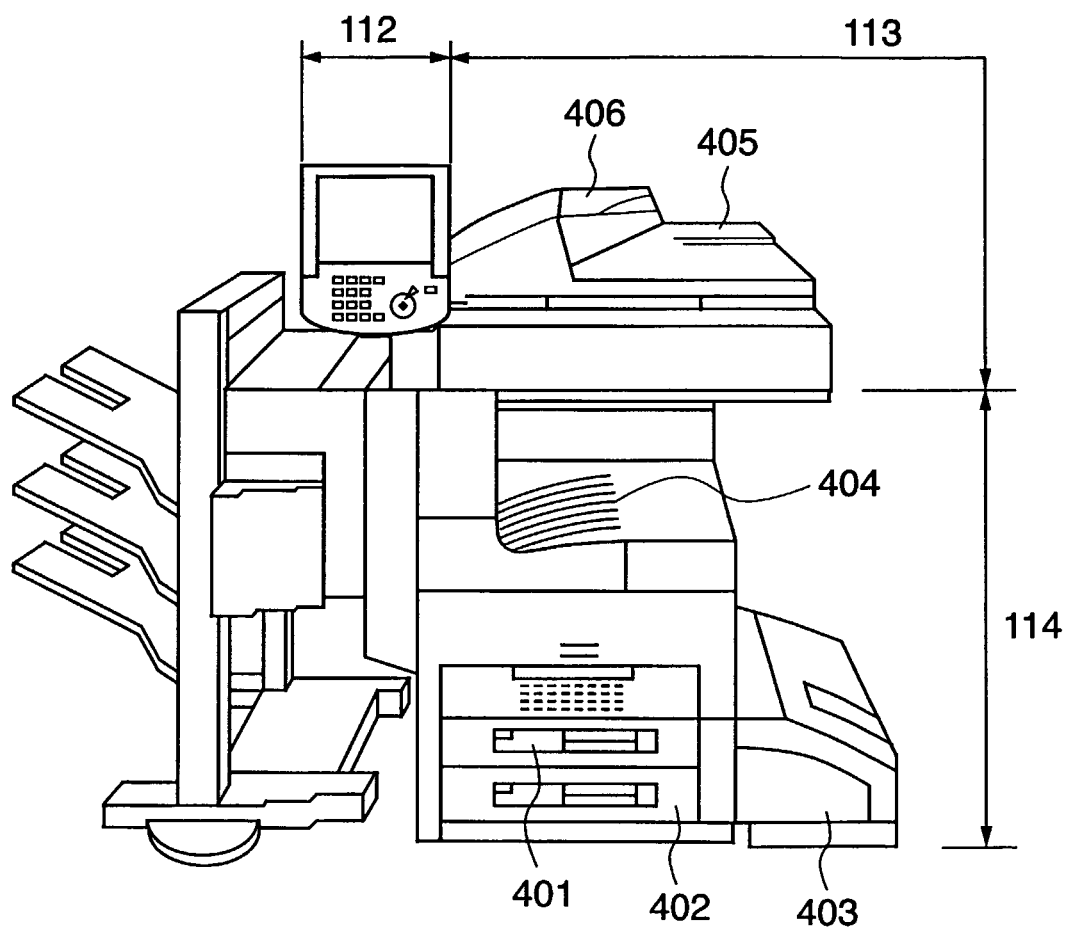
FIG. 4 is a perspective view showing the outer appearance of the image processing apparatus.

FIG. 4 is a perspective view showing the outer appearance of the image processing apparatus 110. The image processing apparatuses 120 and 130 also have the same outer appearance. Although the image processing apparatus 110 will be described, the image processing apparatuses 120 and 130 have completely the same configuration and perform the same operation.

The scanner 113 serving as an image input device illuminates an image on paper serving as a document, and scans a 13D line sensor (not shown) to generate raster image data.

When the user sets document sheets on a tray 406 of a document feeder 405 and designates the start of read on the operation unit 112, the CPU 301 of the controller unit 111 instructs the scanner 113 to feed the document sheets set on the tray 406 one by one, and the scanner 113 reads the document image.

The printer 114 serving as an image output device prints raster image data on paper. The printing method includes an electrophotographic method using a photosensitive drum and photosensitive belt, and an inkjet method of discharging ink from a small nozzle array to directly print an image on paper. Any method can be adopted. Note that a printing operation starts in response to an instruction from the CPU 301.

The printer 114 has a plurality of paper feed stages so as to select different paper sizes or different paper orientations, and is equipped with corresponding paper cassettes 401, 402, and 403. A delivery tray 404 receives printed paper.

FIG. 5 is a plan view showing the configuration of the operation unit 112 of the image processing apparatus 110. Note that the operation units of the image processing apparatuses 120 and 130 also have the same configuration.

An LCD display unit 501 is configured by adhering a touch panel sheet 502 on an LCD (Liquid Crystal Display). The LCD display unit 501 displays the operation window and soft keys of the image processing apparatus 110. When a displayed key is touched, the LCD display unit 501 transfers position information representing the touched position to the CPU 301 of the controller unit 111.

A start key 505 is operated to, for example, start reading a document image. An LED display 506 in two, green and red colors is arranged at the center of the start key 505, and the color of the LED display 506 represents whether the start key 505 is available. A stop key 503 is operated to stop an operation of the image processing apparatus 110 in progress. An ID key 507 is operated to input the user ID of the user. A reset key 504 is operated to initialize settings from the operation unit 112.

Figure 6:
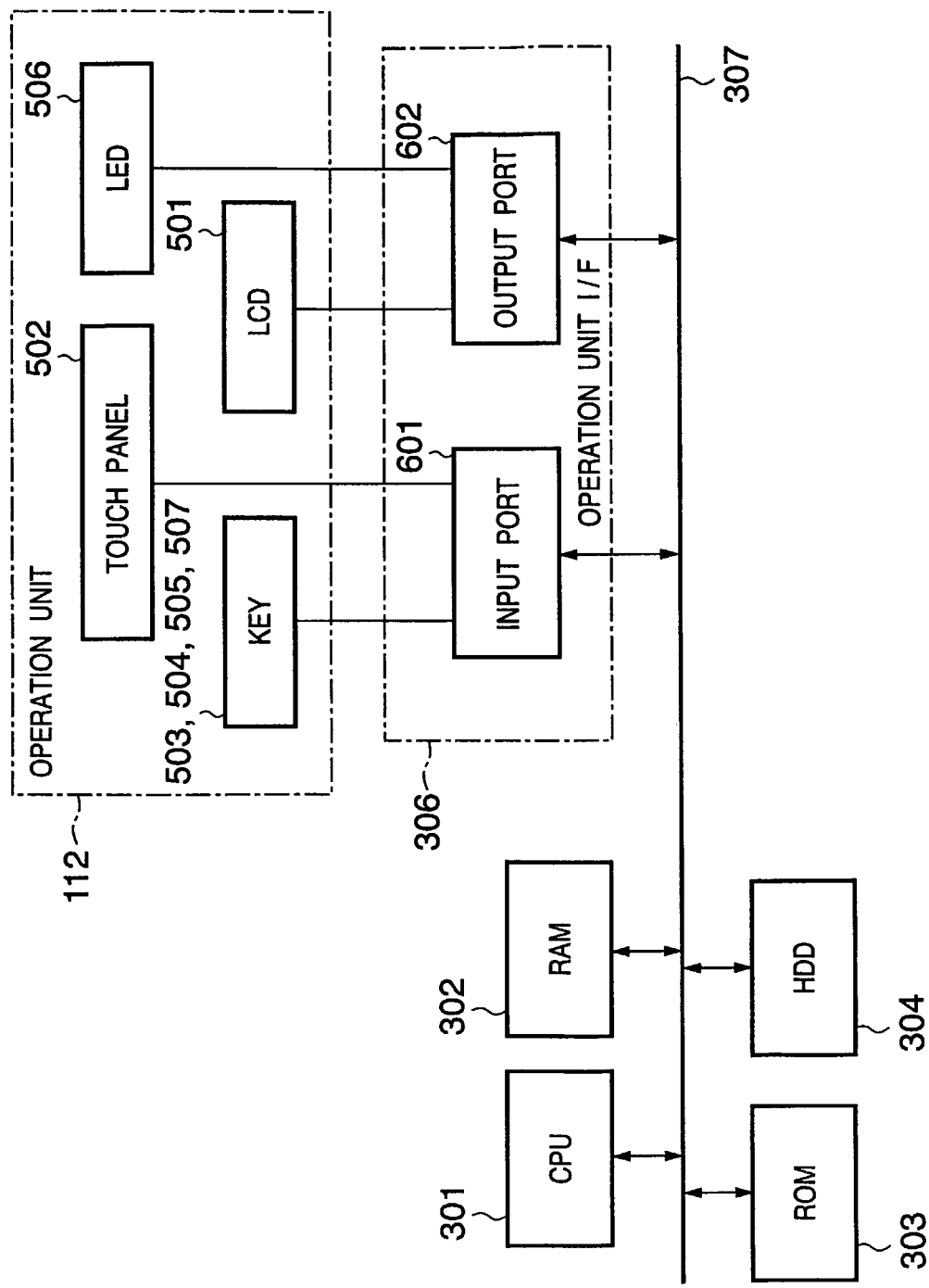
FIG. 6 is a block diagram showing the internal configurations of the operation unit and operation unit I/F of the image processing apparatus in correspondence with the internal configuration of a controller unit.

FIG. 6 is a block diagram showing the internal configurations of the operation unit 112 and operation unit I/F 306 of the image processing apparatus 110 in correspondence with the internal configuration of the controller unit 111. Although the image processing apparatus 110 will be described, the image processing apparatus 110 can be replaced with the image processing apparatus 120 or 130 without any problem.

As described above, the operation unit 112 is connected to the system bus 307 via the operation unit I/F 306. The system bus 307 is connected to the CPU 301, RAM 302, ROM 303, and HDD 304. The CPU 301 comprehensively controls access to various devices connected to the system bus 307 on the basis of control programs and the like stored in the ROM 303 and HDD 304. The CPU 301 loads input information from the scanner 113 connected via the device I/F 312, and outputs an image signal serving as output information to the printer 114 connected via the device I/F 312. The RAM 302 is a main memory, work area, and the like for the CPU 301.

User input information from the touch panel 502 and various hard keys 503, 504, 505, and 507 is transferred to the CPU 301 via an input port 601. The CPU 301 generates display window data on the basis of the contents of user input information and the control program, and outputs display window data to the LCD display unit 501 via an output port 602 for controlling a window output device. If necessary, the CPU 301 controls the two-color LED display 506.

Figure 7:
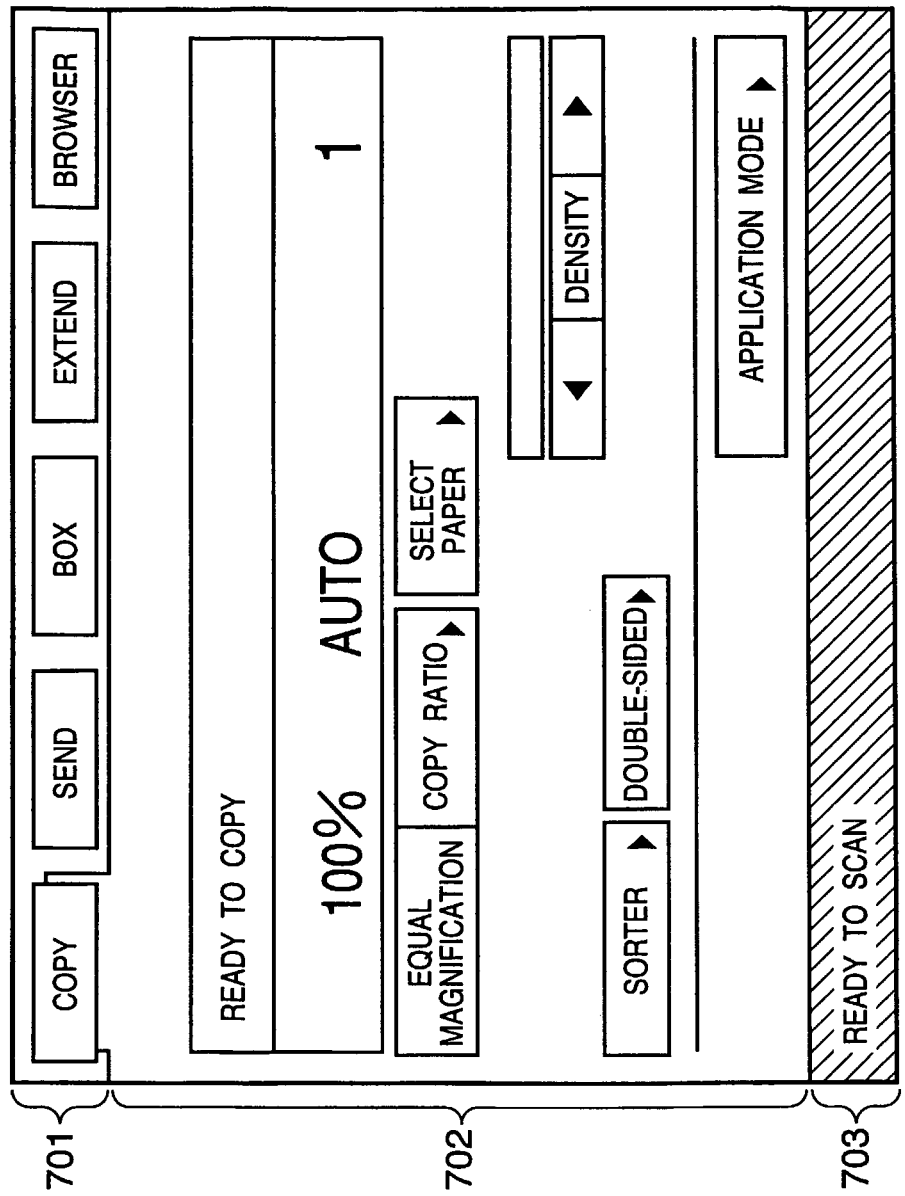
FIG. 7 is a view showing an example of a standard operation window displayed on the operation unit of the image processing apparatus.

FIG. 7 is a view showing an example of a standard operation window displayed on the operation unit 112 of the image processing apparatus 110. Buttons aligned at a top 701 in FIG. 7 are used to select one of various functions provided by the image processing apparatus 110.

The copying function is used to print, by the printer 114, document image data scanned and read by the scanner 113 and obtain a copy of a document. The sending function is used to send document image data read by the scanner 113 and image data accumulated in the HDD 304 to various output destinations. Output destinations are various output destinations to which data can be sent via the network interface 308 by various protocols, and various output destinations to which data can be sent via the modem 309 by protocols such as a facsimile protocol. A plurality of output destinations can be selected to send data.

The box function is used to browse, edit, print, and send document files which are accumulated in the HDD 304 and include image data and code data. Document files stored in the HDD 304 include document image data read by the scanner 113, data downloaded via the network interface 308, data which accumulates print data received from another apparatus via the network interface 308, and facsimile data received from another apparatus via the modem 309. The box function can be used as an electronic mail box in user's office environment. The box function can also be utilized for secured printing which enhances the confidentiality of a PDL print job by delaying printout on paper until a password is input. The extension function is used to call various extended functions so as to, for example, lock the scanner 113 for use from an external apparatus. The browser function is used to browse a Web site.

A middle portion 702 in FIG. 7 displays an operation window when the copying function is selected. A bottom 703 in FIG. 7 is a status display area where various messages such as each function of the image processing apparatus 110 and information on the apparatus itself are displayed for the user regardless of a function selected at the top 701.

(Operation of Distributed Application by Web Browser)

Figure 8:
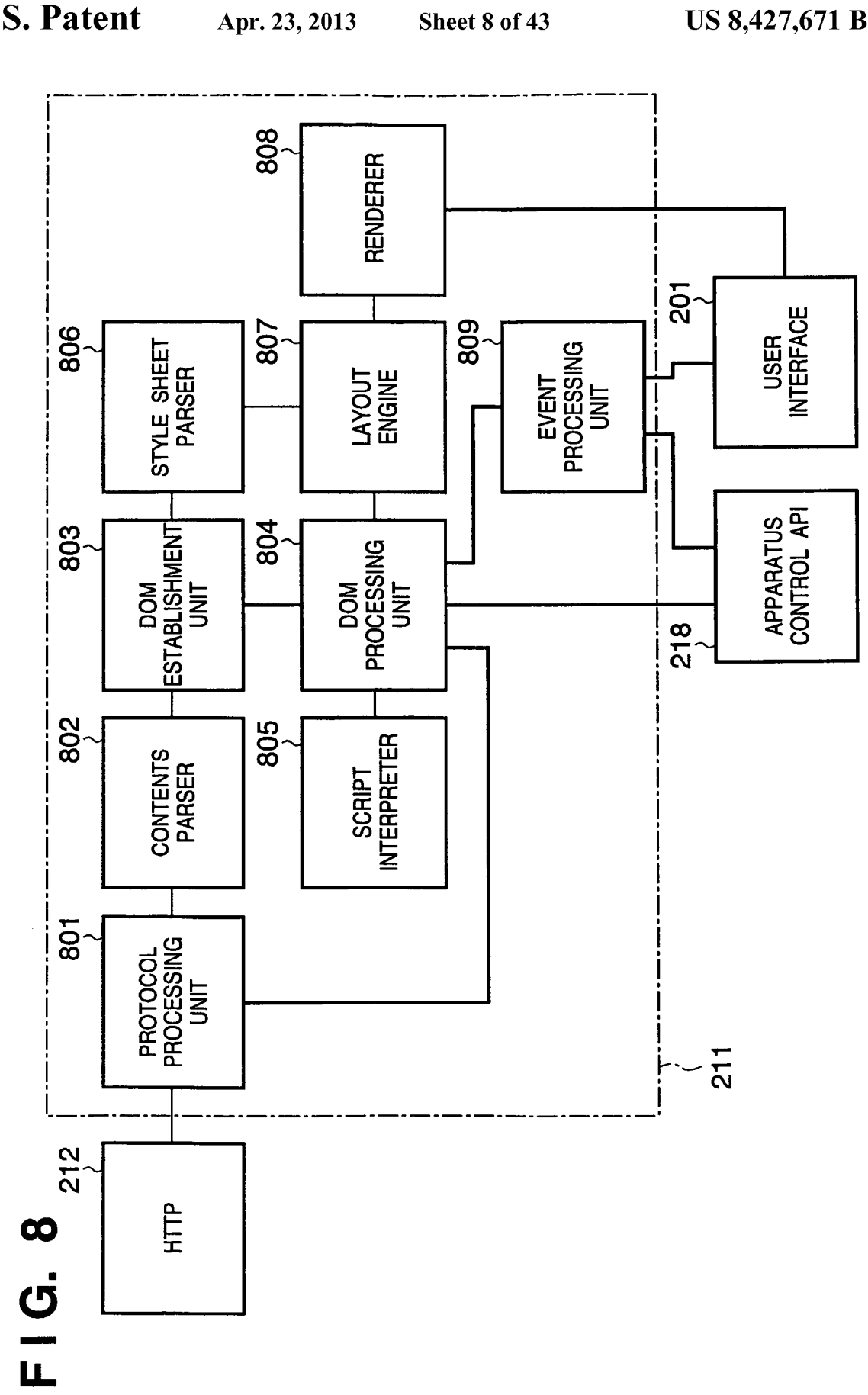
FIG. 8 is a block diagram showing the internal configuration of a Web browser module shown in FIG. 2.

FIG. 8 is a block diagram showing the internal configuration of the Web Browser module 211 shown in FIG. 2. A protocol processing unit 801 establishes a connection with another network node via the HTTP module 212, and communicates with the network node. In communication, the protocol processing unit 801 issues an HTTP request to a resource described by the URL, and receives the response. During this process, the protocol processing unit 801 encodes/decodes communication data in accordance with various encoding formats.

A contents parser 802 receives contents data in a presentation format such as HTML, XML, or XHTML from the protocol processing unit 801, and executes lexical analysis and syntax analysis to generate a parse tree.

A DOM establishment unit 803 receives the parse tree from the contents parser 802, and establishes a document object model (DOM) corresponding to the structure of contents data. Conventional HTML permits various grammatical omissions and includes various versions. In many cases, actually operated contents are neither well-formed nor valid. For this reason, the DOM establishment unit 803 infers a correct logical structure of grammatically invalid contents data, and tries to establish a valid DOM, similar to another general Web browser.

A DOM processing unit 804 holds and manages, in a memory, a DOM established by the DOM establishment unit 803 as a tree structure presenting the nesting relationship between objects. Various processes by the Web browser are implemented centrally using the DOM.

A layout engine 807 recursively determines a presentation in display of each object in accordance with the tree structure of objects held in the DOM processing unit 804, and as a result, obtains the layout of the entire document. The presentation in display of each object may be explicitly designated in a style sheet format such as Cascading Style Sheet (CSS) by a description embedded in a document or a description in another file linked from the document.

A style sheet parser 806 analyzes a style sheet associated with the document of contents.

The layout engine 807 determines a document layout by reflecting the analysis result of the style sheet.

In accordance with the document layout determined by the layout engine 807, a renderer 808 generates graphical user interface (GUI) data to be displayed on the LCD display unit 501 (FIG. 5). The generated GUI data is displayed on the LCD display unit 501 by the user interface (UI) 201.

An event processing unit 809 receives the event of an operation performed by the user to the touch panel sheet 502 or each key on the operation unit 112, and performs a process corresponding to the event. The event processing unit 809 also receives a state transition event of the apparatus, a job, or the like from the apparatus control API 218, and performs a process corresponding to the event. Event handlers corresponding to various events are registered for each object class and each object instance in the tree structure of a DOM managed by the DOM processing unit 804. In response to a generated event, the event processing unit 809 determines, among objects managed by the DOM processing unit 804, an object which takes charge of processes of the event. Then, the event processing unit 809 distributes the event. If the object receives the distributed event, it executes various processes in accordance with the algorithm of an event handler corresponding to the event. Processes of the event handler include update of a DOM held by the DOM processing unit 804, a redrawing instruction to the layout engine 807, an instruction to issue an HTTP request to the DOM processing unit 804, and control of the function of the image processing apparatus by calling the apparatus control API 218.

A script interpreter 805 interprets and executes a script such as Java® Script (ECMA Script). The script is embedded in a document or described in another file linked from a document, and performs an operation to the DOM or the like. The contents provider can program the dynamic behavior of a provided document by the script.

Figure 9:
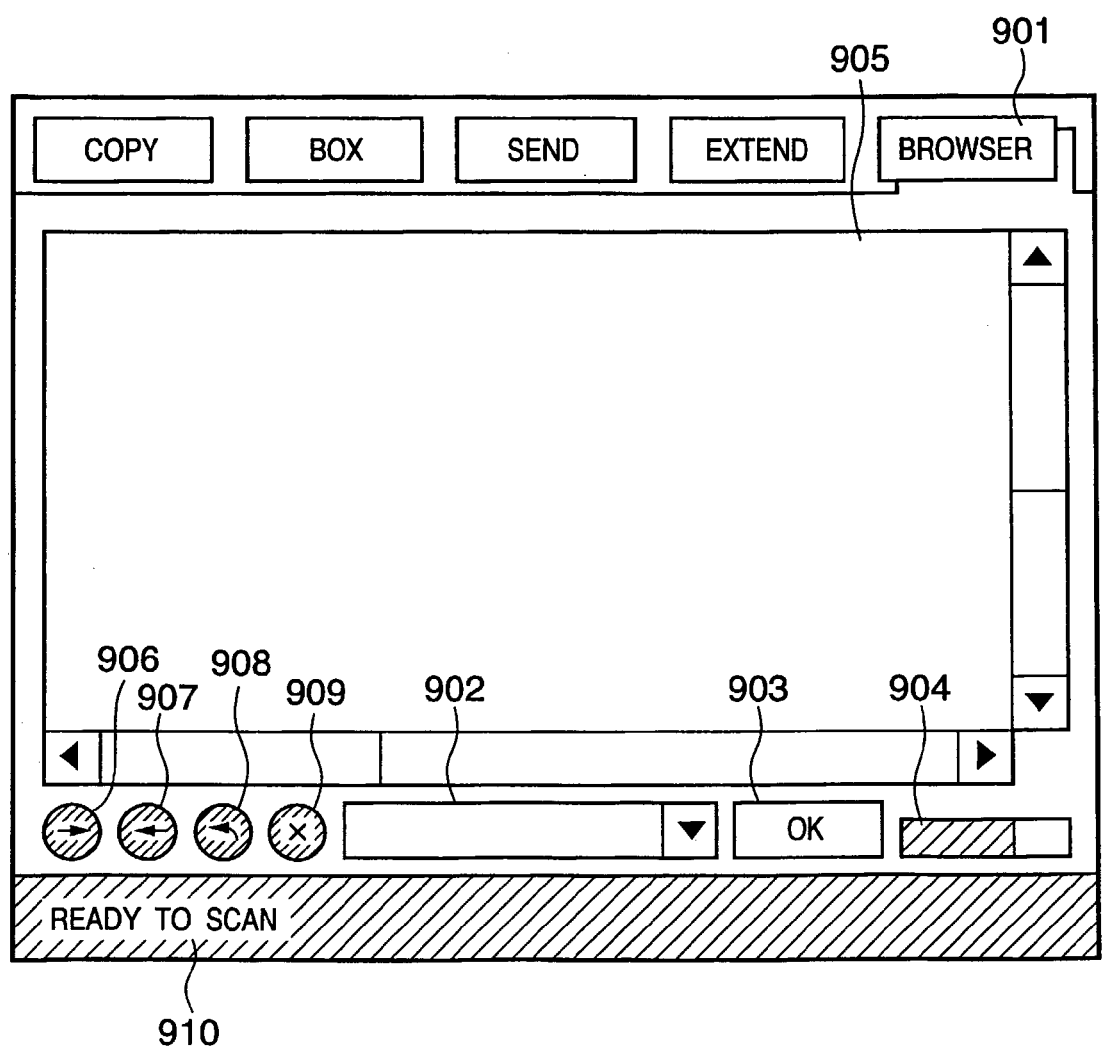
FIG. 9 is a view showing the layout of a window displayed when the Web browser function is selected on an LCD display unit shown in FIG. 5.

FIG. 9 is a view showing the layout of a window displayed when the Web browser function is selected on the LCD display unit 501 shown in FIG. 5. A tab 901 is used to select the Web browser function. By selecting this tab, the window of another function (copy, box, send, or extend) is switched to the display window of the Web browser function. A URL input field 902 is used to input the URL of a desired resource by the user. When the user touches this field, a virtual full keyboard (not shown) for inputting characters is displayed. The user can input a desired character string with soft keys which are arranged on the virtual full keyboard and imitate keytops.

An OK button 903 is a soft key for finalizing a URL character string input to the URL input field 902. After the URL is finalized, the Web Browser module 211 issues an HTTP request to acquire the resource. A progress bar 904 represents the progress of a contents acquisition process in response to the HTTP request. A contents display area 905 displays an acquired resource.

A return button 906 is a soft key used to trace back the history of contents display and display again contents which have been displayed before the currently displayed contents. A Next button 907 is a soft key used to, when contents are displayed while the history of contents display is traced back, return to display of contents displayed after the currently displayed contents. A reload button 908 is a soft key used to acquire and display again the currently displayed contents. A stop button 909 is a soft key used to stop a contents acquisition process in progress.

A status area 910 (bottom 703) displays messages from various functions of the image processing apparatus 110. Even while the Web browser window is displayed, a message which is sent from the scanner 113, printer 114, or another function and draws user's attention is displayed in the status area 910. Similarly, a message from the Web browser function is also displayed in the status area 910. The Web browser function sends the URL character string of a link destination, the title character string of contents, a message designated by a script, and the like.

(Detailed Description of Box Function)

The box function as one of embedded applications will be explained. The box function is an application corresponding to document file management. The box function has a function of accumulating, in the internal hard disk of the image processing apparatus, an image read by a reading apparatus, an image obtained by expanding PDL data sent from a computer, an image received by FAX or E-mail, and the like, printing out the accumulated images, transmitting the images by E-mail or FAX, and browsing the images. The box function also has a document editing function of combining a plurality of documents, deleting some pages, and inserting a document into another document.

Boxes include a user box for accumulating an image read by a reading apparatus and an image obtained by expanding PDL data sent from a computer, a memory reception box for accumulating a received document, and a FAX box for accumulating a transfer-designated document.

The user box is divided into 100 areas, which can be uniquely identified by box numbers 0 to 99. The box can be given an arbitrary name.

Figure 11:
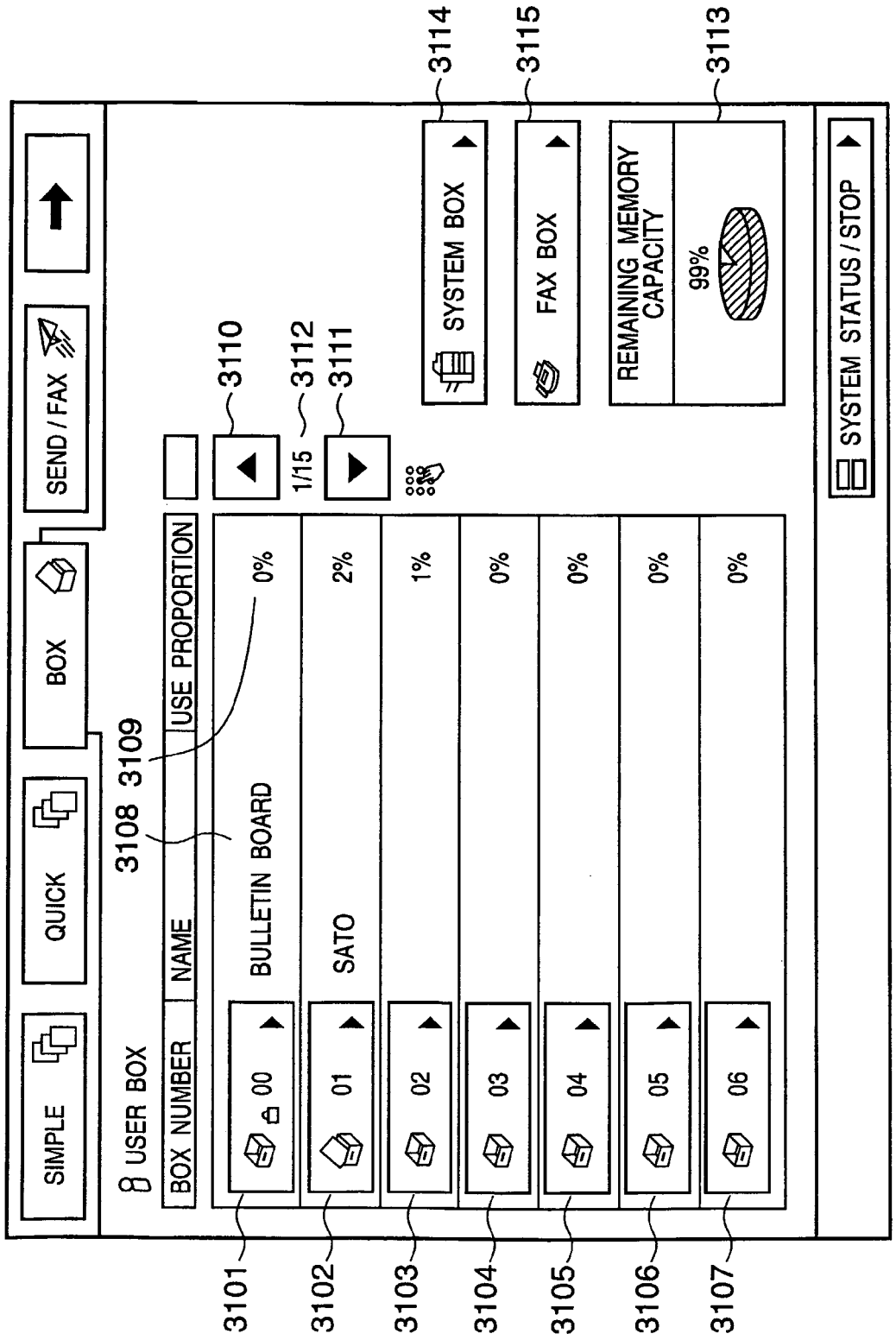
FIG. 11 is a view showing the main window of a box function displayed on the operation unit of the image processing apparatus.

FIG. 11 shows the main window of the box function displayed on the operation unit of the image processing apparatus. Buttons 3101, 3102, 3103, 3104, 3105, 3106, and 3107 display the contents of boxes of box numbers 0 1, 2, 3, 4, 5, and 6. When image data are accumulated in corresponding boxes, these buttons are displayed with the images 3102 and 3103 representing that a document is saved in the box. Boxes in which no image data is accumulated are displayed with the images 3101, 3104, 3105, 3106, and 3107. With these images, the user can recognize which box holds image data. When a password is set for a box, the icon 3101 of the key mark is displayed.

A name display area 3108 displays a name assigned to a box. A use proportion display area 3109 displays a proportion at which a box uses a hard disk capacity assigned to a box area.

When up and down scroll keys 3110 and 3111 are pressed, the window is scrolled to display information on a box not displayed in the window. For example, when the down scroll key 3111 is pressed in the state of FIG. 11, the window changes to display information on boxes 7 to 13. A figure 3112 represents the number of the currently displayed window in all windows. A remaining memory capacity display area 3113 represents the remaining storage capacity of the image processing apparatus. A memory reception box 3114 and FAX box 3115 are buttons used to change to corresponding windows.

A box content display window (FIG. 12) will be explained. The box content display window displays information on a document accumulated in each box. This window is called by pressing the box content display buttons 3101 to 3107. Also by designating a box number with a ten-key pad on the operation unit, the box content display window of a corresponding box is called.

A box information display area 3201 displays a box number and box name. A document count display area 3202 displays the number of documents accumulated in the box. A document list area 3203 displays documents accumulated in the box, and one line displays information on one document. The displayed document information includes the type, the document name, the paper size, the number of pages, and the accumulation time. When each line is touched, it is selected to change its display color. When another line is touched, the display color of the previously selected line returns to the original one. Lines are assigned with numbers of 1, 2, . . . in the order of selection. When the line of a numbered document is touched again, the selection state is canceled. The numbers of selected documents assigned with numbers larger than one assigned to a canceled document are incremented by one. For example, when three documents are selected and selection of a document assigned with number 1 is canceled, a document with number 2 is reassigned with number 1, and a document with number 3 is reassigned with number 2.

A selection cancel key 3204 is used to cancel the selection state of all selected data.

A detailed information key 3205 is used to display detailed information of a document. When this key is pressed, more detailed information of a document whose display color changes is displayed.

An erase key 3206 is used to erase a selected document from the box. When this key is pressed, a dialog for prompting the user to confirm whether to actually erase the document is displayed. Image data to which "OK" is pressed is erased from the box. If "cancel" is pressed, the dialog returns to the box content display window (FIG. 12) without erasing the image data.

An image data move/copy key 3207 is used to move/copy a selected document to another box. When this key is pressed, a move instruction window (not shown) is displayed. In the move instruction window, the user is prompted to select the moving destination, and move/copy is executed.

A print key 3208 is used to print a selected document. When this key is pressed, a print window (not shown) is displayed. In the print window, the number of print sheets, paper, sort method, application, and the like are set to print out a selected document.

A send key 3209 is used to send a selected document. When this key is pressed, a send setting window (not shown) is displayed. In the send window, the sending destination, file format, document name in sending, and the like are set to send a selected document.

An editing menu key 3210 is used to perform various operations such as image display, combine & store, document insertion, and page erase for a document.

A document scan key 3211 is used to scan a document and store image data in the box.

A close key 3212 is used to return to a main window 31 of the box function.

Figure 13:
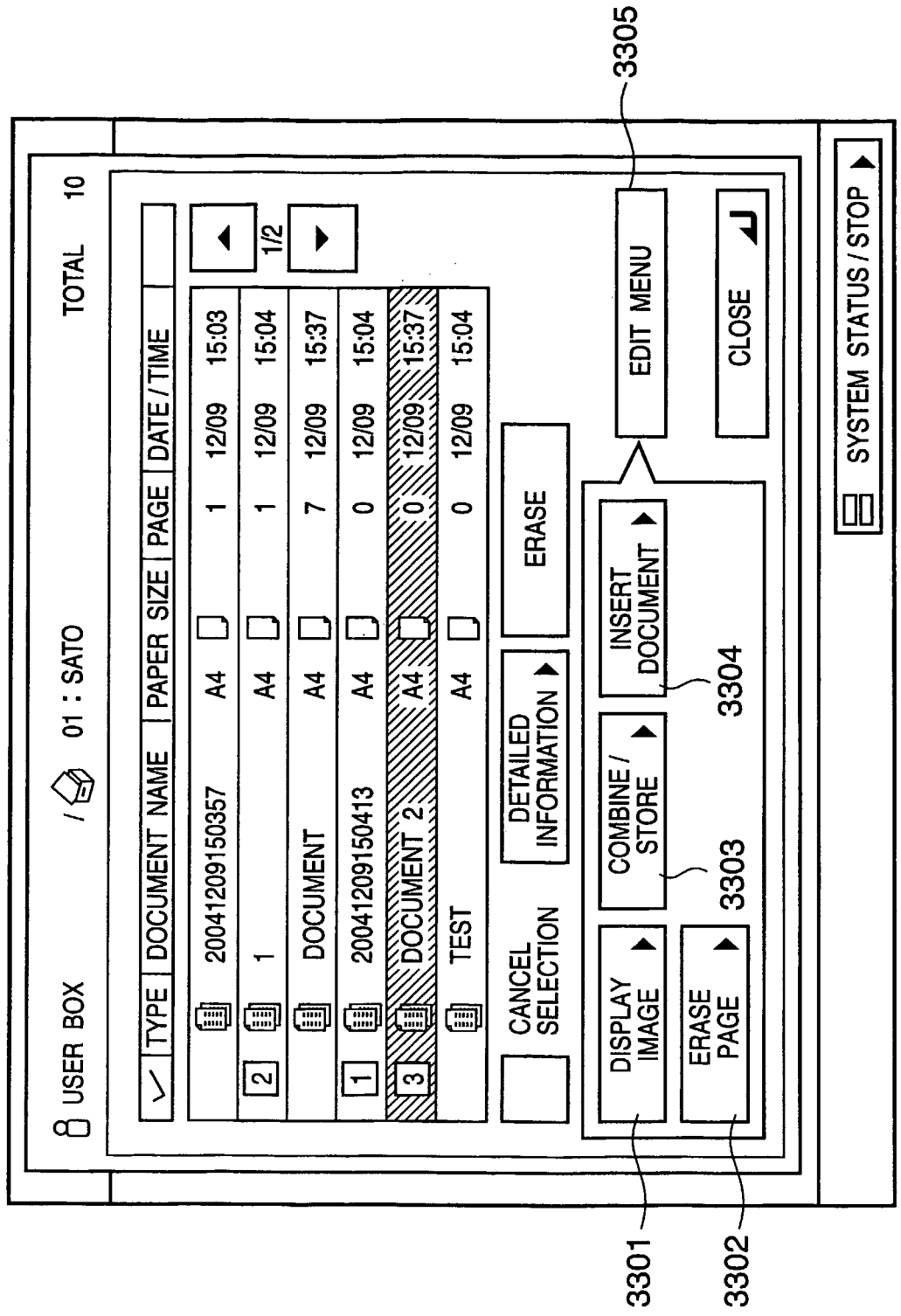
FIG. 13 is a view showing an example of an editing menu window.

An editing menu window (FIG. 13) displayed when the editing menu key 3210 is pressed will be explained.

Figure 12:
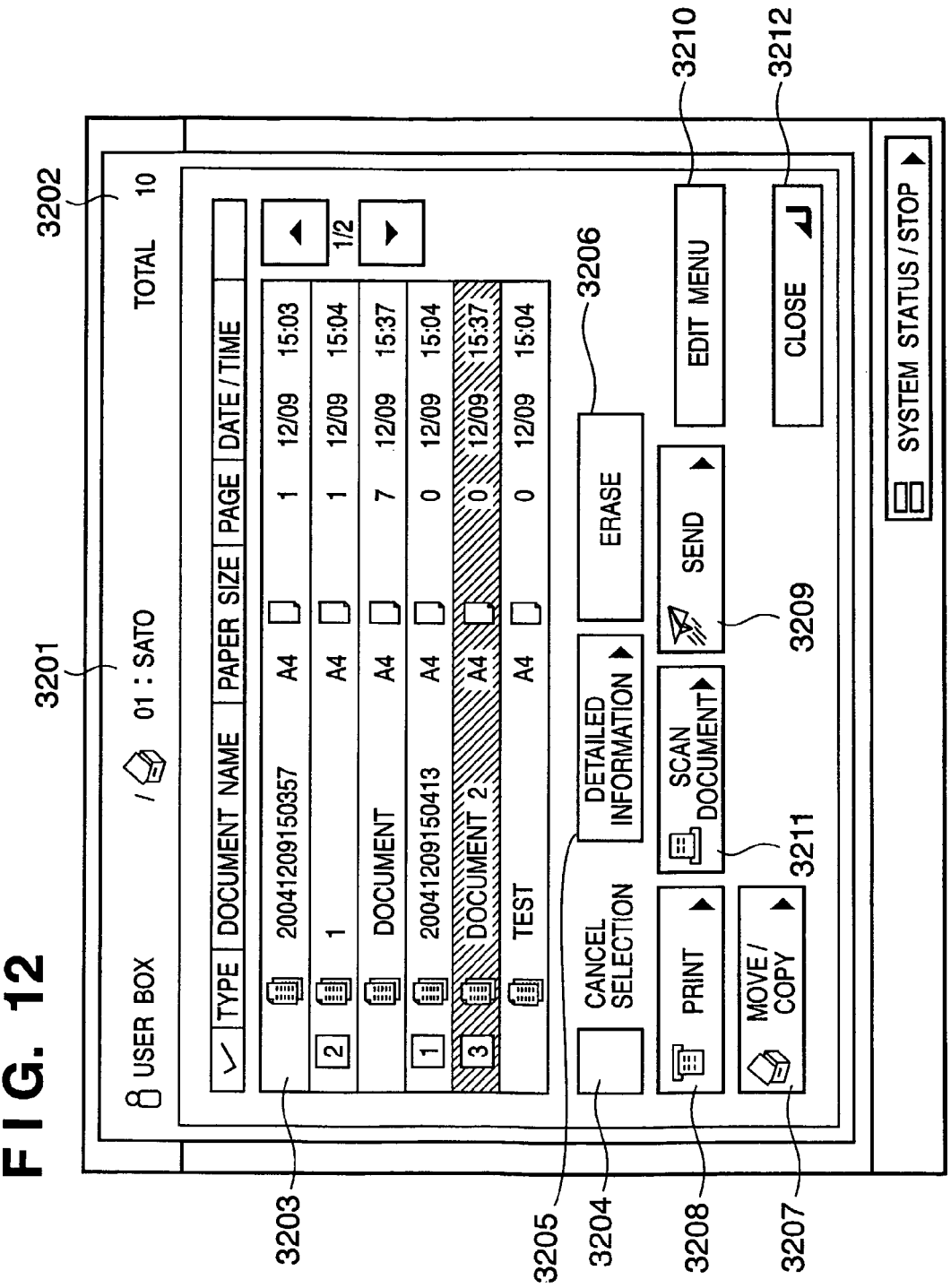
FIG. 12 is a view showing an example of a box content display window.

An image display key 3301 is used to display the image of a selected document. By using this function, the user can confirm the contents of an image. A page erase key 3302 is used to designate and erase an arbitrary page of a selected document. A combine/store key 3303 is used to create a new document by combining a plurality of documents. A document insertion key 3304 is used to insert a document into an arbitrary page of another arbitrary document. When an editing menu key 3305 is pressed, the window returns to the box content display window (FIG. 12).

Figure 14:
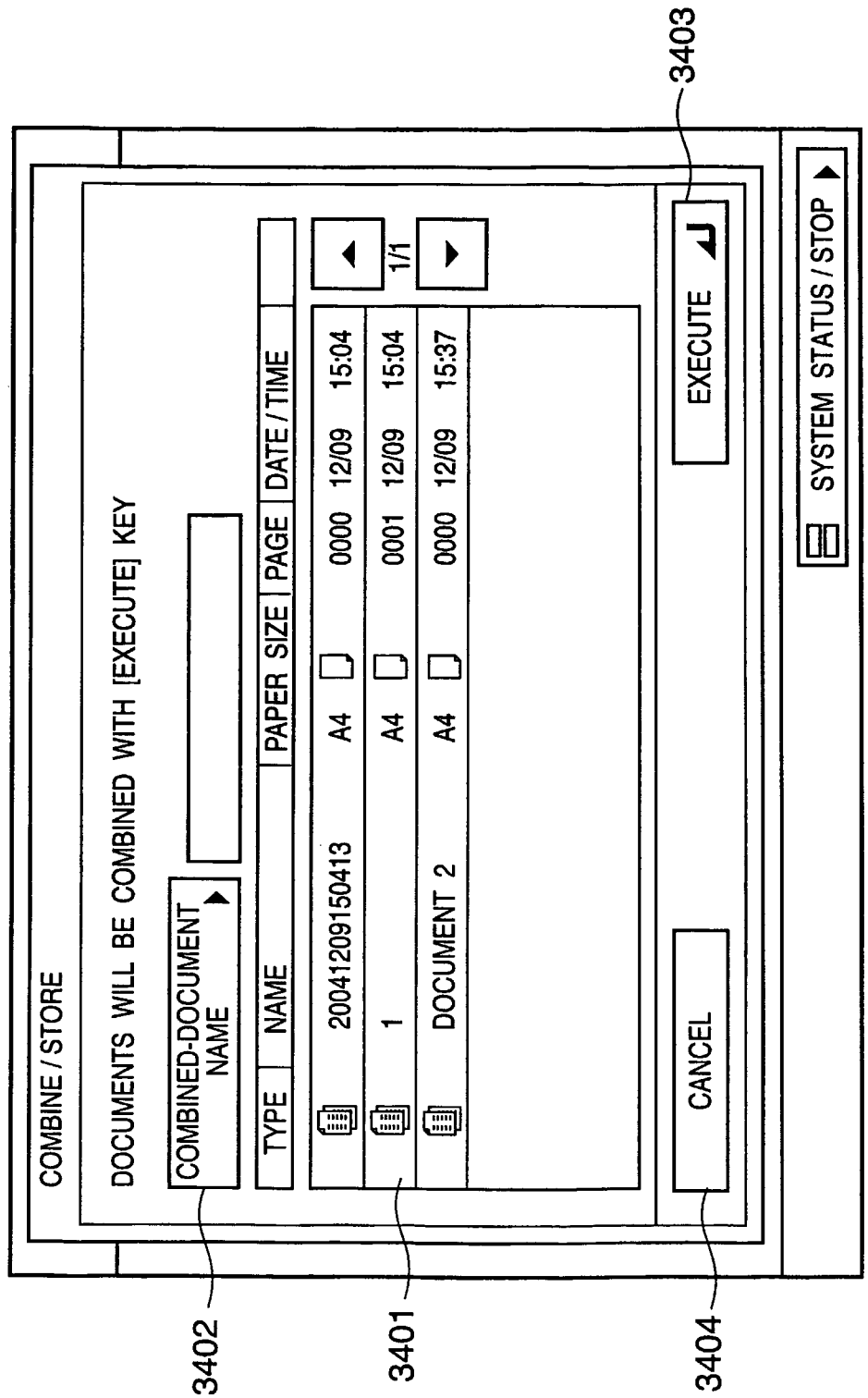
FIG. 14 is a view showing an example of a combine/store window.

A combine/store window (FIG. 14) displayed when the combine/store key 3303 is pressed will be explained. A combination target document display area 3401 displays a list of documents selected in the box content display window (FIG. 12). A combined-document name setting key 3402 is used to set the document name of a new document generated after combination. When this key is pressed, a keyboard window (not shown) is displayed. A document name input from the keyboard window by the user is set as the document name of a newly created document. If the user does not set any combined-document name, a document name is automatically generated on the basis of the operation time, and set as the document of the combined document. An execution key 3403 is used to execute the document combination process of combining target documents to create a new document. A cancel key 3404 is used to return to the box content display window (FIG. 12) without combining documents.

A document scan window (FIG. 15) displayed when the document scan key 3211 is pressed will be explained. Various settings are made in this window, and when the start key is pressed, a document is scanned to store image data in the box. A setting display area 3501 displays a currently set copy ratio and read size. An equal magnification key 3502 is used to set the read ratio to 100%. A copy ratio setting key 3503 is pressed to enter a mode in which the read ratio is set. A read size key 3504 is used to set the read size. A key 3505 is used to read a double-sided document. A key 3506 is used to set the read density. An application mode key 3507 is used to change to an application mode in which complicated settings such as the reduction layout, facing-page reading, and booklet reading are made. A key 3508 is used to cancel various settings and restore default settings. When a document name setting key 3509 is pressed, a keyboard window (not shown) is displayed. A document name input from the keyboard window by the user is set as the document name of a scanned document. If the user does not set any document name, a document name is automatically generated on the basis of the time when the scanning operation was performed. When a document explanation input key 3510 is pressed, a document explanation input window (FIG. 16) is displayed. A cancel key 3511 is used to return to the box content display window (FIG. 12) without scanning any document.

Figure 15:
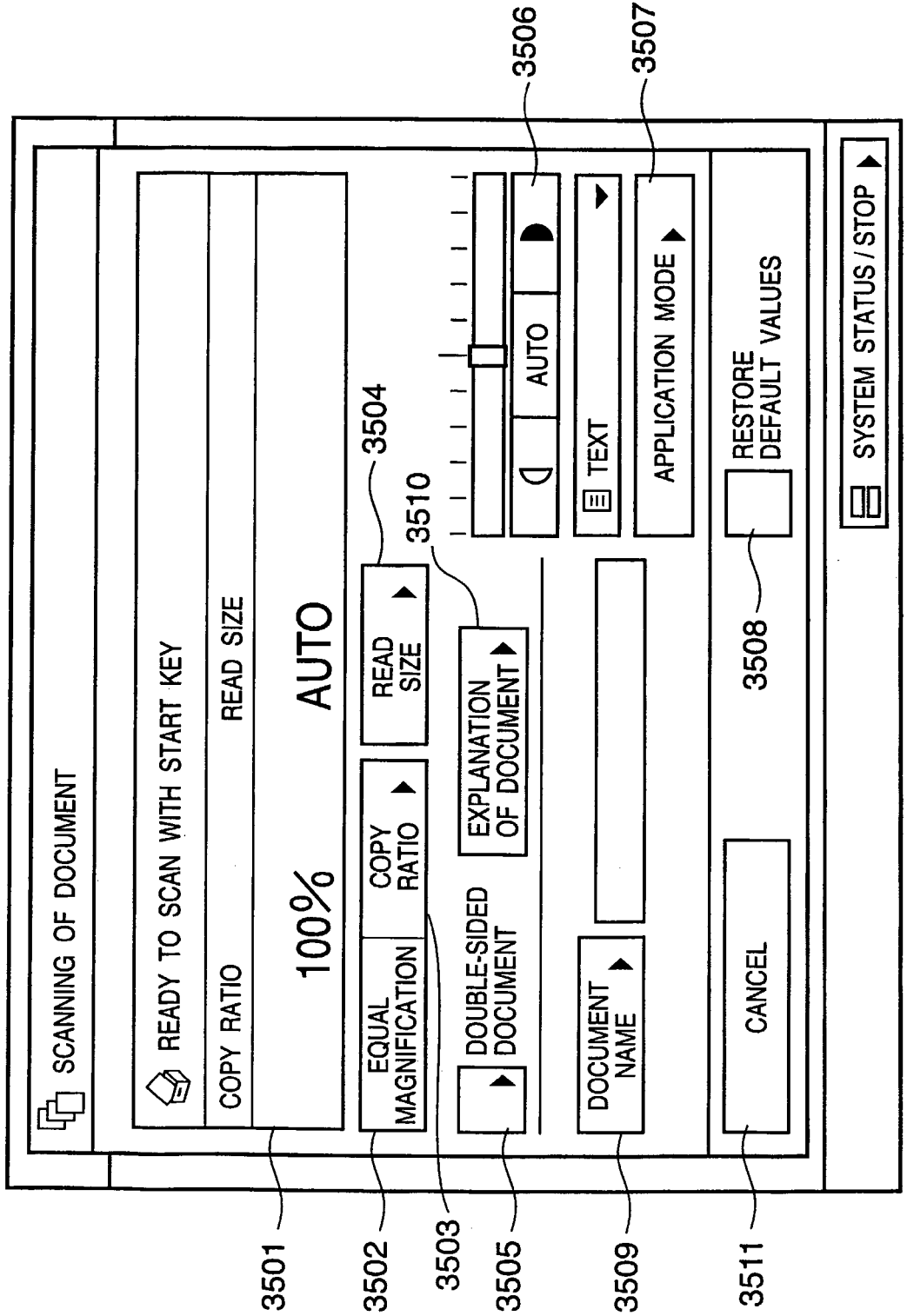
FIG. 15 is a view showing an example of a document scan window.
Figure 16:
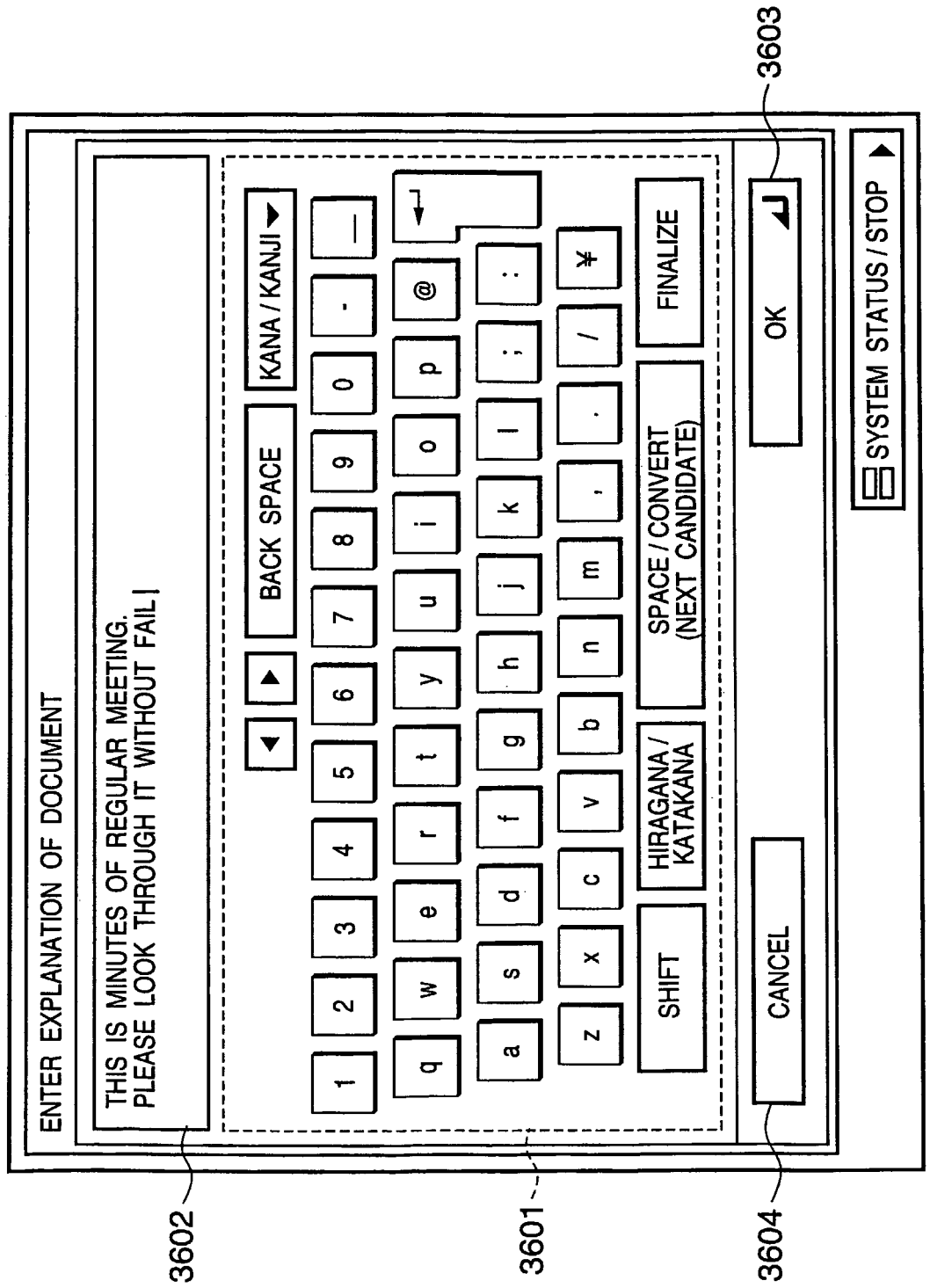
FIG. 16 is a view showing an example of a document explanation input window.

The document explanation input window (FIG. 16) will be explained. An input keyboard area 3601 is used to input a text corresponding to each key and perform a conversion process. An input text display area 3602 displays a text input by the user. In the example of FIG. 16, an explanation "this is the minutes of a regular meeting. Please look through it without fail." is input. An OK key 3603 is used to finalize an input document name. A cancel key 3604 is used to cancel input of a document explanation and return to the document scan window (FIG. 15).

(Detailed Description of Remote UI of Box Function)

The image processing apparatus also provides a Web application implemented using the markup language (e.g., HTML) and the Web technique (HTTP). The user can remote-control the image processing apparatus by connecting the Web application from a Web browser running on a client PC or the like. The presentation layer of an embedded application installed as the Web application will be called a remote UI.

Figure 17:
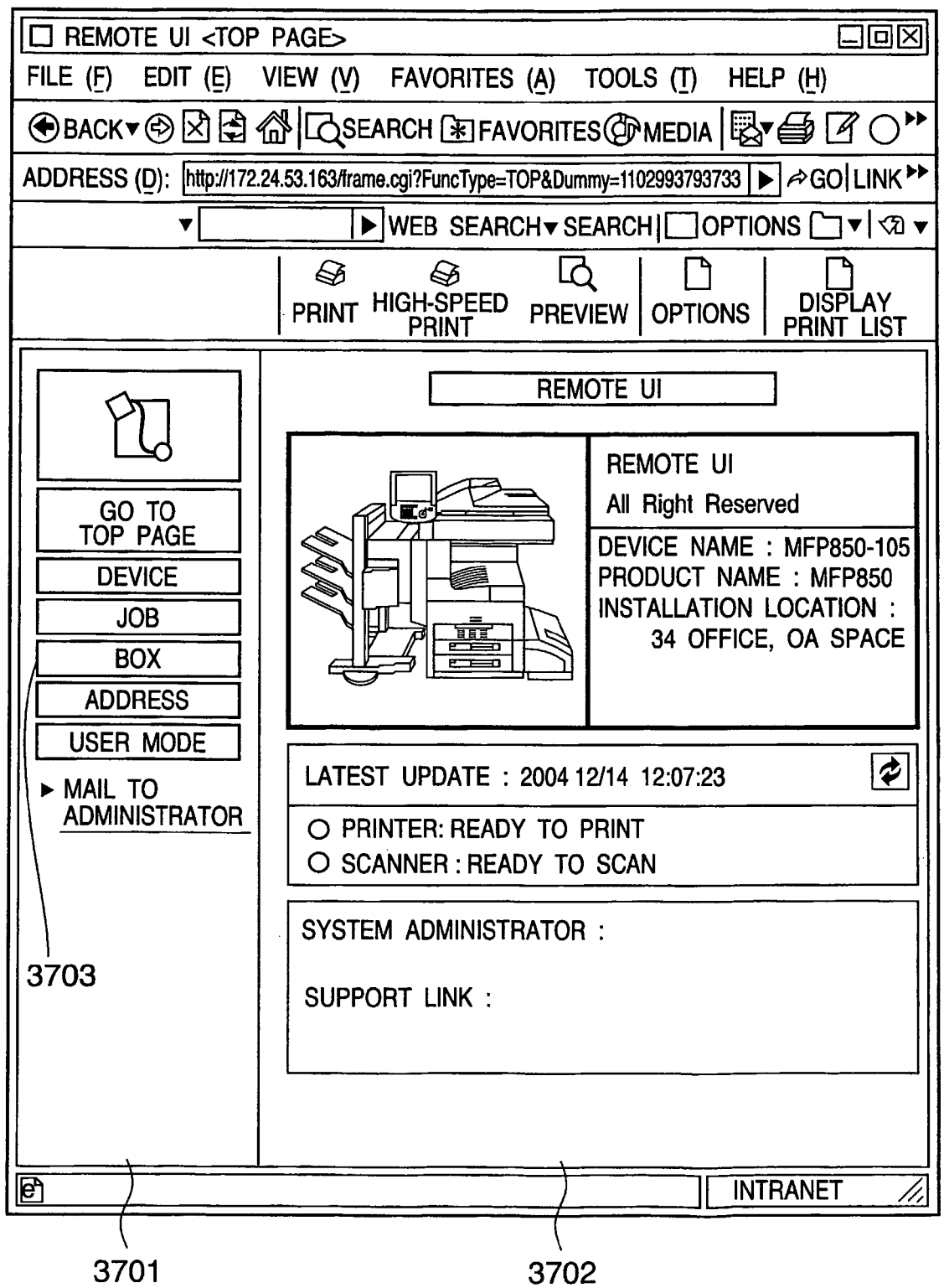
FIG. 17 is a view showing an example of the top page of a remote UI.

An example of a window when the box function is operated via the remote UI will be explained. When the URL (or IP address) of the image processing apparatus is designated and connected using the Web browser, the top page of the remote UI as shown in FIG. 17 is displayed on the window of the Web browser. Each RUI page is divided into a menu area 3701 and main area 3702. The menu area 3701 displays buttons for linking functions provided by the remote UI. The main area 3702 of the top page displays a message representing the status of the image processing apparatus, the image of the image processing apparatus, and the like. When a box button 3703 in the menu area is pressed (clicked), a box page as shown in FIG. 18 is displayed.

The box page allows selecting a box type to be displayed (user box, system box, or FAX box) from a submenu displayed in the menu area. A list of selected boxes is displayed in the main area. FIG. 18 shows a state in which user boxes are selected, and a list of user boxes is displayed in the main area. For each user box, a box number 3801, a box name 3802, a proportion 3803 (to be referred to as a box proportion) of a boxed document image in an HDD area assigned to store the boxed document image are displayed. The box number 3801 serves as a link text, and a desired link text is selected in the Web browser to display a list of pages of a document in a box.

Figure 18:
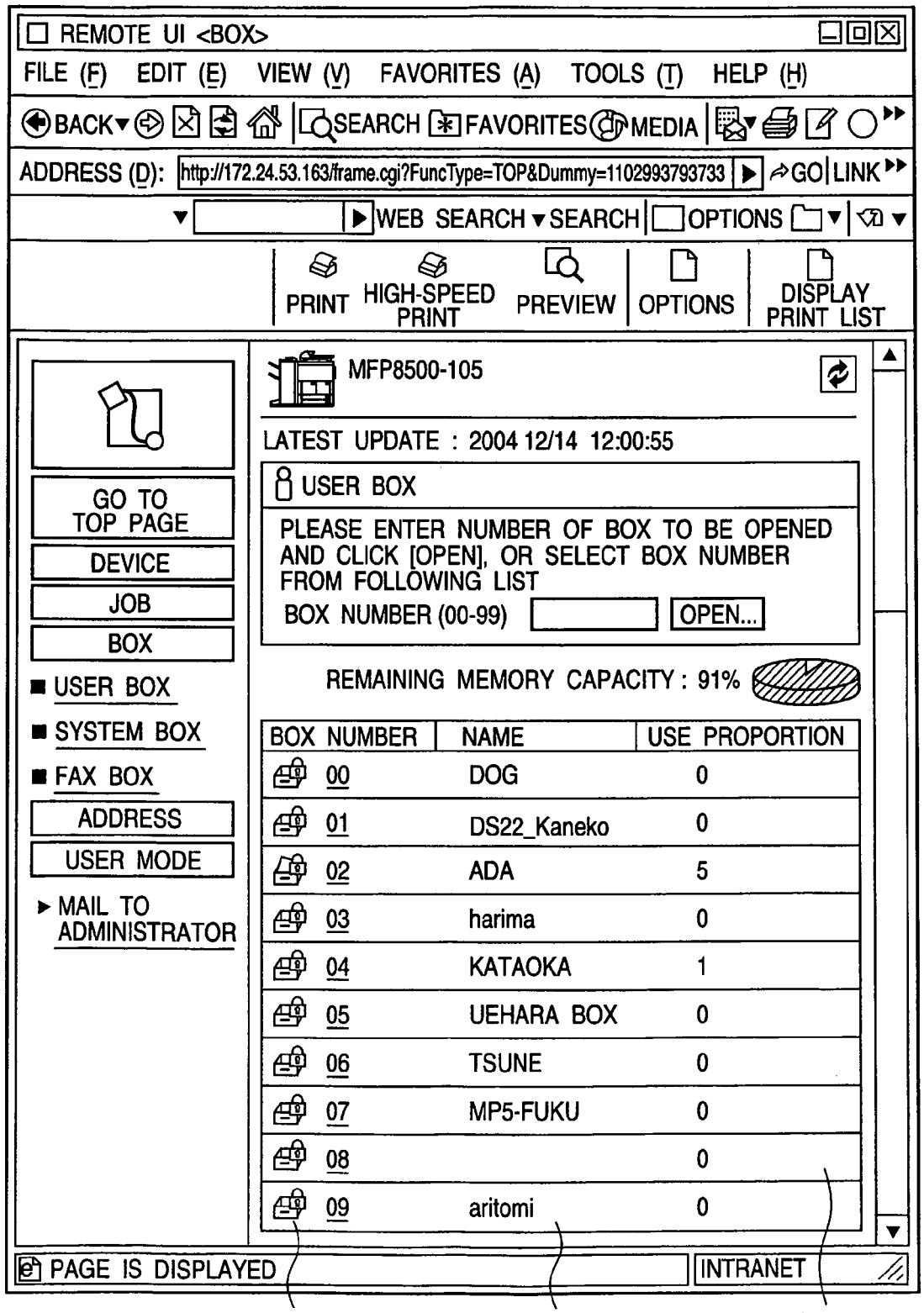
FIG. 18 is a view showing an example of the box page of the remote UI.
Figure 19:
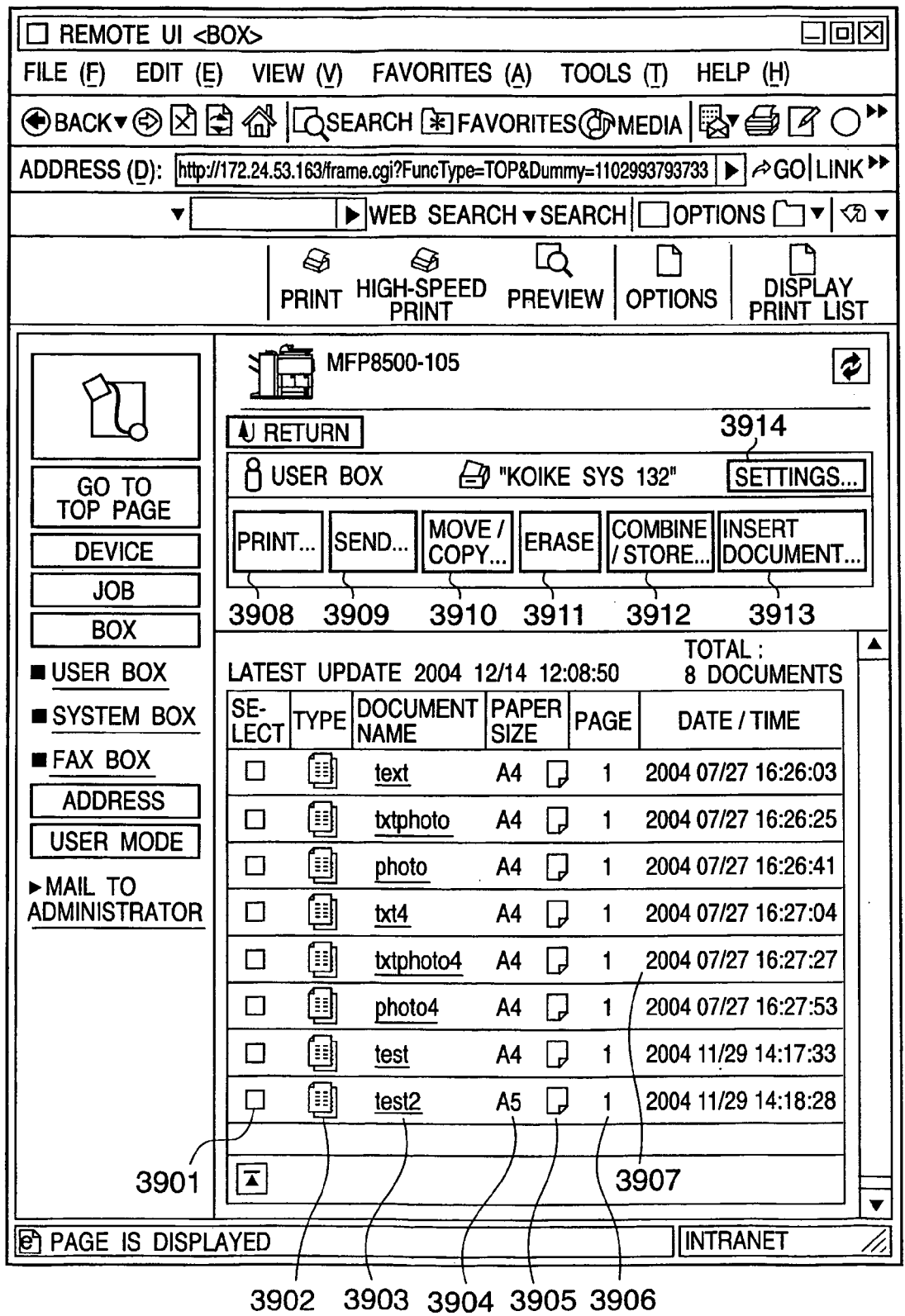
FIG. 19 is a view showing an example of a page of a list of documents in a box.

FIG. 19 is a view showing an example of a boxed document list page displayed when a box number link text is selected in the page of FIG. 18.

The main area displays a list of boxed document images contained in a designated box. For each document image, a selection check box 3901, document image type 3902, document image name 3903, document image size 3904, document image icon 3905, document image page count 3906, and final update date & time 3907 are displayed. The document image type 3902 represents whether image data is "image data obtained by the scanner" or "image data which is obtained by expanding an image in response to a received PDL print request (without printing the image), and is stored in the box". If a given selection check box 3901 is checked and one of instruction buttons 3908 to 3913 is clicked, a selected document undergoes a designated process.

When the print button 3908 is clicked, the window shifts to a print setting window (not shown). In the print setting window, the number of print sheets, paper feed cassette, double-sided designation, sort designation column, and the like can be set to issue a print instruction.

When the send button 3909 is clicked, the window shifts to a send setting window (not shown). In the send setting window, the sending destination, file format, document name in sending, and the like can be set to issue an instruction to send a selected document.

Figure 20:
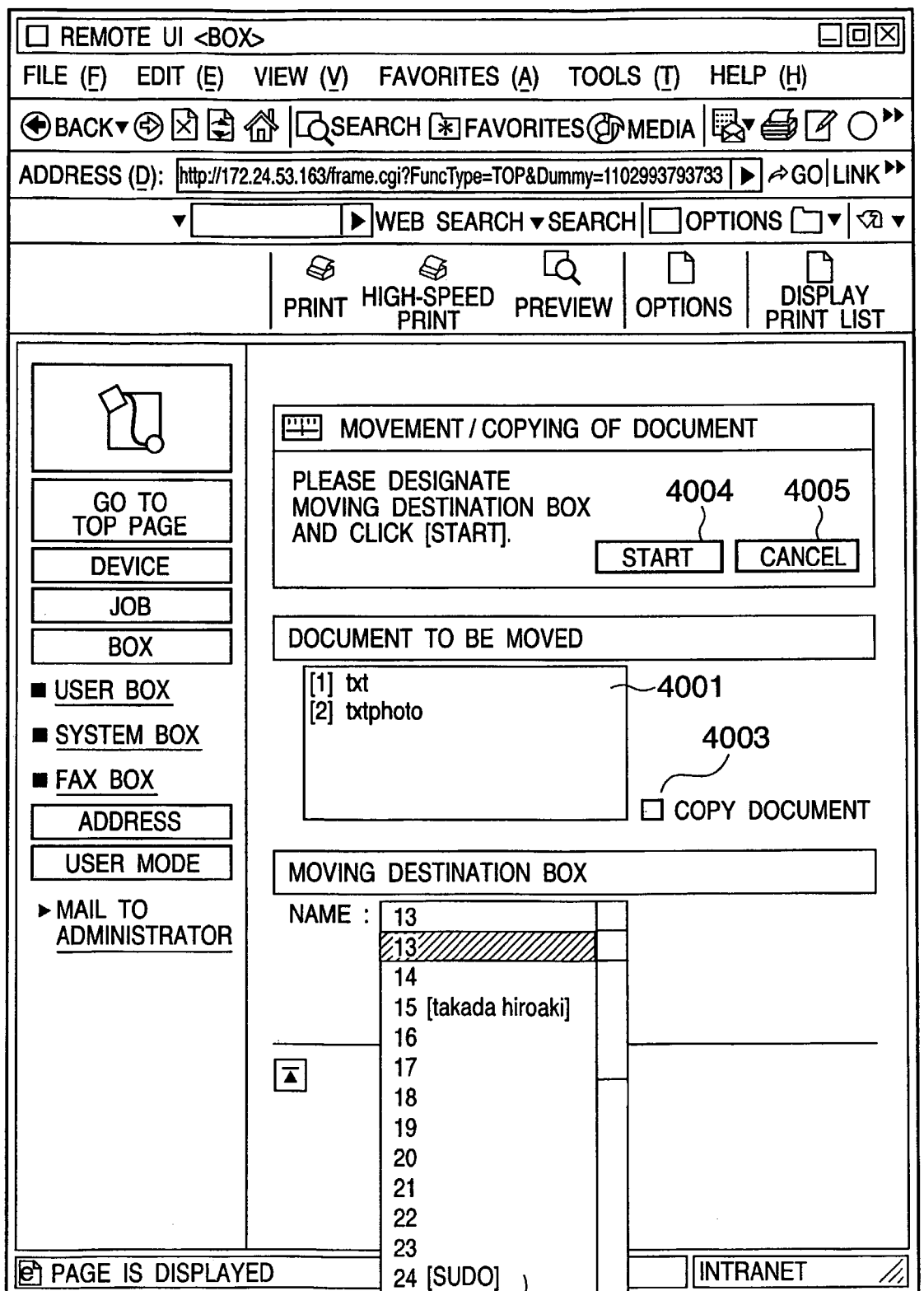
FIG. 20 is a view showing an example of a boxed document move window.

When the move/copy button 3910 is clicked, the window shifts to a boxed document move window as shown in FIG. 20. A selected document list 4001 in FIG. 20 displays selected documents. When a moving description box is selected from a moving description box selection column 4002 and a start button 4004 is pressed, a selected document is moved. If a check box 4003 is checked, a selected document is not moved but is copied. A cancel button 4005 is used to return to a boxed document display window shown in FIG. 19 without moving any document.

Figure 21:
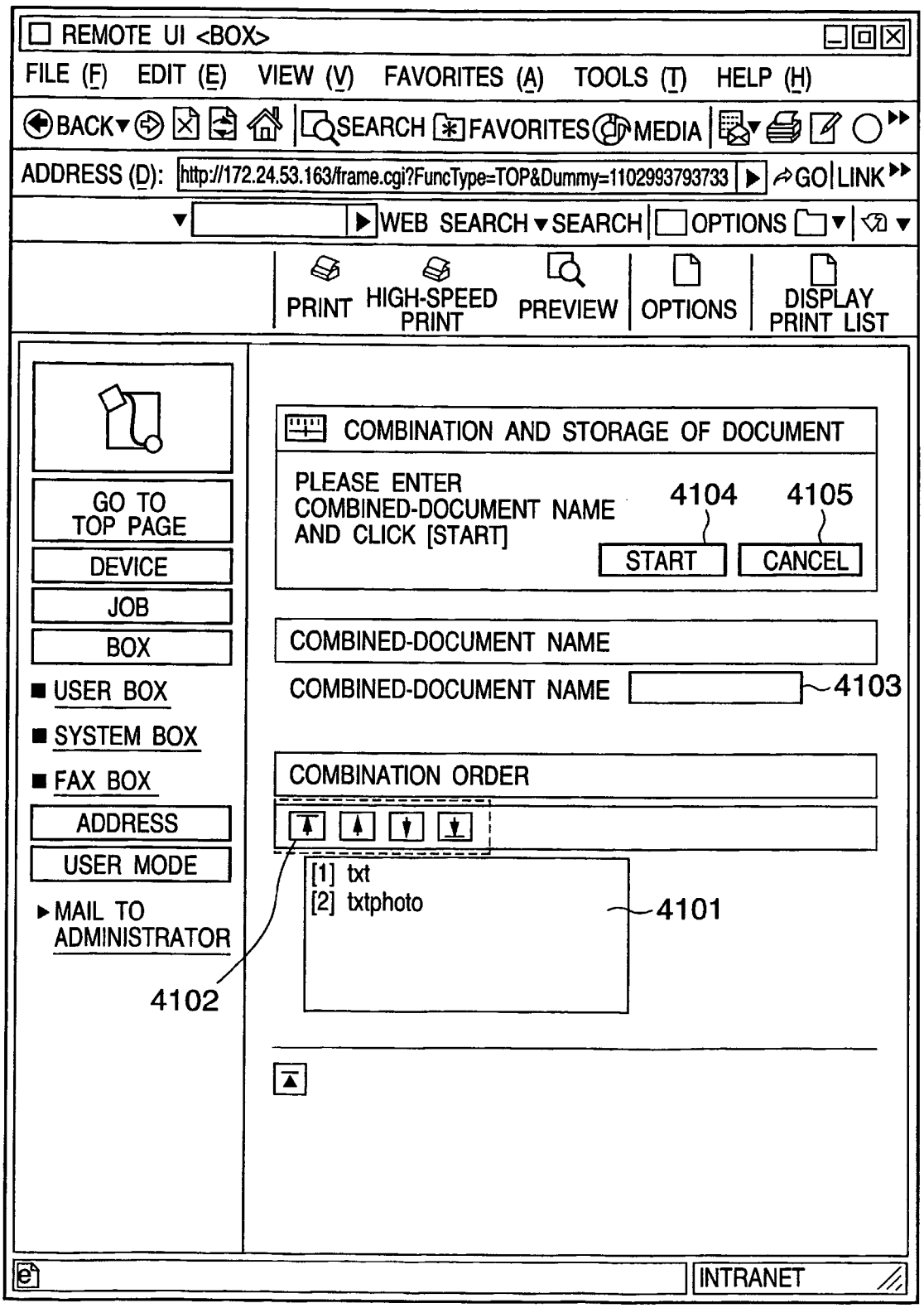
FIG. 21 is a view showing an example of a document combine/store window.

When the combine/store button 3912 is clicked, the window shifts to a combine/store window shown in FIG. 21. A document display area 4101 displays a document with a check mark in the document list window. An order change button 4102 is used to change the order to combine target documents. A document name input area 4103 is used to designate the document name of a document created by combination. When a start button 4104 is pressed, execution of a document combination process starts. When a cancel button 4105 is pressed, the window returns to the document display window (FIG. 19) without combining documents.

The document insertion button 3913 is used to create a new document by inserting a document into an arbitrary page.

When the erase button 3911 is clicked, a confirmation window is displayed to request confirmation of the user and erase a selected document.

The document image name 3903 in FIG. 19 serves as a link text, and when the link text is selected on the Web browser, a detailed boxed document page is displayed.

A setting button 3914 is used to display a setting window for setting the box name and password of a box, the time until a document is automatically erased, and the like. When a box having a password is to be opened in the window of FIG. 18, a window (not shown) to confirm a password is displayed. If a correct password is input, the window shifts to the boxed document display window shown in FIG. 19; if no correct password is input, the contents of the box cannot be displayed.

(Generation and Supply of Feed Data of Box-Related Update Information)

Figure 22:
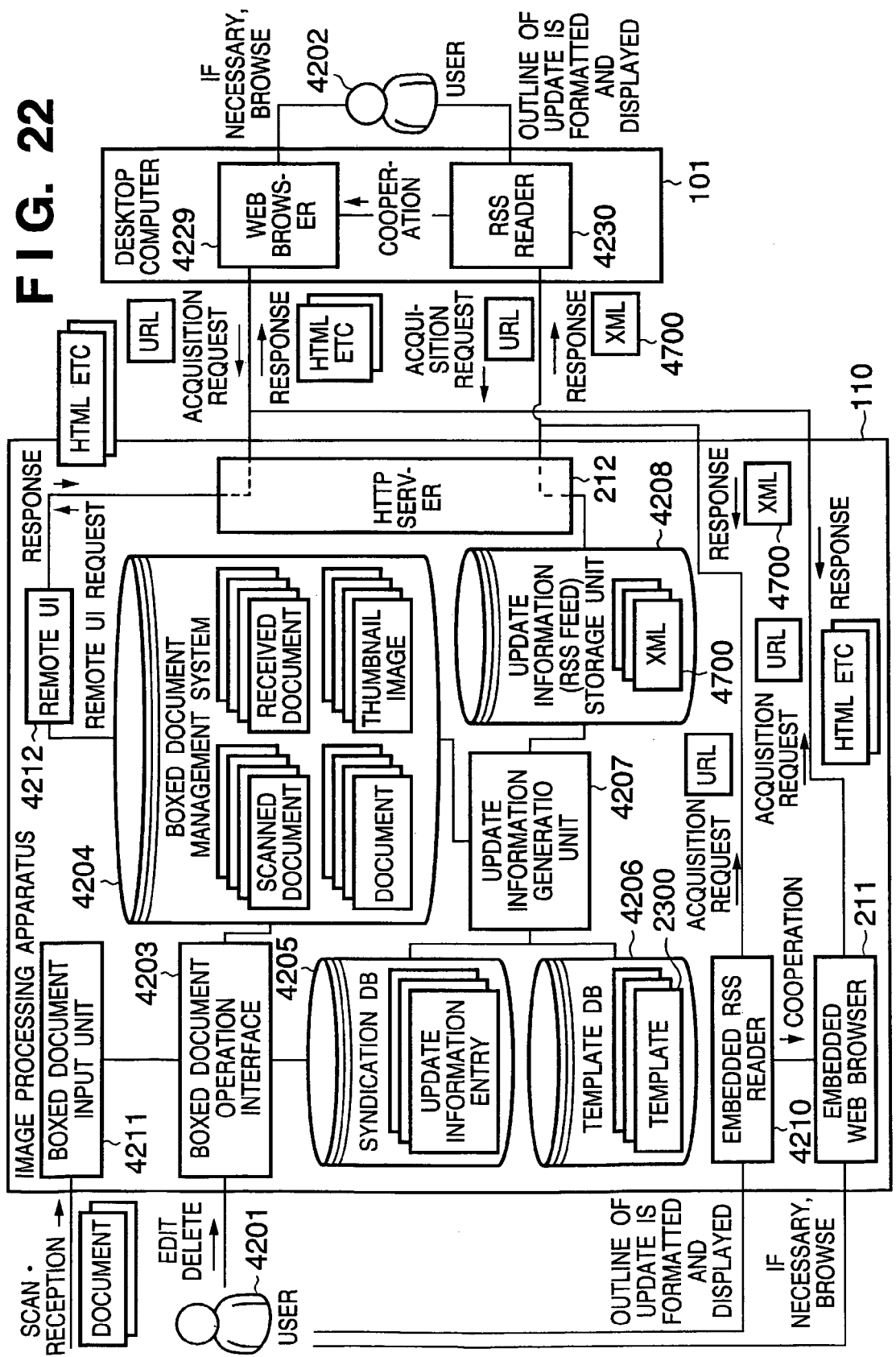
FIG. 22 is a block diagram showing a software structure for generating and supplying the RSS feed of box-related update information.

FIG. 22 is a block diagram showing a software structure for generating and supplying the RSS feed of box-related update information (to be simply referred to as update information hereinafter). A user 4201 operates a box, and performs operations such as addition, editing, and deletion of a document to the box function which is embedded in the image processing apparatus 110 and serves as a document management system. A document input unit 4211 inputs a document outside the apparatus into the image processing apparatus 110. The document input unit 4211 adds, as a document file to the box function, image pages which are loaded by operating the scanner of the image processing apparatus 110 by the user 4201. The document input unit 4211 also adds, as a document file to the box function, document data which is sent from a remote place to the image processing apparatus 110 by the communication protocol of the FAX, IFAX, E-mail, or the like.

The user 4201 accesses the same image processing apparatus 110 via an embedded RSS reader 4210 running on the image processing apparatus 110, and refers to box-related update information. The user 4201 accesses the same image processing apparatus 110 via an embedded Web browser 211 running on the image processing apparatus 110, and browses a resource and Web application provided by the image processing apparatus 110.

A software configuration for generating and supplying the RSS feed of box-related update information in the image processing apparatus 110 will be explained. A document operation interface 4203 provides an interface for operating the box function of the image processing apparatus 110. A boxed document management system 4204 is a database for the box function serving as the embedded document management system of the image processing apparatus 110. Data stored in the database include a scanned/loaded document file, a document file received by the communication function, a document file input by another input route such as generation by the PDL function, and the thumbnail image file of each document.

A syndication DB 4205 accumulates and manages data used to syndicate update information related to the box function of the image processing apparatus 110. The accumulated/ managed data include an update information entry which is generated while holding attribute information on an event every time an event of a change in box structure and documents accumulated in the box occurs.

A template DB 4206 accumulates and manages templates which provide XML file formats used for syndication. XML applications for syndication comply with respective RSS versions and the specifications of Atom and the like. A plurality of templates are prepared in accordance with types of information to be syndicated and pursuant specifications. An update information generation unit 4207 includes a template engine which generates, on the basis of templates accumulated and managed in the template DB 4206, an XML file used for syndication from data which are accumulated and managed in the syndication DB 4205, and attributes (e.g., the configuration and state of the image processing apparatus 110) obtained from an apparatus control class library 1106. The update information generation unit 4207 stores the generated XML file (syndication data file for RSS, Atom, or the like) in an update information (RSS) storage unit 4208.

The update information (RSS) storage unit 4208 accumulates an XML file used for syndication. The update information storage unit 4208 holds a plurality of different files in accordance with types of information to be syndicated. In accordance with the specifications of pursuant XML applications, the update information storage unit 4208 holds a plurality of files which are described in respective RSS versions and formats such as Atom. The update information storage unit 4208 is mounted as a file system which can be accessed by the HTTP server 212. The files of XML files accumulated in the update information storage unit 4208 are specified by unique URLs when viewed from HTTP clients connected to the HTTP server 212. When an HTTP client is connected to the HTTP server 212 and requests acquisition of a resource specified by a URL, the HTTP server 212 reads out, from the update information storage unit 4208, an XML file corresponding to the URL designated by the acquisition request, and transmits the XML file to the HTTP client.

In response to a request based on HTTP or HTTPS from an HTTP client, the HTTP server 212 transfers, as a response, data of various resources internally held in the image processing apparatus 110. Examples of the resource accessed by the client by HTTP are static data files (including XML files held in the update information image storage unit 4208) such as HTML files and image files which are hold in a nonvolatile memory (e.g., HDD 304) in the image processing apparatus 110, and data dynamically generated by a program executed by the CPU 301. Data dynamically generated in response to an HTTP request include HTML data which are generated by various Web applications such as a remote UI 4212.

The remote UI 4212 is a Web application provided by the image processing apparatus 110, and provides the same function as that of the document operation interface 4203 to a client such as a connected Web browser.

The embedded RSS reader 4210 is an embedded application program which acquires each RSS version and an XML format (e.g., Atom) for syndication, and formats and displays data. The display and operation are done on the operation unit 122 of the image processing apparatus 110. Most of news distribution sites, information providing sites, and Web sites (e.g., weblog or blog) present on the Internet provide syndication data in order to syndicate new articles of sites, in addition to contents of the sites. By using the RSS reader 4210, the user 4201 can efficiently browse the titles and contents of new articles of sites on the Internet. The RSS reader 4210 can access even syndication data not only on the Internet but also on an intranet as far as the data is laid open to the public as a resource which can be specified by a URI and acquired. A URI for identifying syndication data stored in the update information storage unit 4208 of the image processing apparatus 110 is designated to transmit an HTTP acquisition request from the RSS reader 4210 to the HTTP server 212. As a response from the HTTP server 212, the RSS reader 4210 can receive syndication data stored in the update information storage unit 4208. In some cases, syndication data which is formatted and displayed by the RSS reader 4210 contains a hyperlink specified by a URI. When the user 4201 selects a specific hyperlink on the display of the RSS reader 4210, the RSS reader 4210 causes the Web browser 211 to acquire and display the URI in cooperation with the embedded Web browser 211. Upon reception of a request from another embedded application by communication with an application in the image processing apparatus 110, the embedded RSS reader 4210 acquires syndication data of a URI designated by the request, and displays the syndication data on the operation unit 122 of the image processing apparatus 110.

The Web browser 211 acquires various resources provided in formats specifiable by URIs in Web servers on the Internet and an intranet, for example, document data of markup languages (e.g., HTML and XHTML) and various multimedia data (still image, moving image, and audio data). The Web browser 211 appropriately formats the data, and graphically displays the data or outputs the data by voice. Data is acquired mainly using a communication protocol such as HTTP or FTP. The Web browser 211 serves as a client of a client server model in terms of the communication protocol, and is regarded as, e.g., an HTTP client. When data browsed by the user 4201 contains a hyperlink specified by a URI and the user selects the anchor of the specific hyperlink, the Web browser 211 acquires and displays resources at the designated URI. By using the form of a markup document such as an HTML document, data may be posted from the Web browser 211 to a resource on the Web server side. The user 4201 can also use the Web browser 211 to issue an acquisition request by designating a URI for specifying the remote UI 4212 of the same image processing apparatus 110. The HTTP server 212 of the image processing apparatus 110 internally transfers the acquisition request to the remote UI 4212 via an interface such as CGI (Common Gateway Interface), and sends back, to the Web browser 211, a response such as HTML data generated as a process result by the remote UI 4212. Upon reception of a request from another embedded application by communication with an application in the image processing apparatus 110, the embedded Web browser 211 acquires the resource of a URI designated by the request, and displays the resource on the operation unit 122 of the image processing apparatus 110.

The software configuration in the desktop computer 101 will be explained. The image processing apparatus 110 and desktop computer 101 are connected via a network, and software programs running on the respective apparatuses communicate data with each other in accordance with a protocol such as HTTP or HTTPS. A user 4202 accesses the image processing apparatus 110 via an RSS reader 4230 running on the desktop computer 101, and refers to box-related update information. The user 4202 accesses the image processing apparatus 110 via a Web browser 4229 running on the desktop computer 101, and browses resources and Web applications provided by the image processing apparatus 110. The operation of the RSS reader 4230 is identical to that of the embedded RSS reader 4210, and the operation of the Web browser 4229 is identical to that of the embedded Web browser 211.

Note that the RSS reader 4210 and Web browser 211, and the RSS reader 4230 and Web browser 4229 are implemented as single application programs in the third embodiment, but the RSS reader 4210 and Web browser 211, or the RSS reader 4230 and Web browser 4229 may be implemented as a single application program having the functions of both the RSS reader and Web browser. The RSS reader 4230 and Web browser 211 run on the desktop computer 101 in the above description, but may run on various general purpose information processing apparatuses including a portable computer (e.g., PDA), in addition to the desktop computer. Alternatively, the RSS reader 4230 and Web browser 211 may run on various embedded apparatuses such as a cell phone. There is also widely known a technique of implementing distributed systems from combinations of front end Web browsers and back end Web applications (see, e.g., Bloglines). When a Web application which provides such an RSS reader function is used, the operation of the embedded RSS reader 4210 can be substituted by a combination of the embedded Web browser 211 and Web application. The Web application which provides the RSS reader function may run on an external server computer, or may be configured as one of Web applications running in the image processing apparatus 110, similar to the remote UI 4212. When a feed file to be acquired exists in the same image processing apparatus 110, the embedded RSS reader 4210 may directly read out the feed file from the update information storage unit 4208 without using any network communication.

Figure 10:
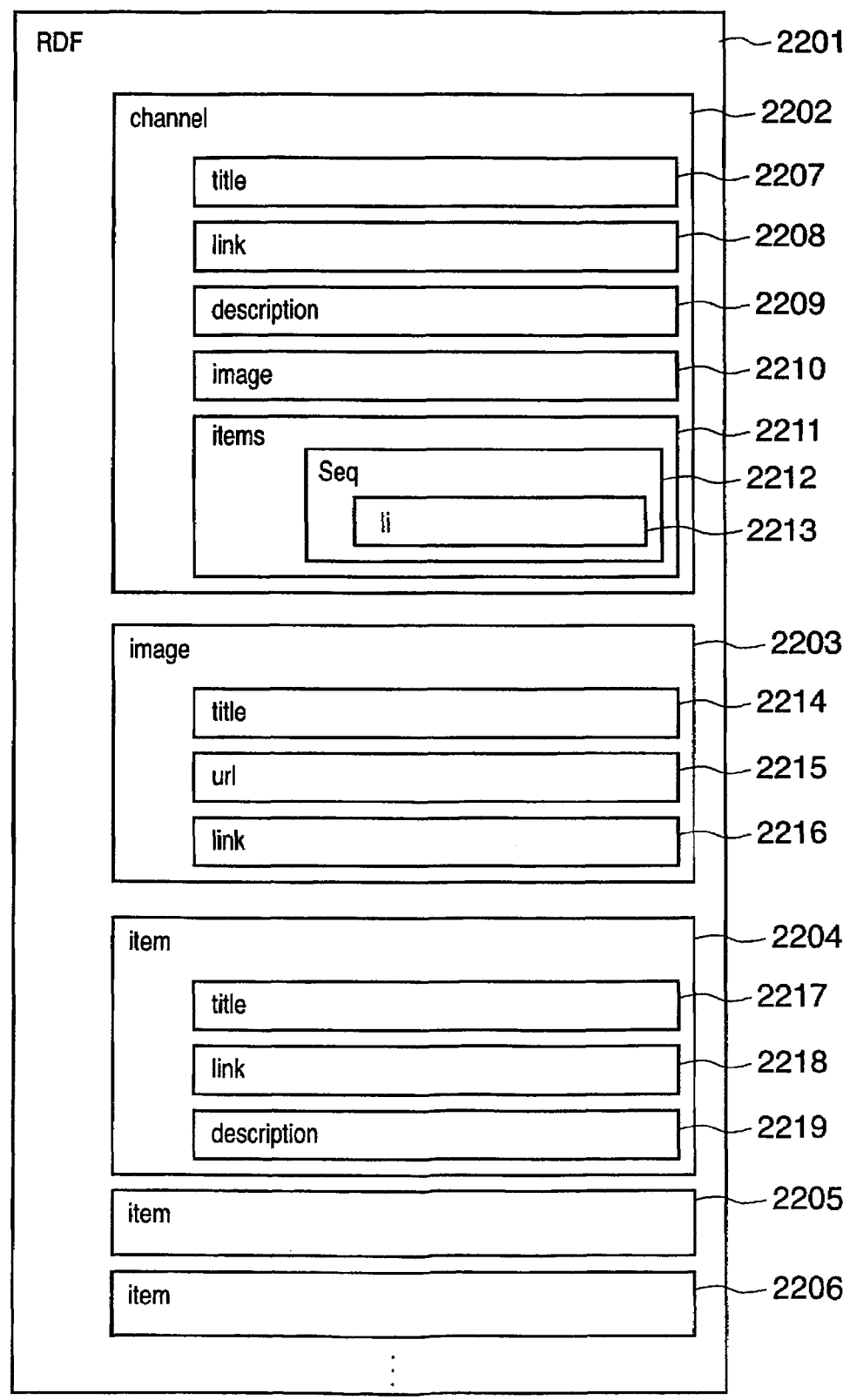
FIG. 10 is a view showing the structure of an example of an XML format used for syndication of update information of the image processing apparatus.

FIG. 10 is a view showing an example of an XML format (i.e., syndication data format) used for syndication of update information of the image processing apparatus. An XML file which is stored in the update information storage unit 4208 and specified by a URI is an XML document which describes information on update of various data associated with an embedded application of the image processing apparatus, and information on various events generated in association with the embedded application of the apparatus. A plurality of types of XML document formats are provided in correspondence with various formats which are used by a general Web site to distribute update information of the site. Although the image processing apparatus 110 supports respective RSS versions and XML formats such as Atom, a description by RSS 1.0 will be exemplified. In FIG. 10, the inclusion relationship of blocks means that of XML elements.

An RDF element 2201 is the top element of an XML document. The RDF element contains a channel element 2202, image element 2203, and item elements 2204, 2205, and 2206. The channel element 2202 describes basic information on the whole update information. This element corresponds to an RDF subject node. The contents of the channel element contain a title element 2207, link element 2208, description element 2209, image element 2210, and items element 2211. The title element 2207 represents the title of the update information. The link element 2208 represents the URI of a site treated by the update information. The description element 2209 describes an explanation of, e.g., the contents and functions of the site treated by the update information. The image element 2210 describes a URI which specifies an image resource such as the logo of the site treated by the update information. Details of the image element 2210 will be described later in association with the image element 2203 to be described below. The items element 2211 provides the indices of the item elements 2204, 2205, and 2206. A li element 2213 listed in the contents of a Seq element 2212 represents each update information URI. The image element 2203 expresses an image such as a logo. The contents of the image element 2203 contain a title element 2214, url element 2215, and link element 2216. The title element 2214 represents the title of an image, and is sometimes used as an alternative text of the image. The url element 2215 describes the URI of an image resource. When a hyperlink using this image as an anchor is displayed, the link element 2216 describes a URI used as a link destination. The item elements 2204, 2205, and 2206, and the like represent the order of elements each expressing update information. The contents of the item element contain a title element 2217, link element 2218, and description element 2219. The title element 2217 describes the title of update information. The link element 2218 describes the URI of the update information. The description element 2219 describes a description of the update information.

Figure 23:
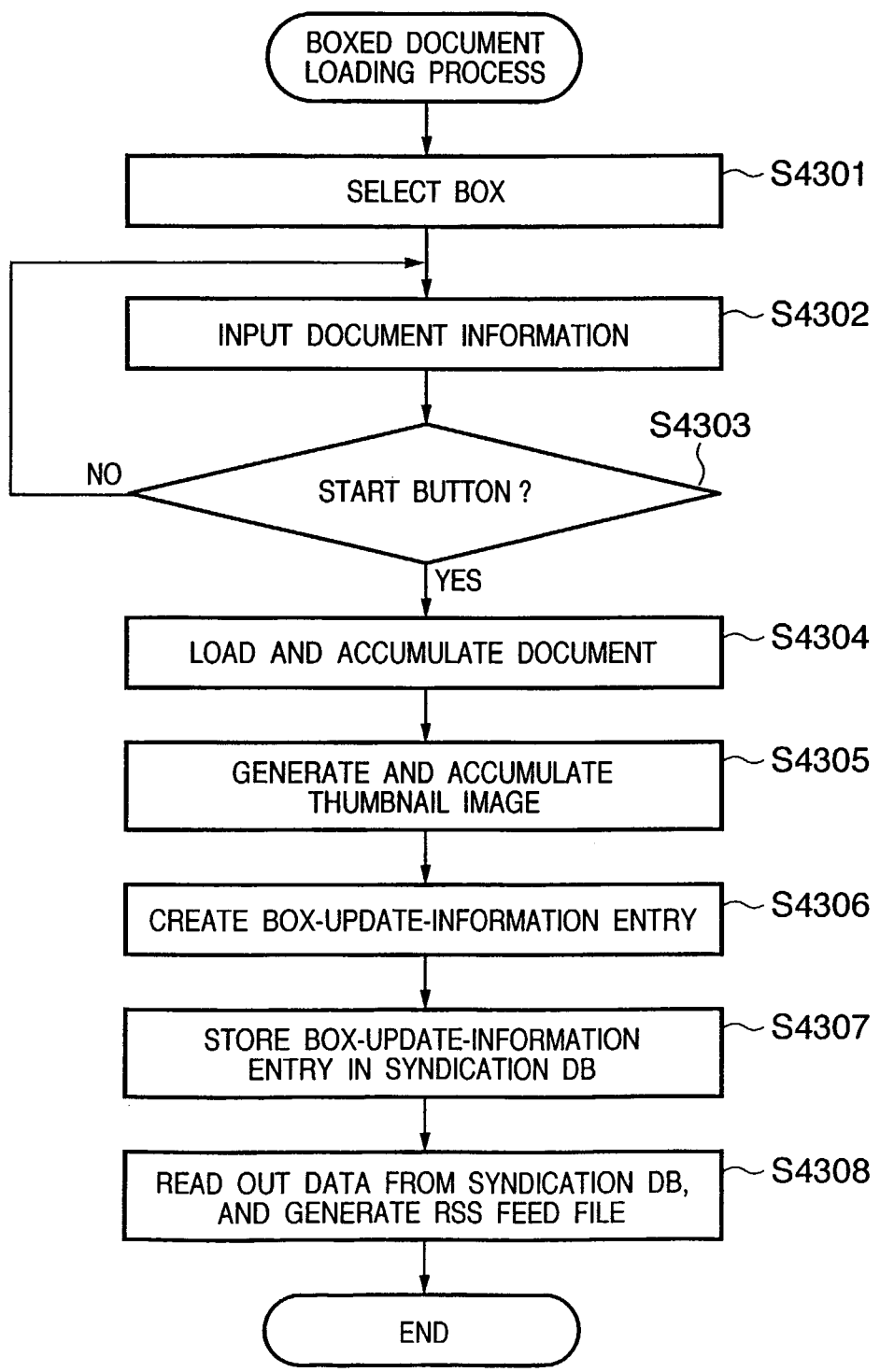
FIG. 23 is a flowchart showing boxed document loading process procedures in the image processing apparatus.

FIG. 23 is a flowchart showing boxed document loading process procedures in the image processing apparatus. In step S4301, a box selection process by the user is accepted. In step S4302, a document information input by the user is accepted. The document information is the document name of a document to be loaded and a description of the document. The user inputs document information with the keys 3509 and 3510 shown in FIG. 15. In step S4303, it is determined whether the start button is pressed. If the start button is pressed, the flow advances to step S4304; if no start button is pressed, returns to step S4302 to accept a document information input. S4303, it is determined whether the start button is pressed. If the start button is pressed, the flow advances to step S4304; if no start button is pressed, returns to step S4302 to accept a document information input.

In step S4304, a document is loaded and accumulated in the box. In step S4305, the resolution of the loaded image is decreased to generate and accumulate a thumbnail image. In step S4306, a box update information entry is generated. More specifically, an update information entry which describes detailed information of the loaded document is generated. The update information entry also contains the generated thumbnail image. In step S4307, the generated update information entry is stored in the syndication DB. In step S4308, an RSS feed file generation process is called to generate a new RSS feed file from the syndication DB which is changed by adding the new update information entry.

Figure 24:
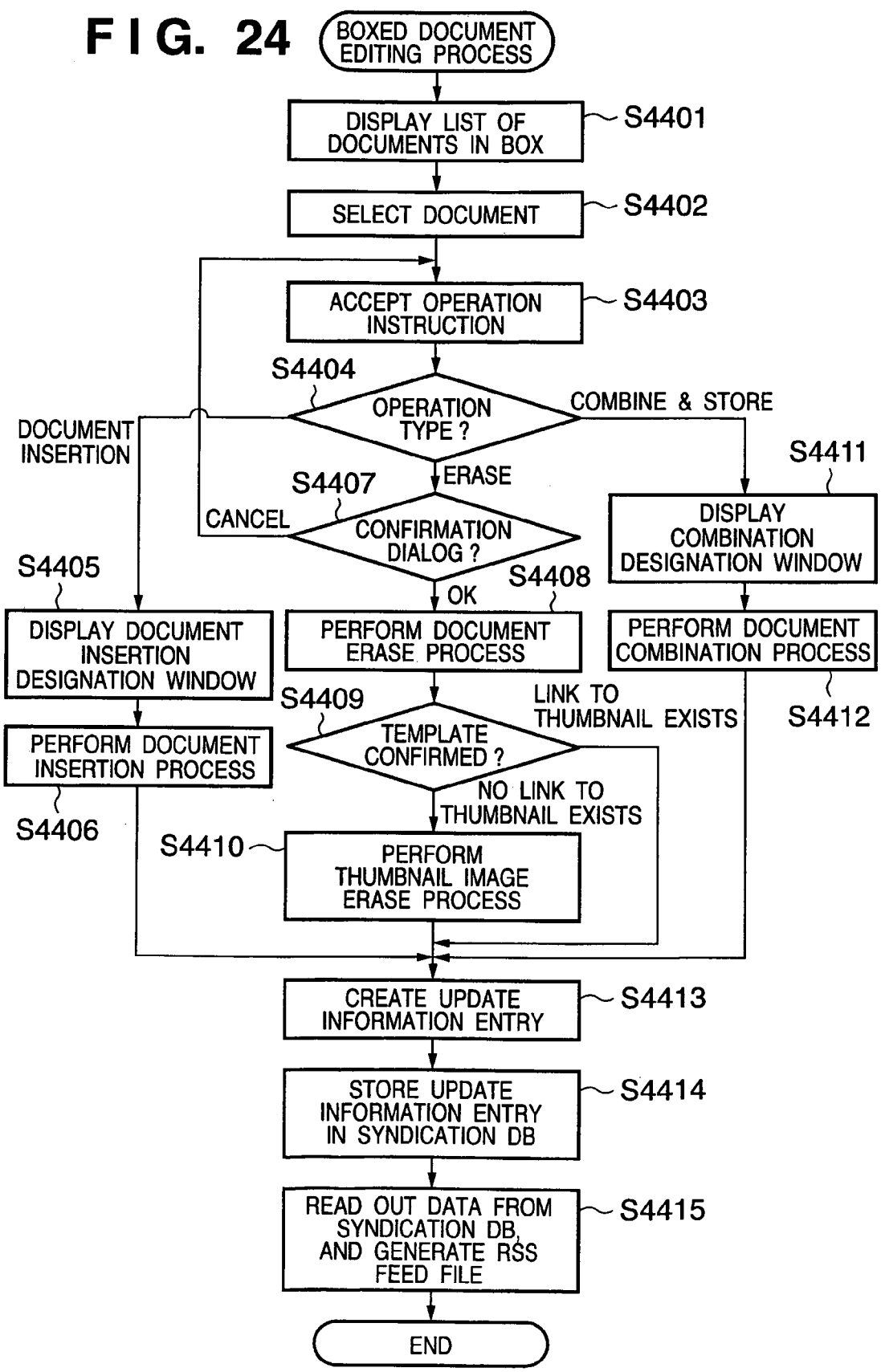
FIG. 24 is a flowchart showing boxed document editing process procedures in the image processing apparatus.

FIG. 24 is a flowchart showing boxed document editing process procedures in the image processing apparatus. In step S4401, a list of documents in the box is displayed. In step S4402, document selection by the user is accepted. The following operation targets the selected document. In step S4403, an operation instruction from the user is accepted. In step S4404, the condition branches in accordance with the operation type. If the selected operation type is document insertion, the flow advances to step S4405; if the selected operation type is deletion, to step S4407; if the selected operation type is combine & store, to step S4411.

In step S4405, a window for inputting an insertion instruction is displayed. In the insertion instruction window, the user inputs a document to be inserted, insertion position, document name after insertion, and the like. In step S4406, a document insertion process is performed to generate a new document. Then, the flow advances to step S4413. In step S4407, a dialog which prompts the user to confirm whether to actually delete the document is displayed to wait for an input by the user. If the user cancels deletion, the flow returns to S4403; if the user responds OK, advances to S4408. In step S4408, the selected document is deleted. After that, the flow advances to step S4409.

In step S4409, a template used to generate a syndication data file (feed file) is extracted from the template DB 1706 to determine whether the template contains a link to a thumbnail image. If the template contains a link to a thumbnail image, the flow advances to step S4410; if the template does not contain any link to a thumbnail image, to S4413. In step S4410, the thumbnail image is deleted. Thereafter, the flow advances to step S4413. In step S4411, a window for inputting a combine/store instruction is displayed. In the combine/store window, the user inputs documents to be combined, the combination order, document name after combination, and the like. In step S4412, a combine/store process is performed to generate a new document. Then, the flow advances to step S4413.

In step S4413, an update information entry is generated in accordance with the process executed in the preceding step. That is, an update information entry which describes detailed information of the event is generated in correspondence with the event such as document insertion, document deletion, or combine/store. In step S4414, the generated update information entry is stored in the syndication DB. In step S4415, an RSS feed file generation process is called to generate a new RSS feed file from the syndication DB which is changed by adding the new update information entry. At this time, the thumbnail image of a deleted page (or document), changed page, added page, or combined page may be contained in the entry of an editing event.

In accumulating or editing a boxed document, its importance [more importance/normal/less importance] can be selected and set. The period during which update information is posted in the update information file can be set in accordance with the importance.

Figure 25:
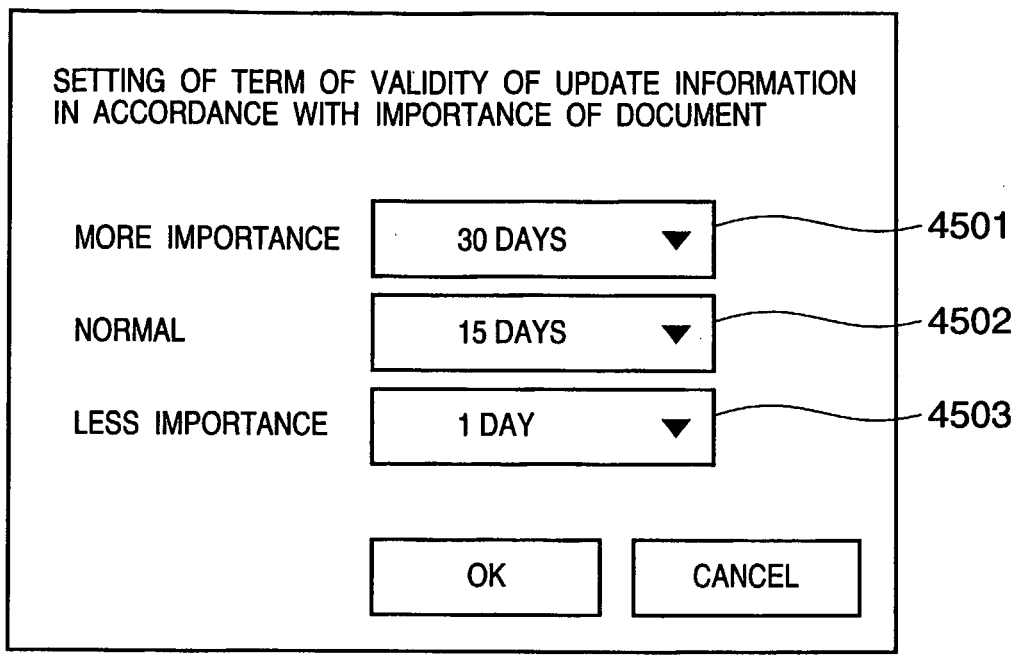
FIG. 25 is a view showing an example of a window for setting a period during which update information is posted in the update information file.

FIG. 25 is a view showing an example of a window for setting a period during which update information is posted in the update information file. A pull-down menu for setting a period is displayed for each importance level of a document. For example, each pull-down menu allows selecting [1 day/2 days/3 days/4 days/5 days/6 days/7 days/10 days/15 days/30 days]. A pull-down menu 4501 is used to set a period during which an event is treated as update information upon generation of an event to a document set as "more importance". A pull-down menu 4502 is used to set a period during which an event is treated as update information upon generation of an event to a document set as "normal". A pull-down menu 4503 is used to set a period during which an event is treated as update information upon generation of an event to a document set as "less importance". In response to an update information file acquisition request, an entry whose term of validity has expired is deleted from the update information file. In the reception box, the period during which update information is posted in the update information file can be set in accordance with the source of a received document. The period information is saved and referred to in generating syndication data.

Figure 26:
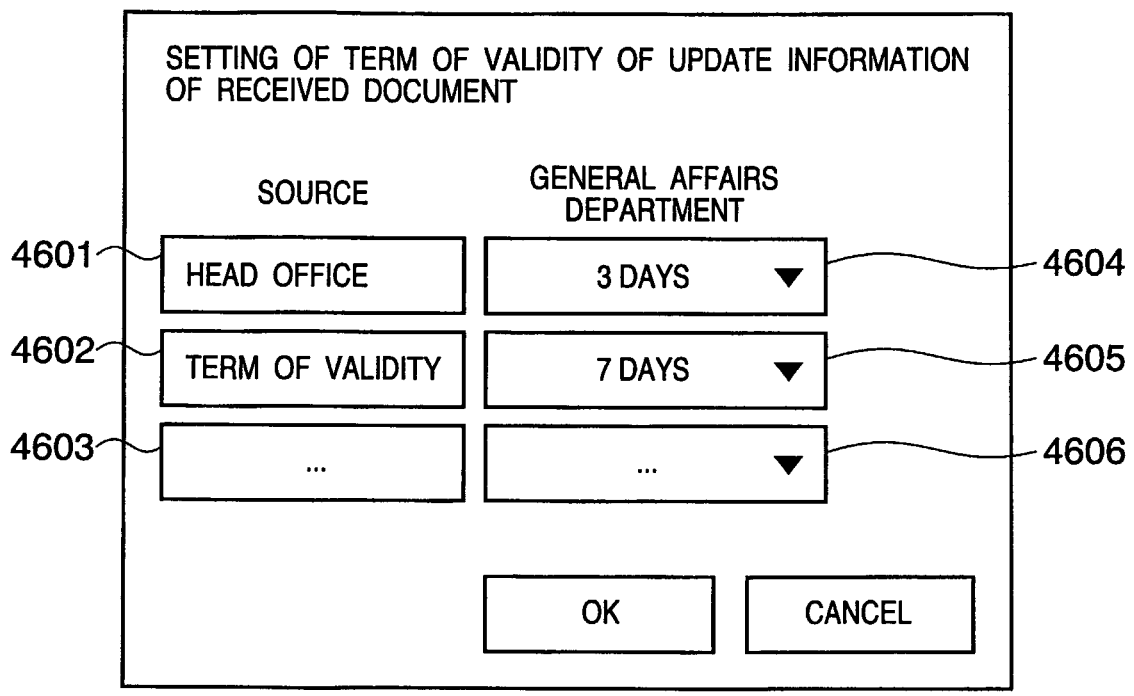
FIG. 26 is a view showing an example of a window for setting a period during which update information of a document in the reception box is posted in the update file.

FIG. 26 is a view showing an example of a window for setting a period during which update information of a document in the reception box is posted in the update file. Areas 4601, 4602, and 4603 are used to input a source. When each area is pressed, a soft keyboard window (not shown) is displayed to allow inputting a source. Pull-down menus 4604, 4605, and 4606 are used to set the term of validity for each source. For example, each pull-down menu allows selecting [1 day/2 days/3 days/4 days/5 days/6 days/7 days/10 days/15 days/30 days]. In response to an update information file acquisition request, an entry whose term of validity has expired is deleted from the update information file.

FIG. 27 is a view showing an example of a feed file (i.e., syndication data) for syndicating box-related update information. The feed file illustrated in FIG. 27 is XML data of the RSS 1.0 format. The feed file is stored in the update information storage unit 4208, and can be specified by a URI and acquired outside or inside the image processing apparatus 110. The same reference numerals denote the same RSS 1.0 vocabularies as those described above in important descriptions, and a description thereof will be omitted. Since update information feed data which is generated from the template in FIG. 27 for syndication is an XML application of the RSS 1.0 format, it has module expandability using an XML name space. In other words, the update information feed data can be combined with other XML vocabularies to easily add necessary information in syndication feed data. For example, the following elements are combined from the DCMES properties of Dublin Core frequently used as standard metadata description elements.

That is, date elements 4701 and 4706, a subject element 4704, a creator element 4705, and a generator Agent element 4702 from an Admin module are combined. The date element 4701 describes a date and time when feed data is generated. The generator Agent element 4702 describes software which generates feed data. The subject element 4704 describes the category of an entry. The creator element 4705 describes a user, i.e., operator who is involved in generation of an entry. The date element 4706 describes a date and time when an entry is generated. As one of large effects of the third embodiment, it becomes easy to flexibly, strictly expand a data format for feeding update information. Note that the description element 2219 in the item element 2204 may contain a document explanation input to the input text display area 3602 of FIG. 16 by the user when an image is loaded. The description element 2219 can also contain information obtained by performing character recognition for a loaded image, or decoding code information (e.g., barcode or digital watermark) embedded in an image.

(Acquisition and Display of Update Information Feed Data)

Figure 28:
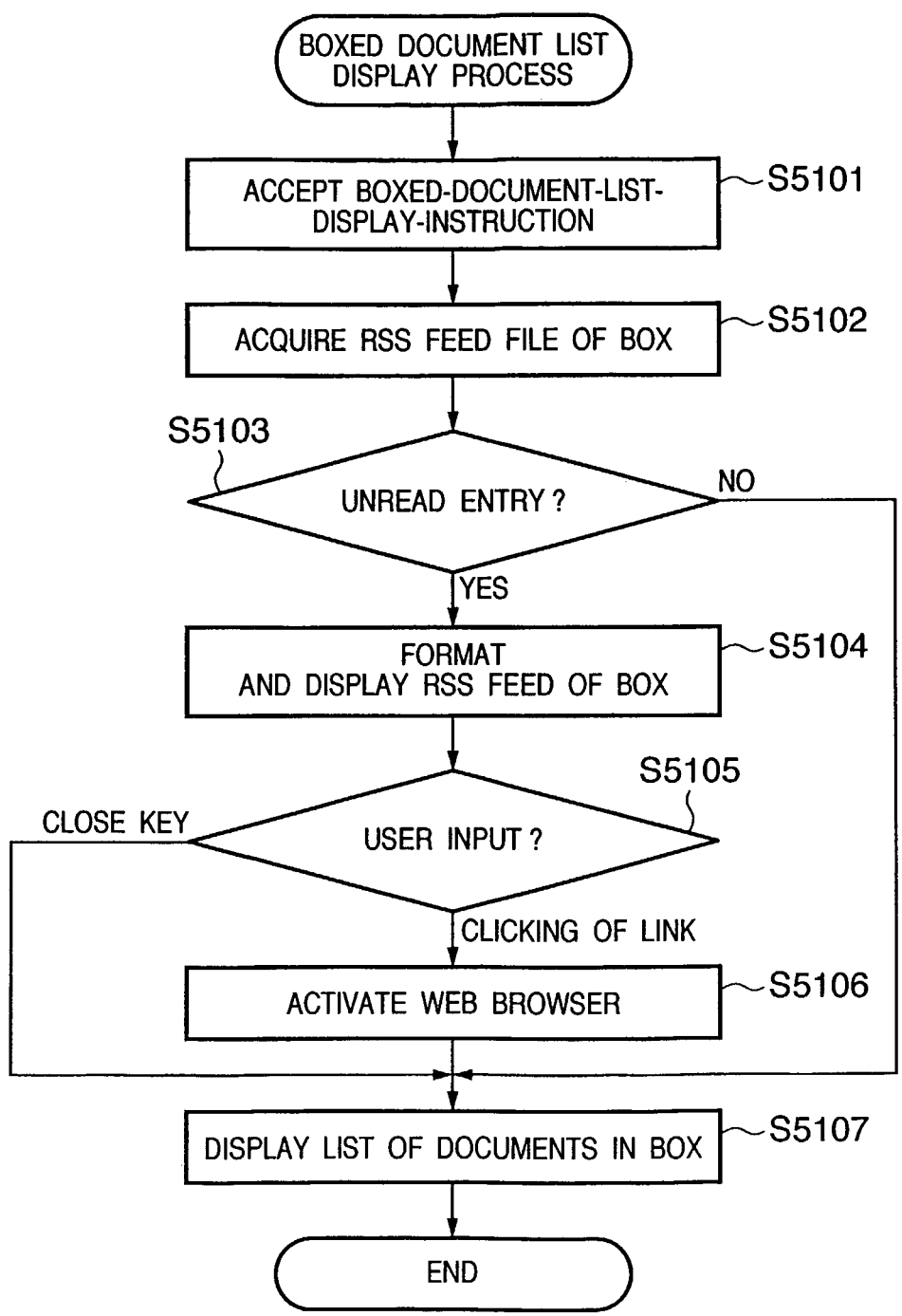
FIG. 28 is a flowchart showing boxed document list display process procedures in the image processing apparatus.

FIG. 28 is a flowchart showing boxed document list display process procedures in the image processing apparatus. In step S5101, a boxed document list display instruction from the user is accepted. This instruction is issued by selecting a box from the box list window (FIG. 11) by the user. In step S5102, the RSS feed file of the box is acquired.

In step S5103, it is determined whether an unread entry exists in update information entries described in the feed file acquired in the preceding step. If an unread entry exists, the flow advances to step S5104; if no unread entry exists, to step S5107.

Figure 30:
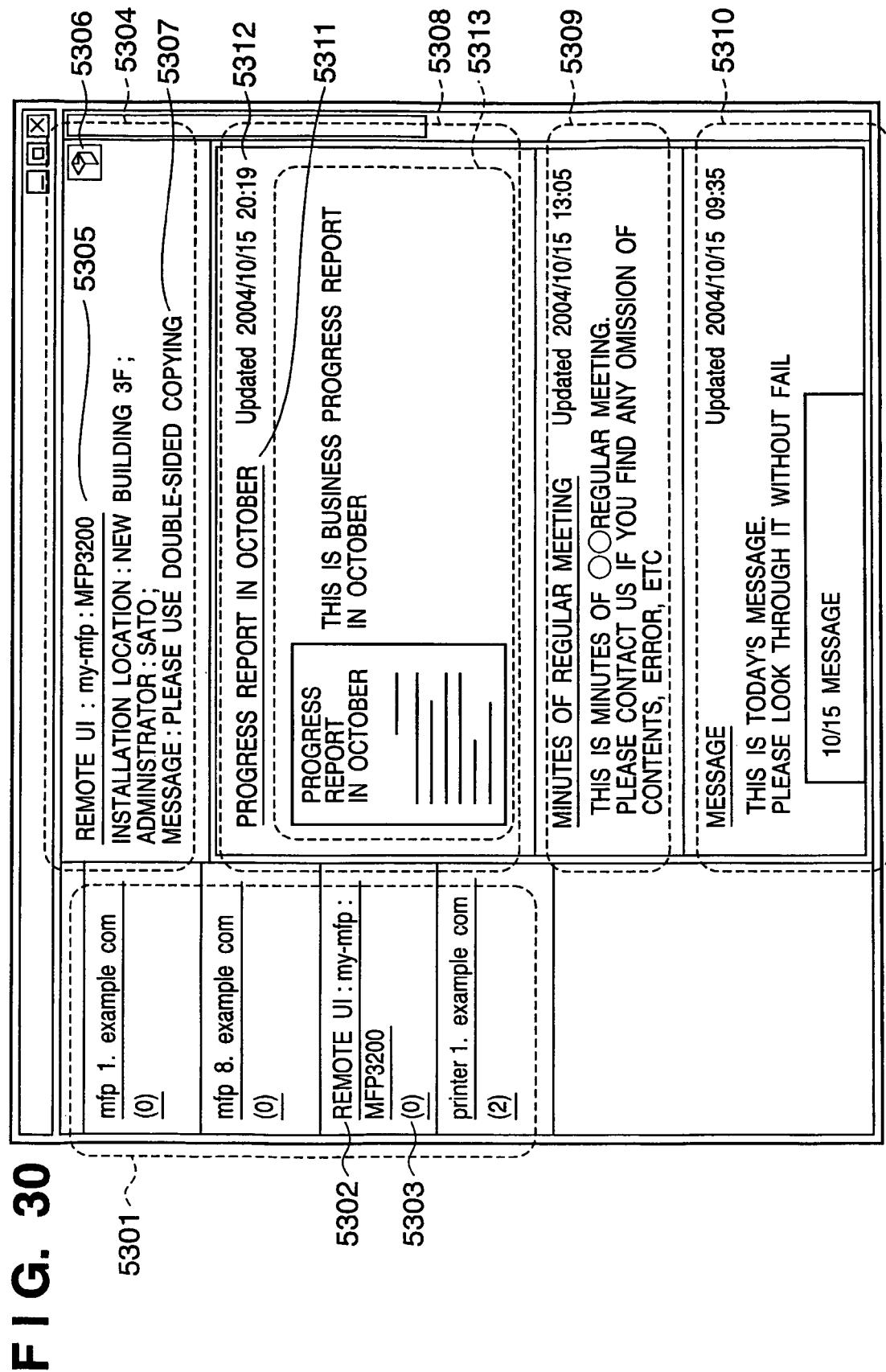
FIG. 30 is a view showing an example of a boxed document update information feed display window displayed on the operation panel of the image processing apparatus.
Figure 31:
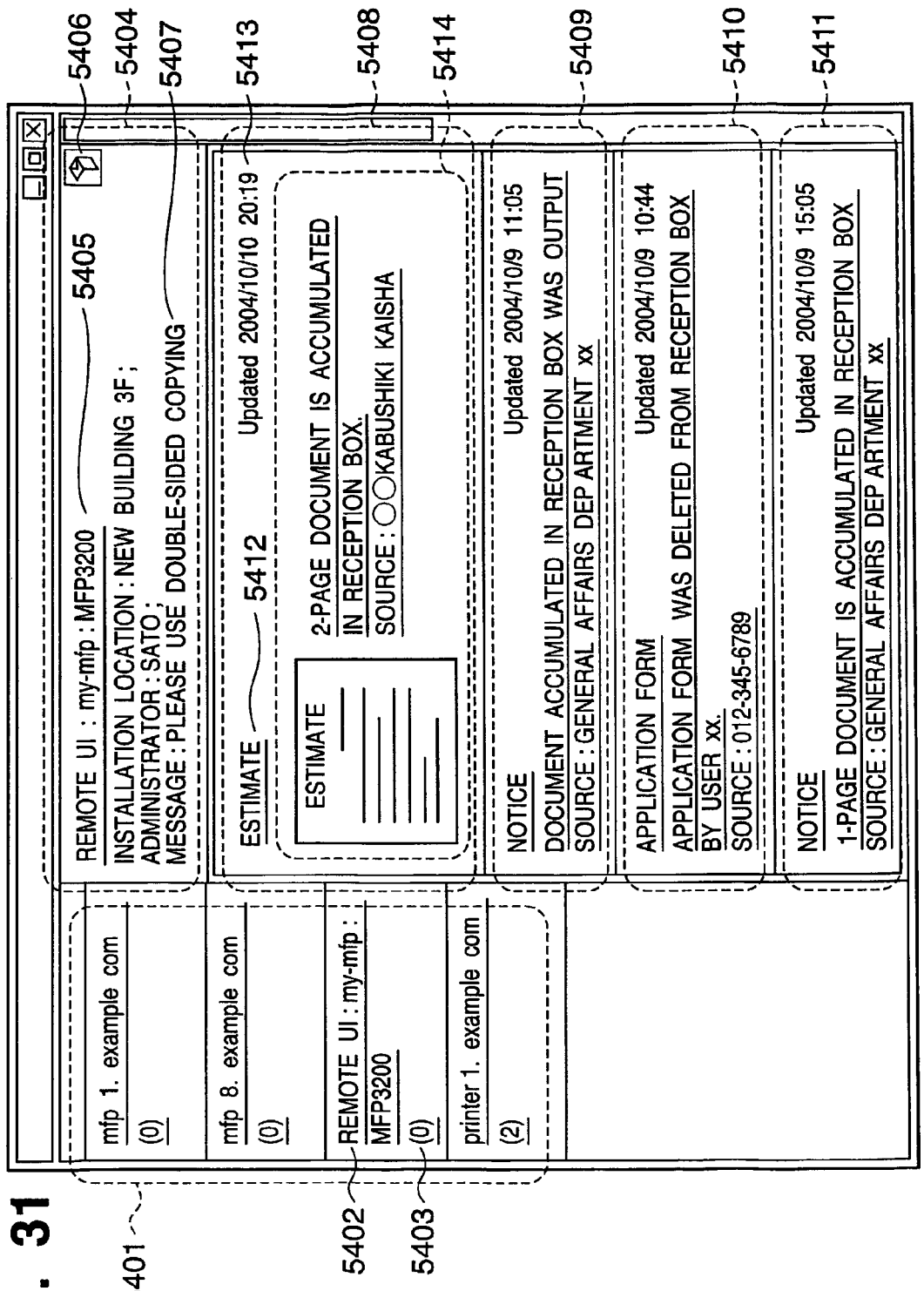
FIG. 31 is a view showing an example of a reception box update information feed display window displayed by a general feed reader.
Figure 32:
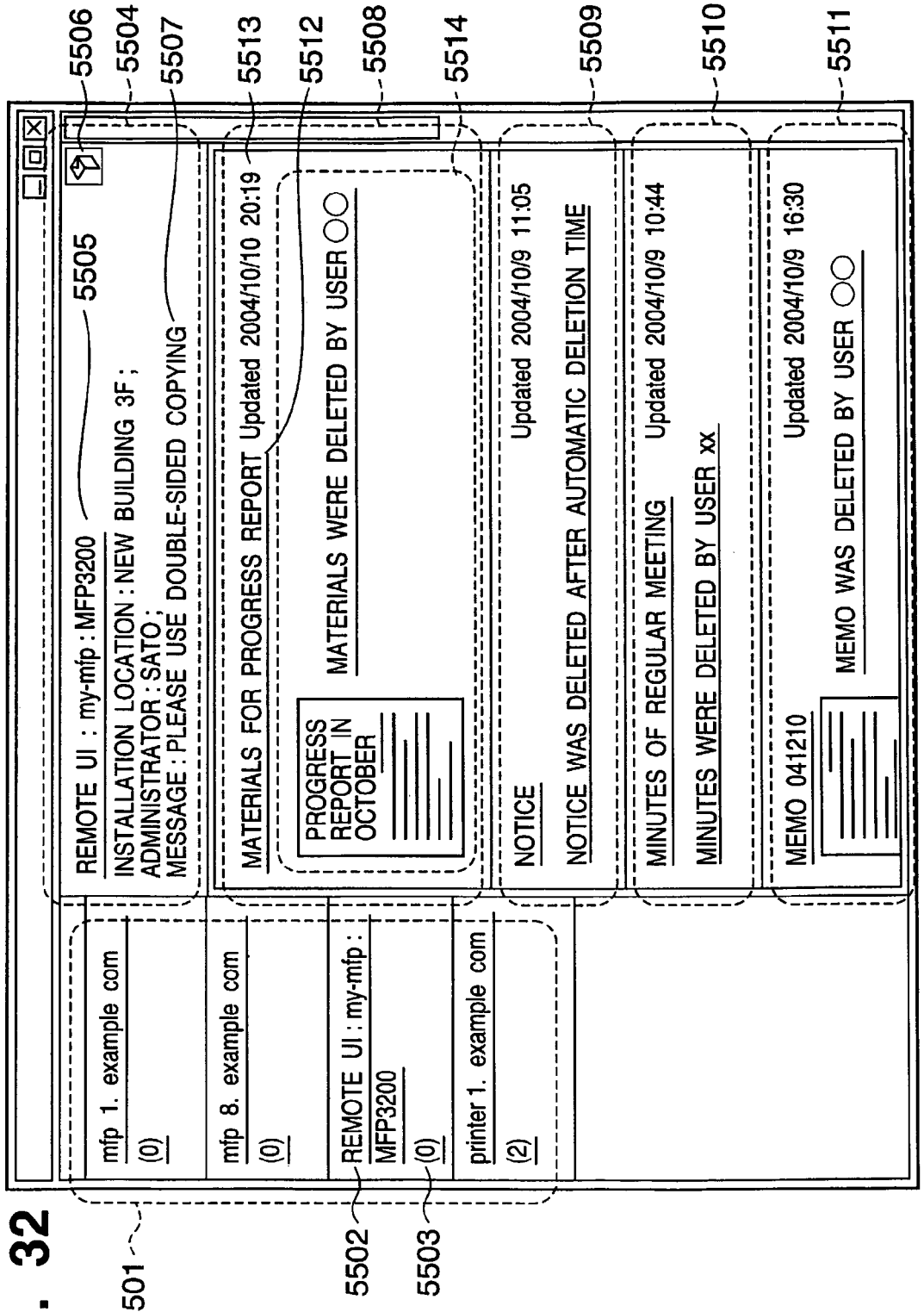
FIG. 32 is a view showing an example of an update information feed display window which is displayed by the general feed reader and related to deletion of a boxed document.

In step S5104, the acquired RSS feed file is formatted and displayed on the operation panel (FIGS. 30, 31, and 32). In step S5105, a user input is accepted. If the user clicks a link in the formatted/displayed update information, the flow advances to step S5106; if the user clicks a key (e.g., "x" button) for closing the update information display window, to step S5107.

In step S5106, the Web browser is activated to load information from the clicked link and display the information. If the user closes the Web browser window, the flow advances to step S5107.

In step S5107, a list of documents in the box is displayed. At this time, if the Web browser is activated in step S5106, the list is displayed in the Web browser window, as shown in FIG. 19. If the flow skips step S5106, the list is displayed in a window unique to the image processing apparatus, as shown in FIG. 12.

By the above process, when the user displays a list of boxed documents and unread update information exists, the update information is automatically displayed on the operation panel to allow the user to confirm update information of the boxed document.

Figure 29:
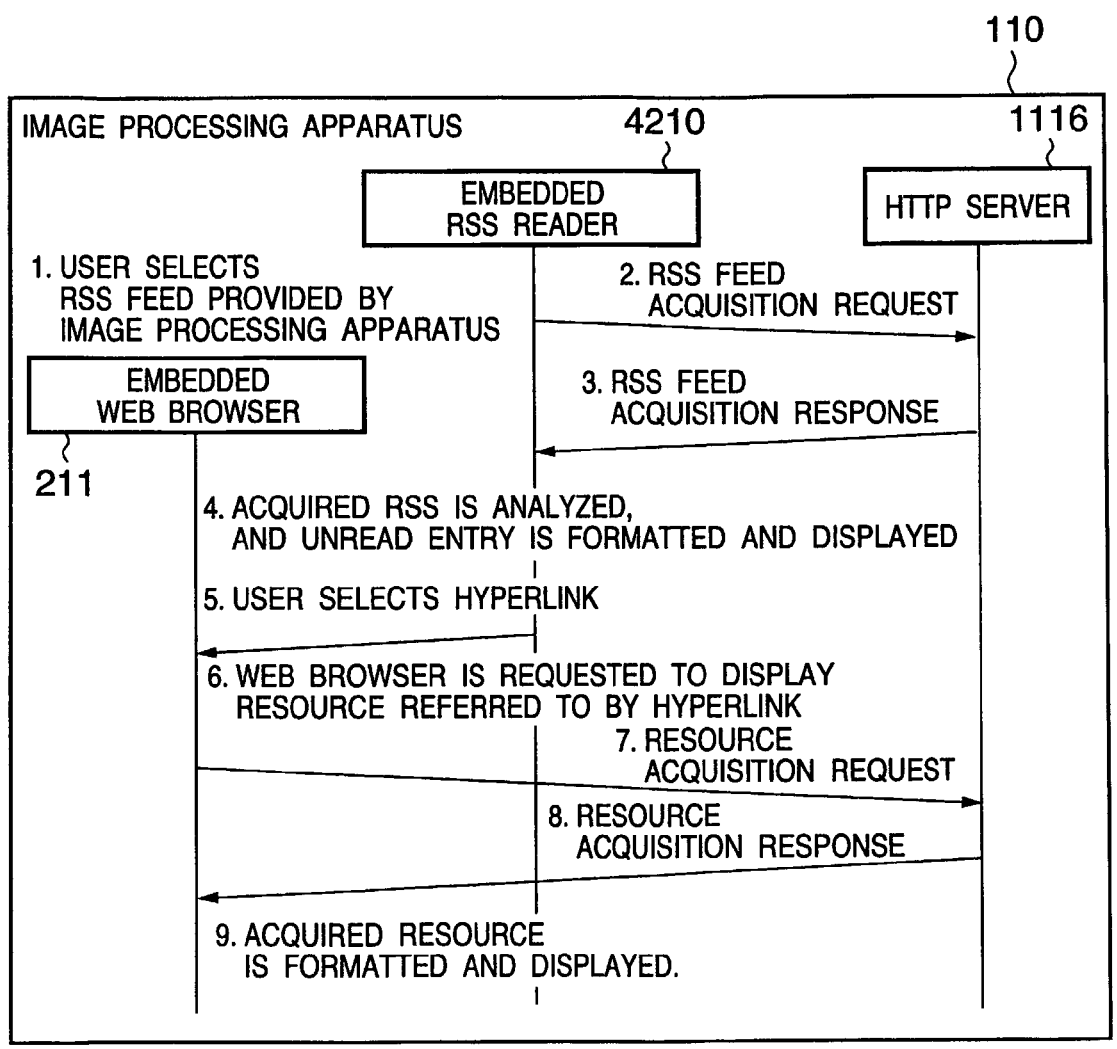
FIG. 29 is a sequence chart between a server, an RSS reader, and a Web browser in the image processing apparatus.

FIG. 29 is a sequence chart for explaining the sequence of communication and cooperation when an embedded RSS reader in the image processing apparatus uses an update information feed file provided by the same image processing apparatus. The RSS reader 4210, embedded Web browser 211, and HTTP server 1116 which run on the image processing apparatus 110 cooperate with each other by communication. Since a feed file for syndicating (distributing) update information is described in a general-purpose XML format and can be specified and acquired by a URI, the form, function, and system configuration of a client which utilizes update information can be flexibly combined.

At event 1 (corresponding to numeral 1 in FIG. 29: this also applies to numeral 2 and subsequent numerals), the user 1702 requests display of a list of documents in a box. Then, the embedded RSS reader 4210 receives the information.

At event 2, the RSS reader 4210 establishes communication with the HTTP server 1116, and transmits an RSS feed acquisition request. Communication is generally performed using an application protocol such as HTTP or HTTPS.

At event 3, the HTTP server 1116 sends back an update information feed file stored in the image processing apparatus to the RSS reader 4210 as a response to the HTTP request.

At event 4, the RSS reader 4210 analyzes the acquired feed file, and formats and displays an entry which has not been read by the user 1702. The displayed update information displays, as a selectable anchor, link information defined by the XML format of syndication. When an explanation of the update information entry contains a hypertext such as HTML, the hyperlink is displayed as a selectable anchor.

At event 5, the user selects the anchor of a link contained in the entry displayed by the RSS reader 4210.

At event 6, the RSS reader 4210 performs application communication with the Web browser 211, and requests the Web browser 211 to display a resource specified by a URI described by the link.

At event 7, the embedded Web browser 211 acquires the requested resource. If location information of the URI which specifies the given resource designates the HTTP server 1116 of the image processing apparatus 110, the embedded Web browser 211 establishes communication with the HTTP server 1116, and transmits a resource acquisition request. Communication is generally performed using an application protocol such as HTTP or HTTPS. For example, the Web browser 211 issues the acquisition request by designating a URI assigned to a servlet running on the JVM 1104 of the image processing apparatus 110.

At event 8, the HTTP server 1116 sends back the requested resource as a response to the HTTP request to the embedded Web browser 211. The HTTP server 1116 reads out the requested resource from the storage, or dynamically generates it by the program. For example, when the resource designated by the acquisition request is a servlet, the HTTP server 1116 transfers the acquisition request to the servlet, and sends back a response such as HTL data generated as a result of a process by the servlet.

At event 9, the embedded Web browser 211 formats and displays the acquired resource.

FIG. 30 shows an example of a boxed document update information feed display window displayed on the operation panel of the image processing apparatus. An RSS feed list 5301 is a menu which is set in advance in the feed reader, is found as a result of dynamic search by the feed reader, or lists available syndication feed data. Each item of the list corresponds to available feed data. When the user selects an item, the feed reader acquires corresponding feed data, expands it, and displays it on the right pane. The highlight of an item means that the item is selected. Note that when the window is automatically activated by a boxed document list display operation, the window appears while feed data of a boxed document in the image processing apparatus itself is selected. At this time, the area of the RSS feed list 5301 may be hidden. A feed title 5302 displays the title of feed data for identifying feed data corresponding to the item. An unread count 5303 displays the number of unread entries contained in feed data corresponding to the item.

The right pane in the display window of FIG. 30 will be explained. The right pane displays information corresponding to feed data selected from the RSS feed list 5301.

A feed outline 5304 displays an overall outline of feed data. The displayed information corresponds to the contents of the channel element 2202 in the RSS feed example of FIG. 27.

A feed title 5305 displays the title of feed data, and corresponds to the title element 2207 in the channel element 2202 in the RSS feed example. The displayed title is the anchor of a hypertext, and when the user selects the title, the resource of a URI described in the link element 2208 is acquired and displayed in cooperation with the Web browser. In this example, the feed title 5305 is the anchor of a top page which provides a portal of Web applications in the image processing apparatus 110.

A feed logo image 5306 displays the logo image of feed data. Although not shown in the RSS feed example, the feed logo image 5306 corresponds to the image elements 2210 and 2203. Displayed image data is a resource acquired from a URI described in the url element 2215. The displayed image is an anchor, and when the user selects the image, the Web browser is activated to acquire and display the resource of a URI described in the link element 2216.

A feed outline 5307 displays a description of an outline of feed data, and corresponds to the description element 2209 in the RSS feed example. As shown in this example, data to be syndicated can be flexibly designed by freely combining feed data formats and template variables which can be replaced with various types of information held in the image processing apparatus.

Update information entries 5308, 5309, and 5310 display update information syndicated by feed files. In the RSS feed example, the update information entries 5308, 5309, and 5310 are indexed as a list of the li elements 2213 in the items element 2211, and correspond to elements listed in the item elements 2204, 2205, and 2206.

An entry title 5311 displays the title of the update information entry. In the RSS feed example, the entry title 5311 corresponds to the title element 2217. The displayed title is the anchor of a hypertext, and when the user selects the title, the Web browser is activated to acquire and display the resource of a URI described in the link element 2218. In this example, the entry title 5311 is the anchor of an individual entry information page for browsing details of the update information entry.

An entry update date & time 5312 displays a date and time when an update information entry event occurs. In the RSS feed example, the entry update date & time 5312 corresponds to the date element 2306.

An entry description 5313 describes information on an update information entry. In the RSS feed example, the entry description 5313 corresponds to the description element 2219. The entry description is structured as a text marked up in HTML (XHTML) using an image, citation, table, and the like. The entry description is formatted and displayed so as to present the structures of these elements. Links to various resources including a Web page and E-mail address are embedded in the entry description, and their anchors are also displayed.

In generating an RSS feed example, displayed information is generated on the basis of templates, various databases in the image processing apparatus, and various types of information obtained via the apparatus control class library 1106. As shown in this example, data to be syndicated can be flexibly designed by freely combining feed data formats and template variables which can be replaced with various types of information held in the image processing apparatus. In the example of FIG. 30, the text of a document explanation and the thumbnail image of a document are displayed.

FIG. 31 shows an example of a reception box update information feed display window displayed on the operation panel of the image processing apparatus.

The window in FIG. 31 is the same as that in FIG. 30 except that an entry description 5414 describes the contents of update information of the reception box, so a detailed description thereof will be omitted. The entry description contains the event type, the source, and the thumbnail image of a received document.

When the user performs an operation associated with the reception box, update information is automatically displayed on the operation panel, and the user can accurately grasp that the contents in the reception box have changed.

FIG. 32 shows an example of an update information feed display window which is displayed on the operation panel of the image processing apparatus and related to deletion of a boxed document. The window in FIG. 32 is the same as that in FIG. 30 except that an entry description 5514 describes the contents of boxed document deletion information, so a detailed description thereof will be omitted. The entry description 5514 contains the name of a user who performed a deletion process, and the thumbnail image of a document. Note that a document is deleted by a user operation or automatically upon the lapse of a preset save period. In either case, the deletion is recorded as an update information entry.

Since even deletion of a document is displayed as update information, the user can accurately grasp the contents of the box. Even if a document is deleted, its thumbnail image is posted in update information, and the user can easily recognize which document was deleted.

In the above way, update information of a boxed document is displayed on the operation unit in response to an operation by the user to execute the document management function, i.e., box function of the image processing apparatus. The user can know a change (e.g., deletion, addition, or modification) in contents before executing the box function.
(Modification)

In the description of the embodiment, a server having an HTTP server or the like and a client having a Web browser and RSS reader exist in the same image processing apparatus. However, even in a system in which a server having an HTTP server or the like and a client having a Web browser and RSS reader exist in different image processing apparatuses connected via a network, the client can timely obtain server information, similar to the embodiment. The network is not limited to a LAN, and the present invention can also be applied to a wide area network such as the Internet.

The apparatus according to the embodiment can be applied not only to the image processing apparatus, but also to home appliances such as a printer and recording apparatus as far as the apparatus incorporates a computer and can execute applications such as the HTTP server, Web browser, and RSS reader.
[Second Embodiment]

An address book function will be explained. As described above, the image processing apparatus has a function of sending a document by file transmission based on SMB, FTP, or the like, E-mail, FAX, Internet FAX, and the like. The address book function is to register destination information in the internal storage device of the apparatus in advance, and call the registered destination in transmission. The configuration of an image processing system is the same as that in the first embodiment shown in FIGS. 1 to 11, and a description thereof will be omitted. The address book function in the second embodiment may be added to the box function in the first embodiment.

Figure 33:
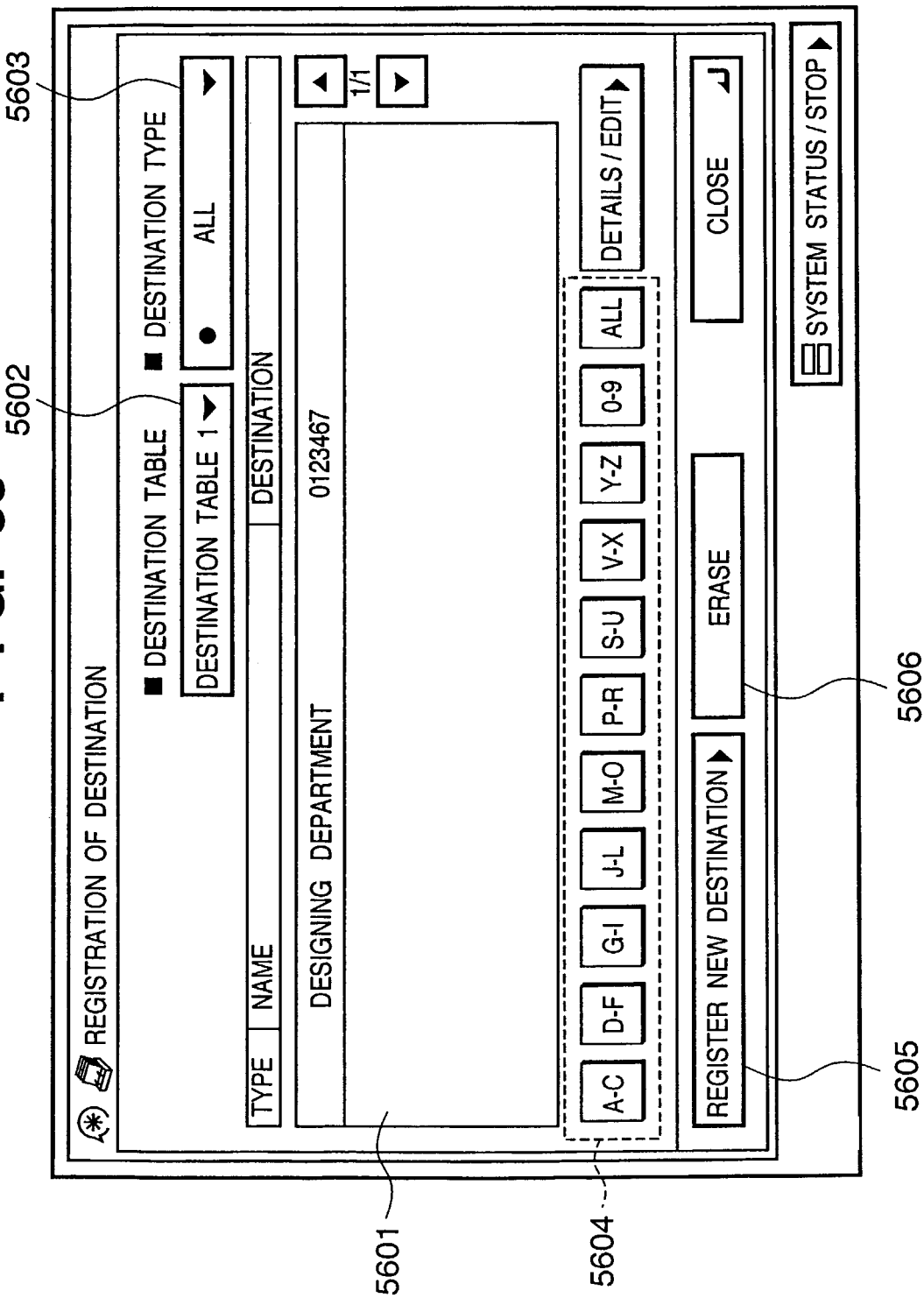
FIG. 33 is a view showing an example of an address book window.
Figure 34:
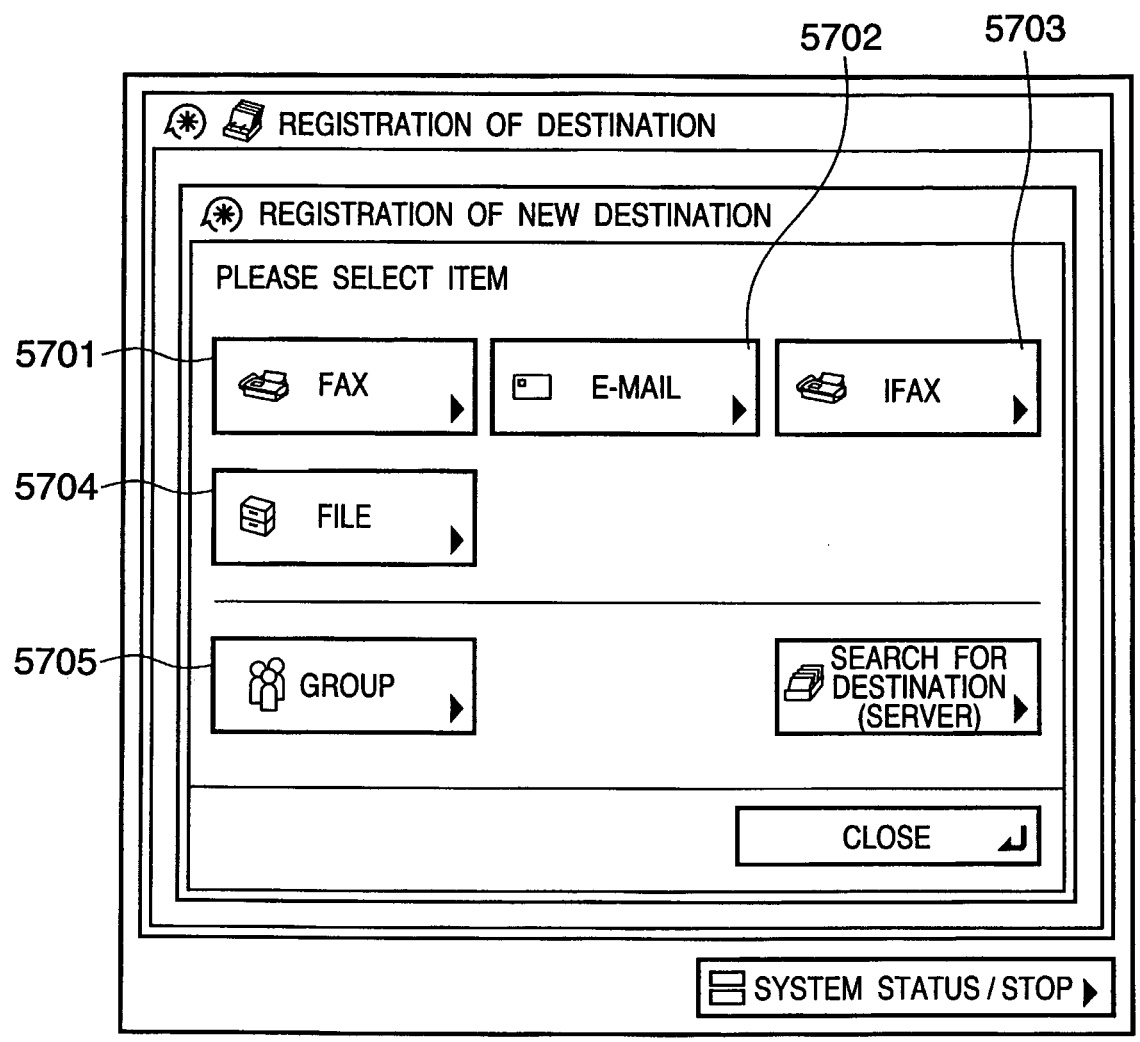
FIG. 34 is a view showing an example of a destination type selection window.

FIG. 33 shows an address book window. An address list 5601 displays a registered address. A menu 5602 is a sub-address book selection menu, a menu 5603 is a destination type selection menu, and a menu 5604 is an initial destination name letter selection menu. Addresses which satisfy conditions selected in the respective menus are displayed in the address list 5601. A button 5605 is a new destination registration button, and when the button 5605 is pressed, a destination type selection window in FIG. 34 is displayed. With buttons 5701 to 5705 in FIG. 34, the user can select the type of destination to be registered. As selectable types, file transmission based on SMB, FTP, or the like, E-mail, FAX, and Internet FAX are supported. The user can select an arbitrary protocol. A plurality of destinations can also be registered as a group destination at once.

Figure 35:
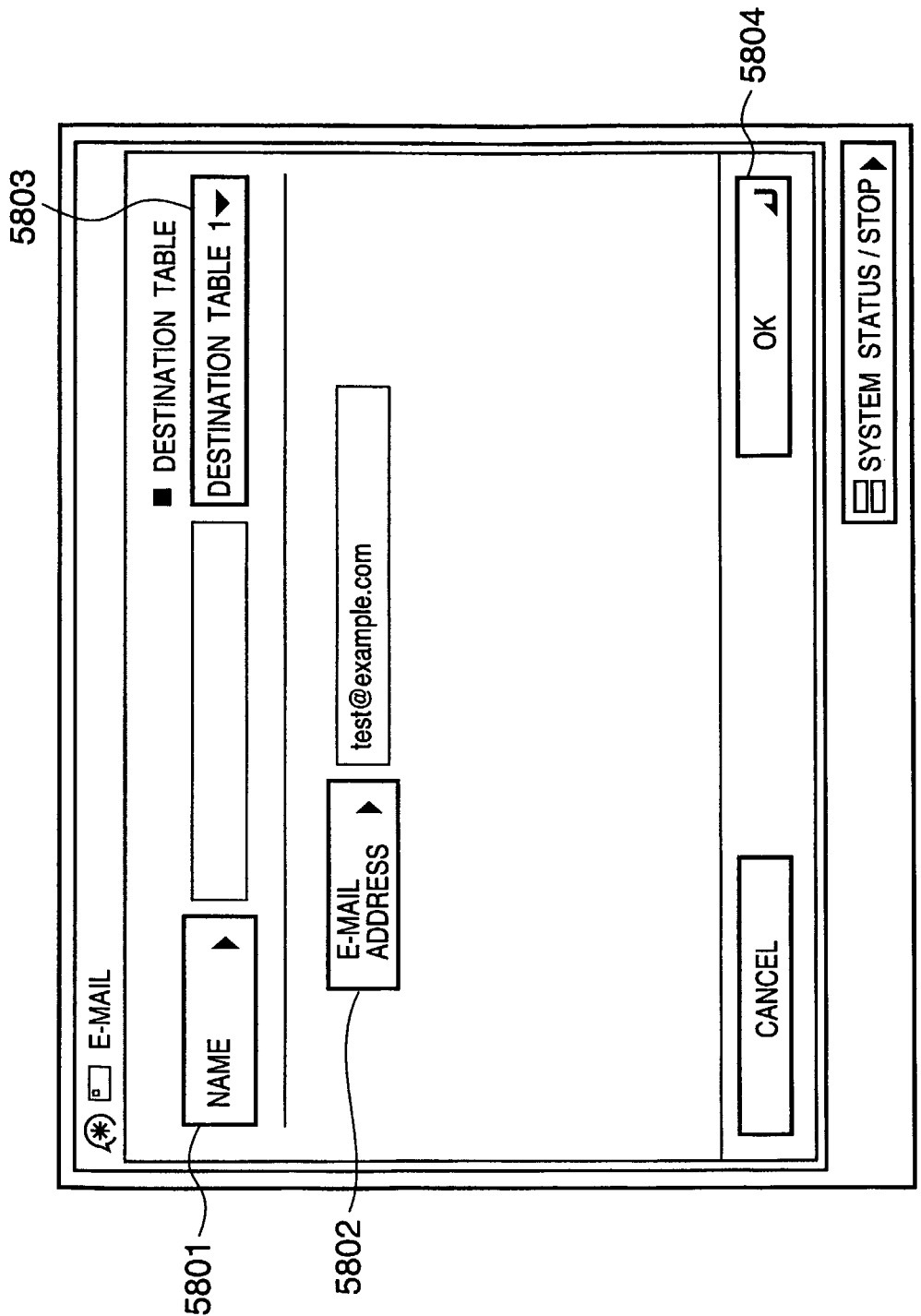
FIG. 35 is a view showing an example of a registration window when E-mail is selected.

As an example of a registration window, FIG. 35 shows an example of a registration window when E-mail is selected. When a name key 5801 or E-mail address key 5802 is pressed, a software keyboard window is displayed. The user can input an arbitrary text by using the software keyboard. A menu 5803 is a sub-address list selection menu. By selecting a sub-address, an address can be classified and registered in a desired sub-address. When an OK key 5804 is pressed, an input address is saved in the internal storage device of the apparatus.

Figure 36:
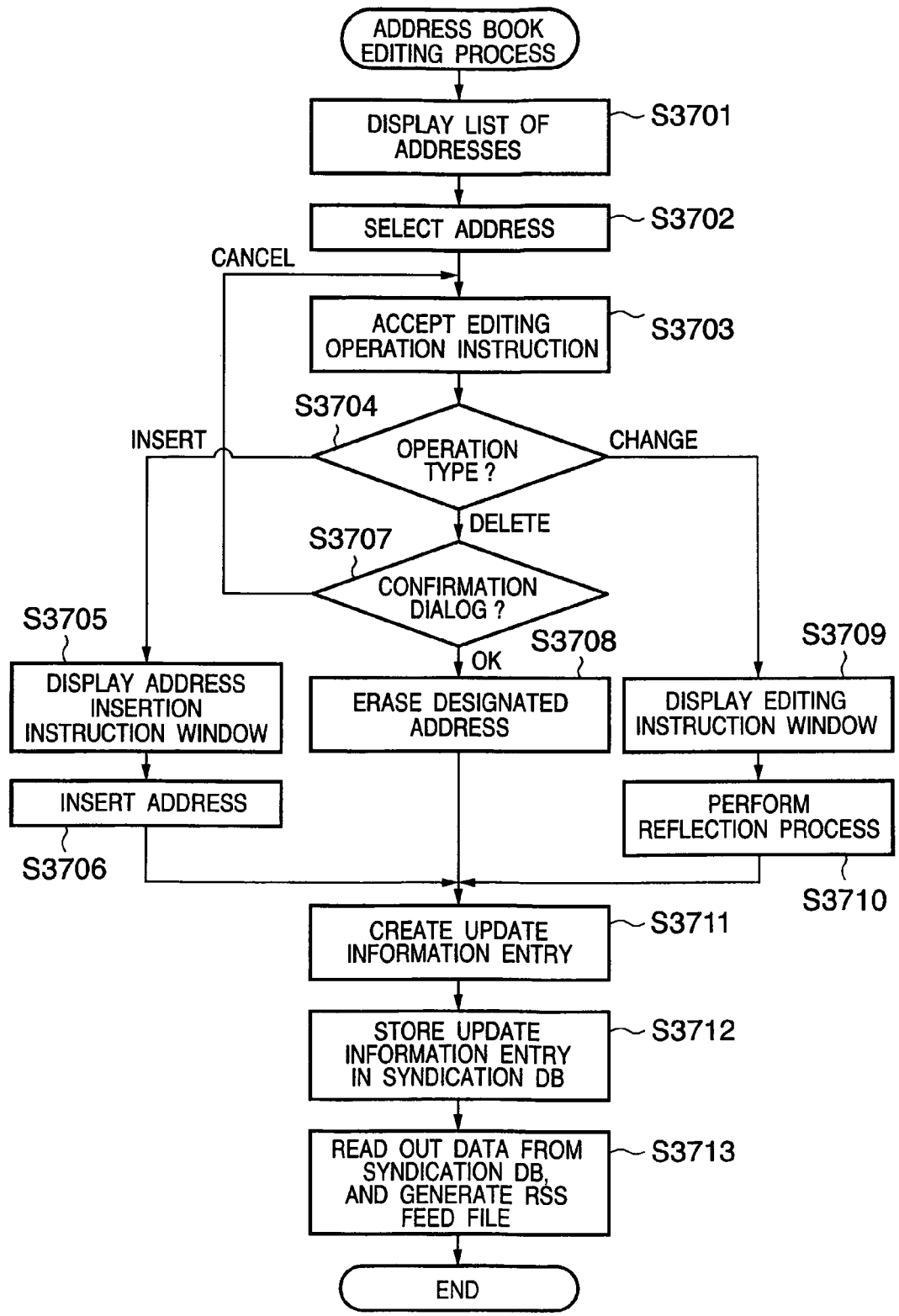
FIG. 36 is a flowchart showing address book editing process procedures in the image processing apparatus.

FIG. 36 is a flowchart showing address book editing process procedures in the image processing apparatus. In step S3701, address data saved in the hard disk or the like are read out to display a list. In step S3702, selection of an item (address) to be edited by the user is accepted. Change and deletion operations target a selected document. In step S3703, an editing operation instruction from the user is accepted. In step S3704, the condition branches in accordance with the operation type. If the selected operation type is new address insertion, the flow advances to step S3705; if the selected operation type is erase, to step S3707; if the selected operation type is change, to step S3709.

In step S3705, a window for inputting an insertion instruction is displayed. In the insertion instruction window, the user inputs, e.g., an address to be inserted. In step S3706, the address is inserted to generate new address book data. After that, the flow advances to step S3711.

In step S3707, a dialog which prompts the user to confirm whether to actually erase the document is displayed to wait for an input by the user. If the user cancels erase, the flow returns to S3703; if the user responds OK, advances to S3708. In step S3708, the selected address is erased. After that, the flow advances to step S3711.

In step S3709, a window for inputting a change operation instruction is displayed. In the change instruction window, the user inputs changed contents for an address whose contents are to be changed. In step S3710, the changed address data is saved to generate new address book data. Then, the flow advances to step S3711.

In step S3711, an update information entry is generated in accordance with the process executed in the preceding step. That is, an update information entry which describes detailed information of the event is generated in correspondence with the event such as new address insertion, address erase, or address change. In step S3712, the generated update information entry is stored in the syndication DB. In step S3713, an RSS feed file generation process is called to generate a new RSS feed file from the syndication DB which is changed by adding the new update information entry.

Figure 37:
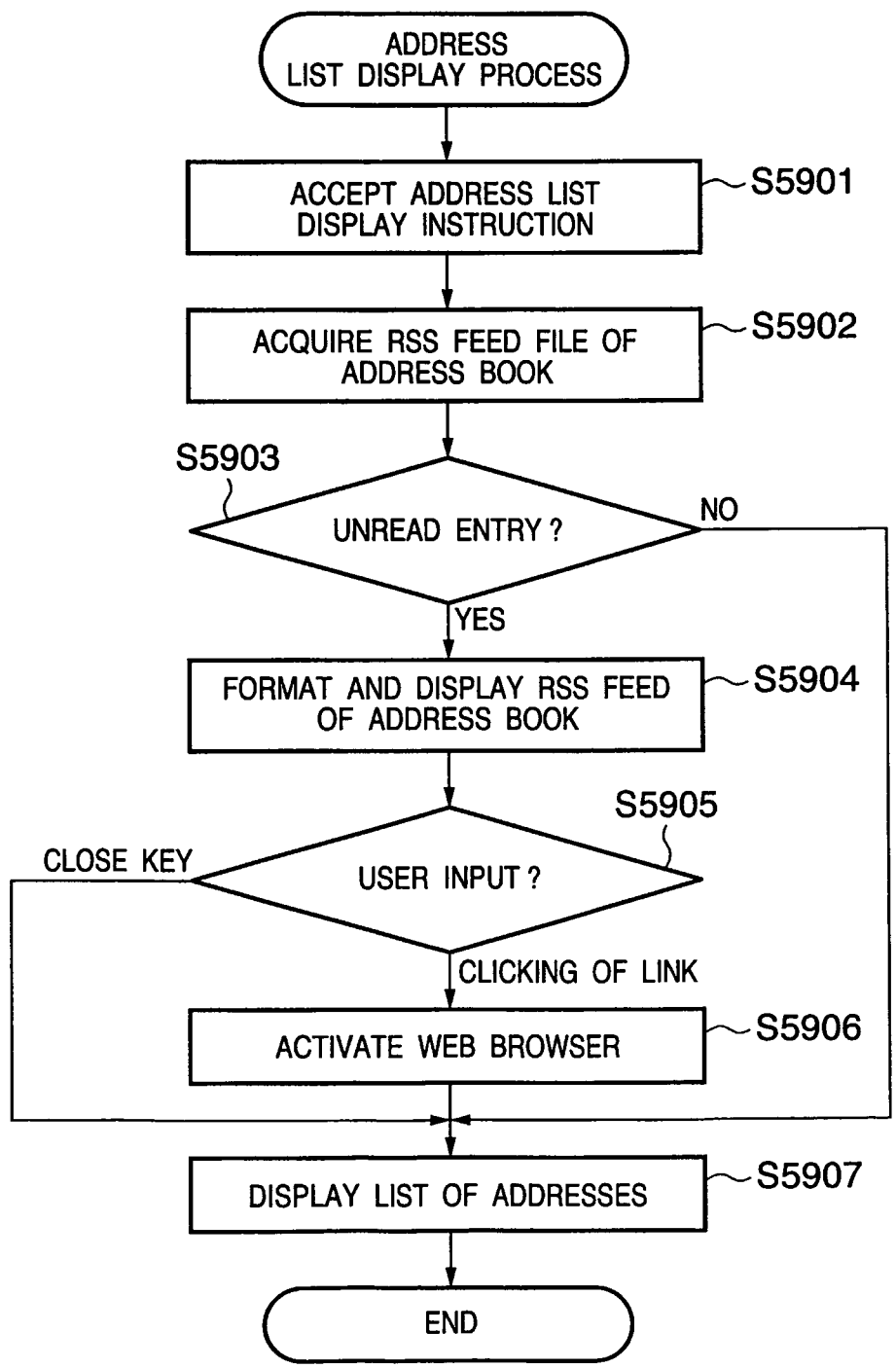
FIG. 37 is a flowchart showing address list display process procedures in the image processing apparatus.

FIG. 37 is a flowchart showing address list display process procedures in the image processing apparatus. In step S5901, an address list display instruction from the user is accepted. This instruction is issued by selecting an address book by the user in order to send a document or by selecting an address book in order to edit it.

In step S5902, the RSS feed file of the address book is acquired. In step S5903, it is determined whether an unread entry exists in update information entries described in the feed file acquired in the preceding step. If an unread entry exists, the flow advances to step S5904; if no unread entry exists, to step S5907.

In step S5904, the acquired RSS feed file is formatted and displayed on the operation panel. In step S5905, a user input is accepted. If the user clicks a link in the formatted/displayed update information, the flow advances to step S5906; if the user presses a key for closing the update information display window, to step S5907.

In step S5906, the Web browser is activated to load information from the clicked link and display the information. If the user closes the Web browser window, the flow advances to step S5907. In step S5907, a list of address books is displayed.

Figure 38:
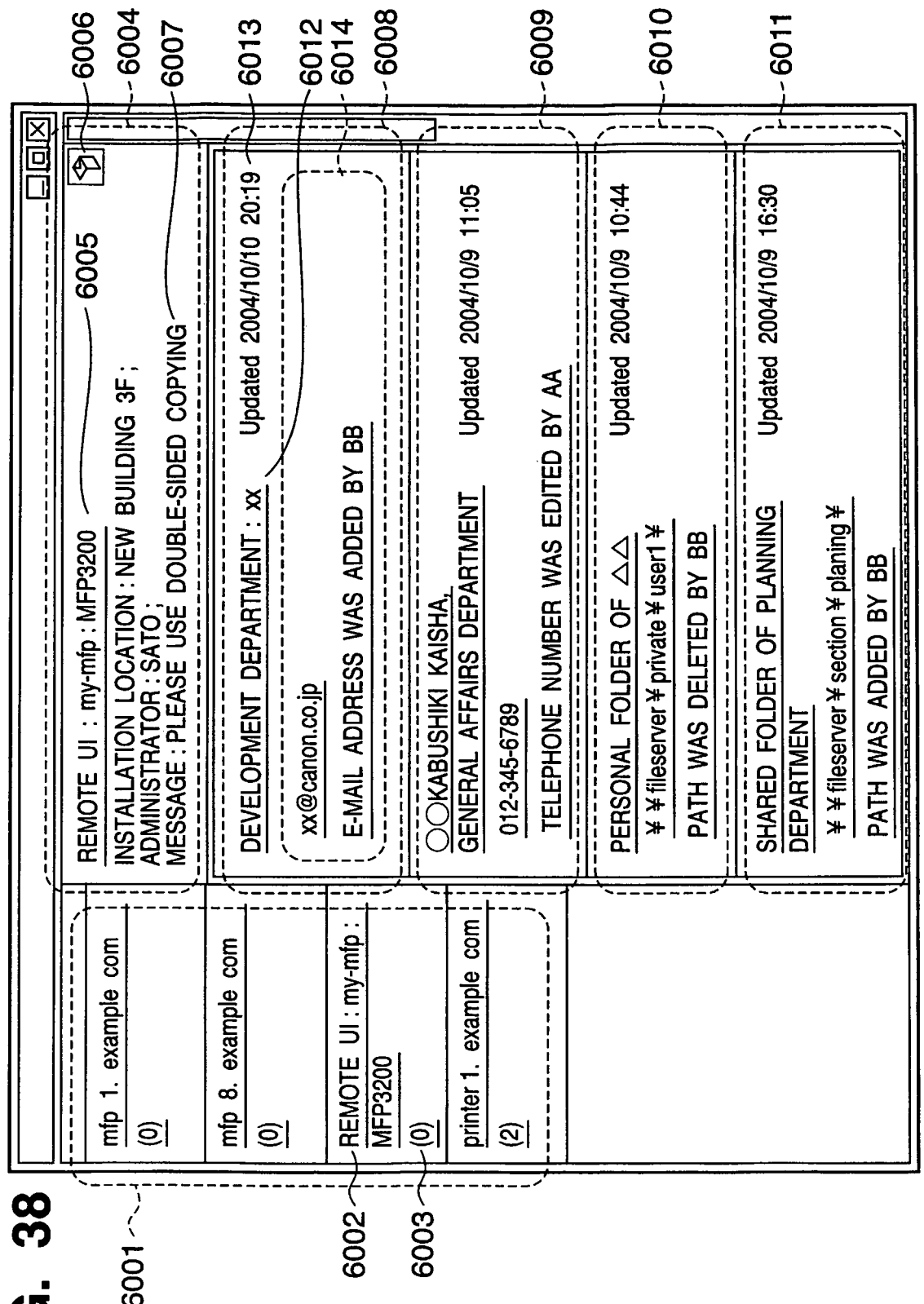
FIG. 38 is a view showing an example of an address book update information feed display window displayed on the operation panel of an image processing apparatus.

FIG. 38 shows an example of an address book update information feed display window displayed on the operation panel of an image processing apparatus. The window in FIG. 38 is the same as that in FIG. 30 except that an entry description 6014 describes the contents of address book update information, so a detailed description thereof will be omitted. The entry description 6014 contains the name of a user who performed an address book update process, and the contents of the change.

By the above process, when the user performs an operation to send a document, a list of address books is displayed. At this time, if unread update information exists, it is automatically displayed on the operation panel, and the user can confirm the update information of the address book. This can prevent re-registration of a registered address, or a transmission error to a destination not intended by the user because he does not notice that the address has been edited. In address maintenance, the address book window can be displayed at the start of the procedures in FIG. 36. Also in this case, if the address book has been updated, syndication data which describes update information is acquired and displayed by the RSS reader by the procedures in FIG. 37, similar to transmission of document data.

Note that the address book contains destination information (e.g., E-mail address, facsimile number, and telephone number) used in a copying machine (image processing apparatus). If another information is registered in the address book in addition to these pieces of information, it can also be monitored.

The functional block diagram of the second embodiment complies with FIG. 22. That is, FIG. 22 is a functional block diagram of the second embodiment by replacing "box document" with "address book", and data saved in a boxed document management system 4204 with address book data.

[Third Embodiment]

A bulletin board function will be explained. The bulletin board function is to display an arbitrary character string set by the user on the operation panel. There are two types of bulletin boards: a bulletin board displayed on the entire screen of the operation panel and a bulletin board displayed on the status line. The bulletin board is used mainly by the administrator of the image processing apparatus in order to make contact with a general user of the apparatus.

Figure 39:
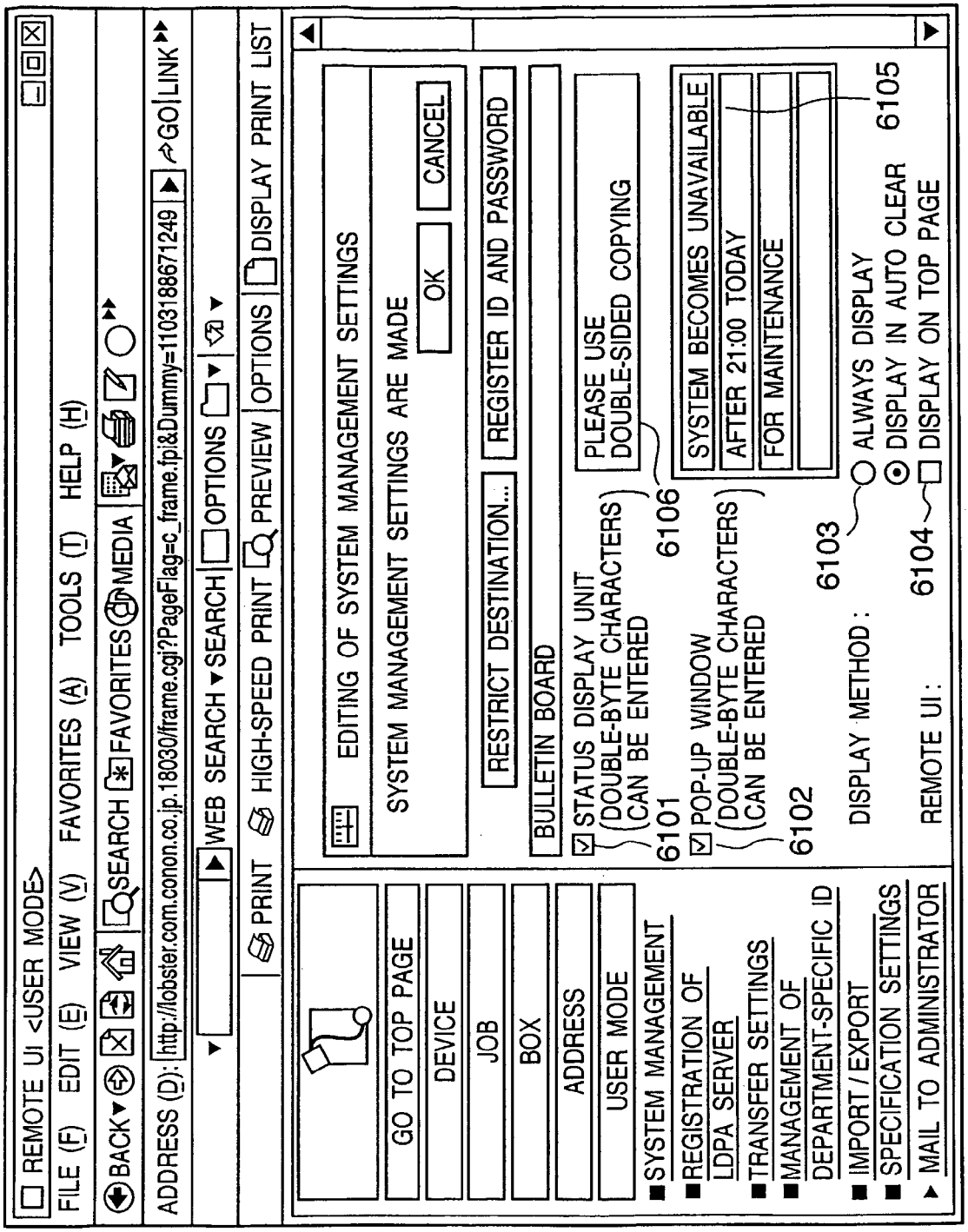
FIG. 39 is a view showing an example of a remote UI for setting a bulletin board.
Figure 40:
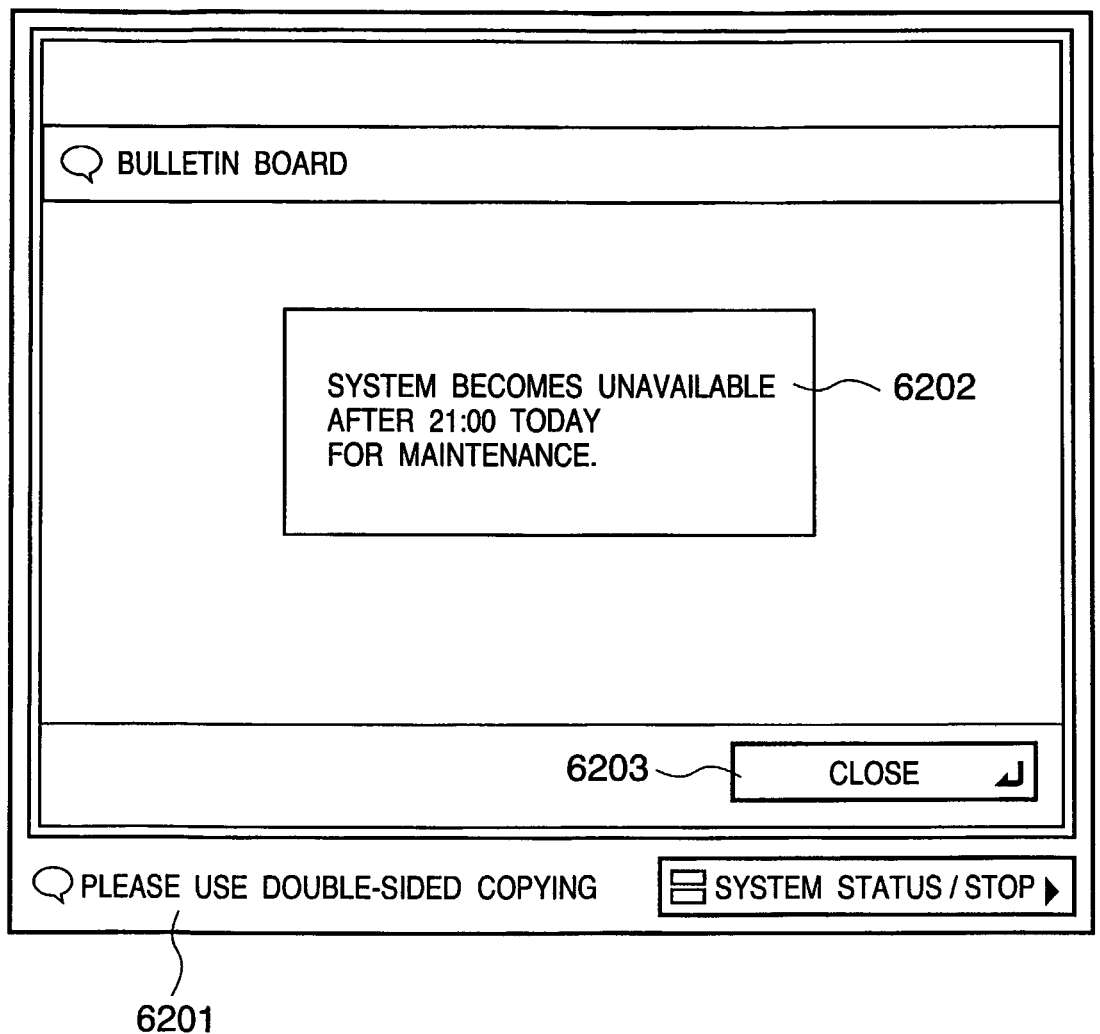
FIG. 40 is a view showing a bulletin board displayed on the operation panel.

Settings associated with the bulletin board are made from a remote UI. FIG. 39 is a view showing an example of a remote UI page for setting the bulletin board. A check box 6101 is checked when the bulletin board is displayed on the status line. An area 6106 is used to input a message to be displayed on the status line. A check box 6102 is checked when the bulletin board is displayed on the entire screen of the operation panel. An area 6105 is used to input a message to be displayed on the entire operation panel. A radio button 6103 is a switch for setting a display method for a bulletin board to be displayed on the entire operation panel. When "always display" is checked, it is set to always display the bulletin board on the operation panel. If "display in auto clear" is checked, the bulletin board is displayed on the operation panel in auto clear. A check box 6104 is used to set whether to display the bulletin board on the top page of the remote UI FIG. 40 is a view showing a bulletin board displayed on the operation panel, and shows an example when the settings shown in FIG. 39 are made. A bulletin board 6201 is displayed on the status line, and displays a message corresponding to the message input to the input column 6106. A bulletin board 6202 is displayed on the entire operation panel, and displays a message corresponding to the message input to the input column 6105. When a close key 6203 is pressed, a normal operation window is displayed. The bulletin board 6201 displayed on the status line is always displayed even in the normal operation window.

If the contents of the bulletin board are changed (including addition or deletion), an update information entry which reflects the contents of the change is created, and an RSS feed file which describes an update information entry in a format complying with the template, e.g., the RSS 1.0 standard is created. The procedures are the same as those in FIG. 36 except that the change target is the bulletin board, and a detailed description thereof will be omitted.

Figure 41:
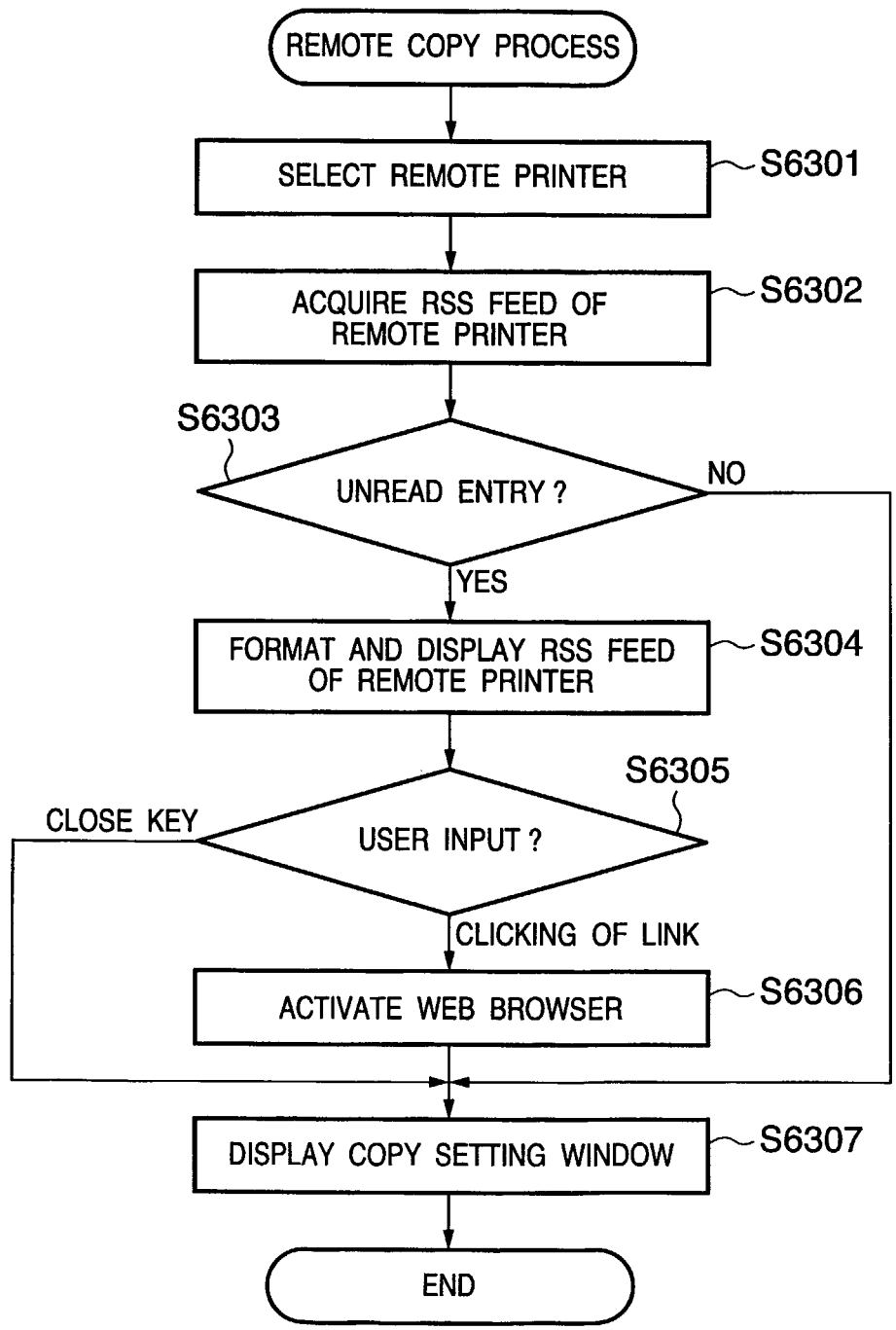
FIG. 41 is a flowchart showing remote copy process procedures in the image processing apparatus.

FIG. 41 is a flowchart showing remote copy process procedures in the image processing apparatus. Remote copy is to output an image loaded by the image processing apparatus from another network-connected image processing apparatus. In step S6301, the user selects a remote printer at an output destination. In step S6302, the RSS feed file of bulletin board information of the image processing apparatus selected as the output destination is acquired. In step S6303, it is determined whether an unread entry exists in update information entries described in the feed file acquired in the preceding step. If an unread entry exists, the flow advances to step S6304; if no unread entry exists, to step S6307.

In step S6304, the acquired RSS feed file is formatted and displayed on the operation panel. In step S6305, a user input is accepted. If the user clicks a link in the formatted/displayed update information, the flow advances to step S6306; if the user presses a key for closing the update information display window, to step S6307.

In step S6306, the Web browser is activated to load information from the clicked link and display the information. If the user closes the Web browser window, the flow advances to step S6307. In step S6307, a copy setting window is displayed.

Figure 42:
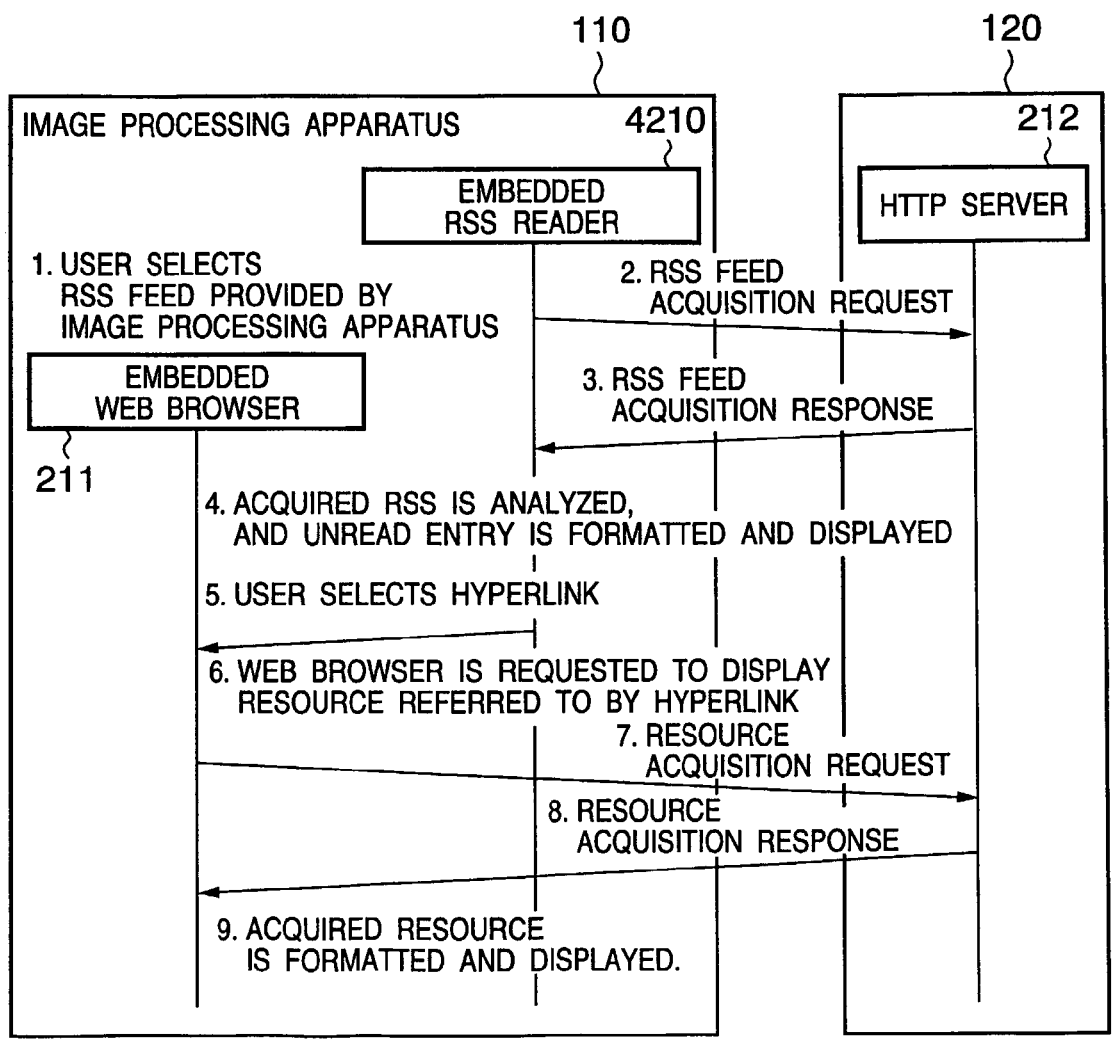
FIG. 42 is a sequence chart between an image processing apparatus designated as a remote printer and an image processing apparatus which designates the remote printer.

FIG. 42 is a sequence chart for explaining the sequence of communication and cooperation when an embedded RSS reader in an image processing apparatus 110 which designates a remote printer uses an update information feed file provided by an image processing apparatus 120 designated as a remote printer. An embedded RSS reader 4210 and embedded Web browser 211 which run on the image processing apparatus 110, and an HTTP module 212 which runs on the image processing apparatus 120 cooperate with each other by communication.

Since a feed file for syndicating update information is described in a general-purpose XML format and can be specified and acquired by a URI, the form, function, and system configuration of a client which utilizes update information can be flexibly combined.

At event 1 (corresponding to numeral 1 in FIG. 42: this also applies to reference numeral 2 and subsequent numerals), a user 1702 selects the image processing apparatus 120 as a remote copy output destination. Then, the embedded RSS reader 4210 receives the information.

At event 2, the RSS reader 4210 establishes communication with the HTTP server 212, and transmits an RSS feed acquisition request. Communication is generally performed using an application protocol such as HTTP or HTTPS.

At event 3, the HTTP server 212 sends back an update information feed file stored in the image processing apparatus to the RSS reader 4210 as a response to the HTTP request.

At event 4, the RSS reader 4210 analyzes the acquired feed file, and formats and displays an entry which has not been read by the user 1702. The displayed update information displays, as a selectable anchor, link information defined by the XML format of syndication. When an explanation of the update information entry contains a hypertext such as HTML, the hyperlink is displayed as a selectable anchor.

At event 5, the user selects the anchor of a link contained in the entry displayed by the RSS reader 4210.

At event 6, the RSS reader 4210 performs application communication with the Web browser 211, and requests the Web browser 211 to display a resource specified by a URI described by the link.

At event 7, the embedded Web browser 211 acquires the requested resource. If location information of the URI which specifies the given resource designates the HTTP server 212 of the image processing apparatus 120, the embedded Web browser 211 establishes communication with the HTTP server 212, and transmits a resource acquisition request. Communication is generally performed using an application protocol such as HTTP or HTTPS. For example, the Web browser 211 issues the acquisition request by designating a URI assigned to a servlet running on a JVM 1104 of the image processing apparatus 120.

At event 8, the HTTP server 212 sends back the requested resource as a response to the HTTP request to the embedded Web browser 211. The HTTP server 212 reads out the requested resource from the storage, or dynamically generates it by the program. For example, when the resource designated by the acquisition request is a servlet, the HTTP server 212 transfers the acquisition request to the servlet, and sends back a response such as HTML data generated as a result of a process by the servlet.

At event 9, the embedded Web browser 211 formats and displays the acquired resource.

Figure 43:
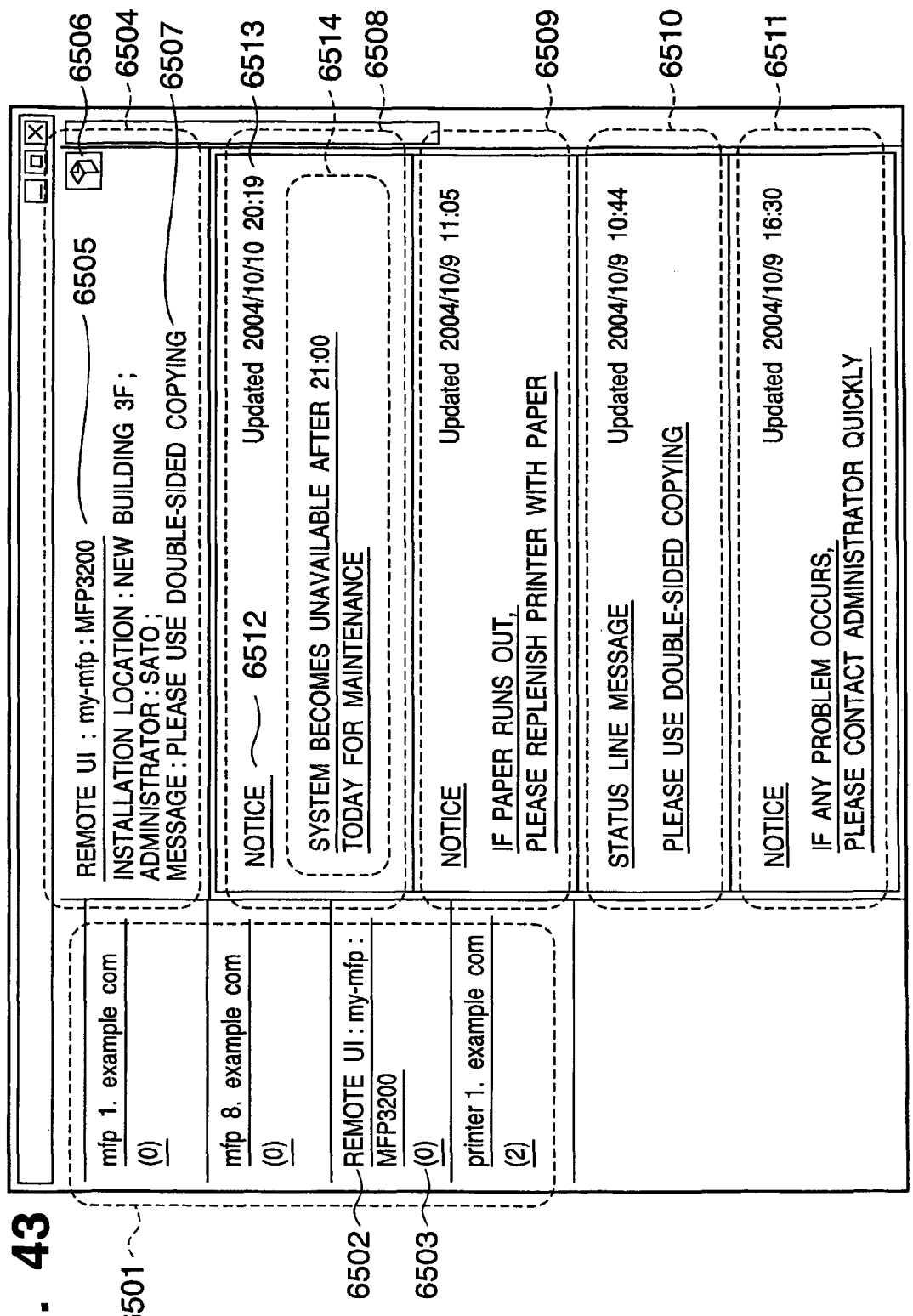
FIG. 43 is a view showing an example of a bulletin board update information feed display window displayed on the operation panel of the image processing apparatus.

FIG. 43 shows an example of a bulletin board update information feed display window displayed on the operation panel of the image processing apparatus. The window in FIG. 43 is the same as that in FIG. 30 except that an entry description 6514 describes the contents of update information of the bulletin board, so a detailed description thereof will be omitted. Note that displayed information is bulletin board update information of an image processing apparatus selected as a remote printer. The entry description 6514 contains the contents of the bulletin board update process.

By the above process, when the user performs an operation for remote copy, update information of the bulletin board of an image processing apparatus selected as a remote copy printer is automatically displayed on the operation panel of an image processing apparatus operated by the user, and the user can accurately grasp the status of the remote copy printer. The user operates a sending function of outputting remote copy document data from another image processing apparatus.

Note that update information of the log or counter information of the image processing apparatus may be displayed as update information on the operation panel.

The timing when update information is displayed on the operation panel may be the timing when an error occurs in the image processing apparatus, the image processing apparatus is activated, or the image processing apparatus is idle for a predetermined period.

The functional block diagram of the third embodiment complies with FIG. 22. That is, FIG. 22 is a functional block diagram of the third embodiment by replacing "box document" with "bulletin board", and data saved in a boxed document management system 4204 with "message".

As described above, according to the third embodiment, one of a plurality of image processing apparatuses functions as an HTTP server (with an RSS feed file creation function), and another image processing apparatus functions as a client with a Web browser and RSS reader. If the description contents of the bulletin board of the server have changed upon selecting a remote copy operation by the user, the information can be acquired by the RSS reader function, and the user who has selected the remote copy function can be notified that the description contents have changed. Before actual remote copy is executed, the user can recognize whether remote copy is possible. Needless to say, the contents of the bulletin board are not limited to those of an image processing apparatus (copying machine) selectable for remote copy. If a change in bulletin board contents is acquired regardless of remote copy, the change in bulletin board contents can be monitored.

[Other Embodiment]

Note that the embodiments of the present invention have been explained in conformity with RSS 1.0. However, the format can be Atom or another RSS version such as RSS 0.9 (RDF Site Summary), RSS 0.91 (Rich Site Summary), RSS 0.92, or RSS 2.0 (Really Simple Syndication) as far as update information/summary information of contents can be distributed and announced. The format includes a new format for syndication which will be derived in the future.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-145882 filed on May 18, 2005, which is hereby incorporated by reference herein in its entirety.

The invention claimed is:

1. An image processing apparatus comprising:
a storage unit that stores information related to an event as update information in response to occurrence of the event in the image processing apparatus;
a generation unit that generates syndication data which includes a summary and link information for acquiring detailed information associated with the summary that is created based on the update information;
a syndication data reader that displays a list of available syndication data on a display unit of the image processing apparatus without an acquisition instruction from a user, and displays a summary of a selected syndication data and an anchor by which the link information associated with the summary in the list can be selected on the display unit of the image processing apparatus in response to a selection of a syndication data displayed in the list; and
a browser that acquires the detailed information associated with the selected link information from a server in response to a selection of an anchor displayed by the syndication data reader, and displays the acquired detailed information on the display unit of the image processing apparatus.

2. The image processing apparatus according to claim 1, wherein the image processing apparatus is connected to a network,
and the image processing apparatus further comprises:
an update information collection unit constructed to collect update information on occurrence of the event in the image processing apparatus and stores the update information in the storage unit; and
a syndication data providing unit constructed to provide the syndication data in response to a request.

3. The image processing apparatus according to claim 1, further comprising a document sending unit constructed to send document data by communication in accordance with an operation by a user of an operation unit,
wherein, when an operation to send a document is performed with said operation unit, said generation unit generates syndication data related to the update of sending destination address information, and
said syndication data reader displays the syndication data related to the update of the sending destination address information.

4. The image processing apparatus according to claim 1, further comprising a document management unit constructed to accumulate document data in accordance with an operation by a user of an operation unit,
wherein, when an operation to accumulate a document is performed with said operation unit, said generation unit generates syndication data related to the update of accumulated information, and
said syndication data reader displays the syndication data related to the update of the accumulated information.

5. The image processing apparatus according to claim 4, wherein
said document management unit performs a management process for one of addition, deletion, editing, reception, and transmission of the accumulated document data, and a change of an accumulation method, and
said generation unit generates syndication data related to the update of accumulated information in accordance with the management process.

6. The image processing apparatus according to claim 1, further comprising an address management unit constructed to manage address information for communication in accordance with an operation by a user of an operation unit,
wherein, when an operation to manage an address is performed with said operation unit, said generation unit generates syndication data related to update of address information, and
said syndication data reader displays the syndication data related to update of the address information.

7. The image processing apparatus according to claim 6, wherein
said address management unit performs a management process for one of addition, deletion, and editing of the address information, and
said generation unit generates syndication data related to the update of the address information in accordance with the management process.

8. The image processing apparatus according to claim 1, wherein said syndication data reader displays syndication data related to deleted information.

9. The image processing apparatus according to claim 1, wherein said syndication data reader displays a thumbnail image related to updated information.

10. An image processing system in which an image processing apparatus defined in claim 1 is connected by a communication network.

11. A method of controlling an image processing apparatus, comprising:

a storage step of storing information related to an event as update information in response to occurrence of the event in the image processing apparatus;

a generation step of generating syndication data which includes a summary and link information for acquiring detailed information associated with the summary that is created based on the update information;

a syndication data reading step in which a syndication data reader displays a list of available syndication data on a display unit of the image processing apparatus without an acquisition instruction from a user, and displays a summary of selected syndication data and an anchor by which the link information associated with the summary in the list can be selected on the display unit of the image processing apparatus in response to a selection of a syndication data displayed in the list; and a step of a browser acquiring the detailed information associated with the selected link information from a server in response to a selection of an anchor displayed by the syndication data reader, and displaying the acquired detailed information on the display unit of the image processing apparatus.

12. The method according to claim 11, wherein the image processing apparatus is connected to a network, and wherein the method further comprises:

an update information collection step of collecting update information on occurrence of the event in the image processing apparatus and storing the update information in the storage unit; and a syndication data providing step of providing the syndication data in response to a request.

13. A non-transitory computer-readable storage medium on which is stored code of a computer program executable by a computer embedded in an image processing apparatus, said program, when executed, causing the image processing apparatus to execute steps comprising:

a storage step of storing information related to an event as update information in response to occurrence of the event in the image processing apparatus;

a generation step of generating syndication data which includes a summary and link information for acquiring detailed information associated with the summary that is created based on the update information;

a syndication data reading step of a syndication data reader displaying a list of available syndication data on a display unit of the image processing apparatus without an acquisition instruction from a user, and displaying a summary of a selected syndication data and an anchor by which the link information associated with the summary in the list can be selected on the display unit of the image processing apparatus in response to a selection of a syndication data displayed in the list; and a step of a browser acquiring the detailed information associated with the selected link information from a server in response to a selection of an anchor displayed by the syndication data reader, and displaying the acquired detailed information on the display unit of the image processing apparatus.

* * * * *